*INVENTOR*
ROBERT A. RAGEN
BY Pat J. Schlesinger
Rankin A. Milliken
*ATTORNEYS*

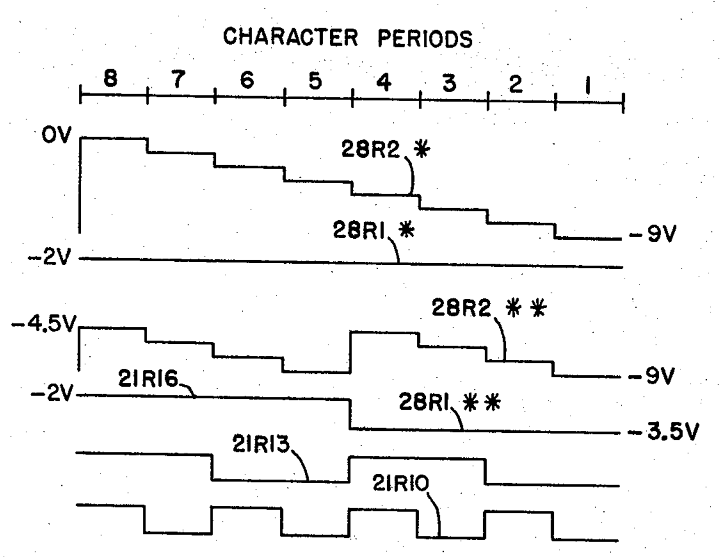
* SWITCH ON 1X8, 23L4-11 GROUNDED
** SWITCH ON 2X4, 23L4-11 GROUNDED
FIG. 6
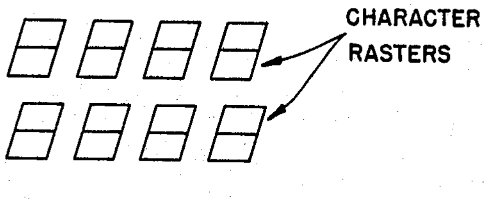
FIG. 4 2X4 DISPLAY RASTER
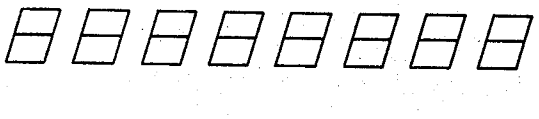
FIG. 5 1X8 DISPLAY RASTER Sept. 12, 1967 R. A. RAGEN 3,341,838

SIGNAL GENERATING APPARATUS

Filed Oct. 25, 1963 24 Sheets-Sheet 4

Sept. 12, 1967 R. A. RAGEN 3,341,838
SIGNAL GENERATING APPARATUS
Filed Oct. 25, 1963 24 Sheets-Sheet 7

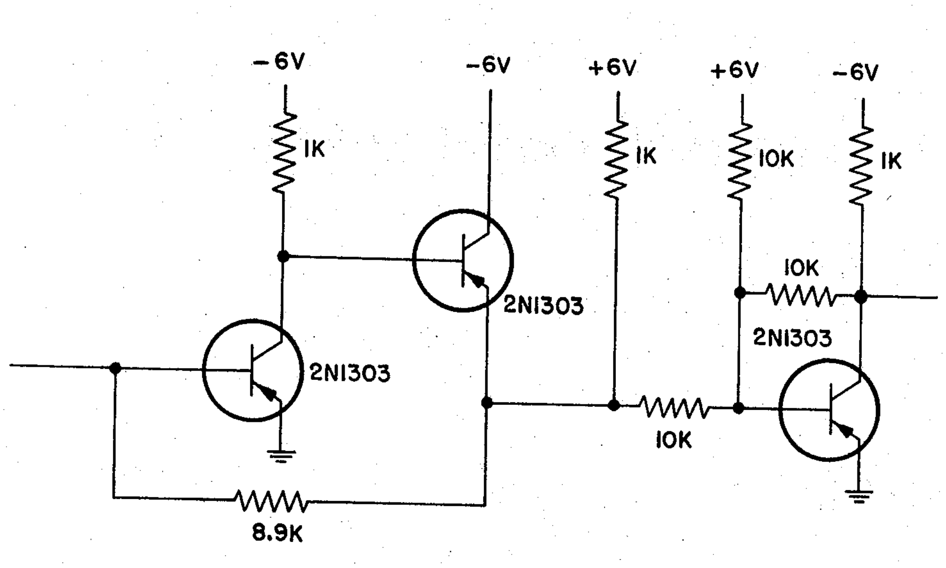
FIG. 12a
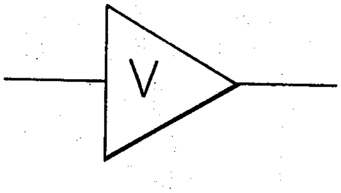
FIG. 12b
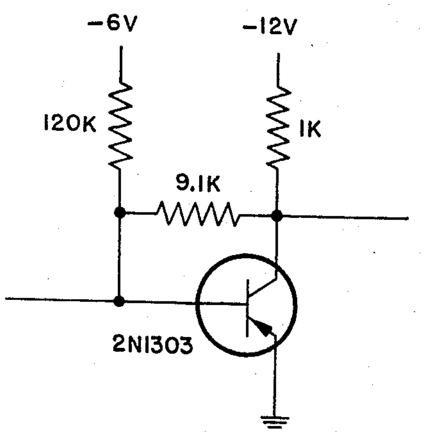
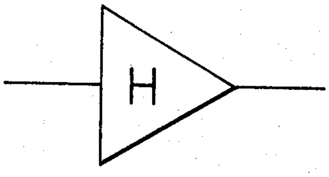
FIG. 18b
FIG. 18a

Sept. 12, 1967 R. A. RAGEN 3,341,838

SIGNAL GENERATING APPARATUS

Filed Oct. 25, 1963 24 Sheets-Sheet 13

Sept. 12, 1967 R. A. RAGEN 3,341,838

SIGNAL GENERATING APPARATUS

Filed Oct. 25, 1963 24 Sheets-Sheet 16

Sept. 12, 1967 R. A. RAGEN 3,341,838

SIGNAL GENERATING APPARATUS

Filed Oct. 25, 1963 24 Sheets-Sheet 18

* IN 1X8 DISPLAY CONFIGURATION, NUMBERING COLUMNS FROM THE RIGHT OF THE DISPLAY, STARTING WITH THE RIGHTMOST COLUMN, I.E., NUMBER POSITION, DESIGNATED 1.

Sept. 12, 1967 R. A. RAGEN 3,341,838

SIGNAL GENERATING APPARATUS

Filed Oct. 25, 1963 24 Sheets-Sheet 19

Sept. 12, 1967 R. A. RAGEN 3,341,838
SIGNAL GENERATING APPARATUS
Filed Oct. 25, 1963 24 Sheets-Sheet 21
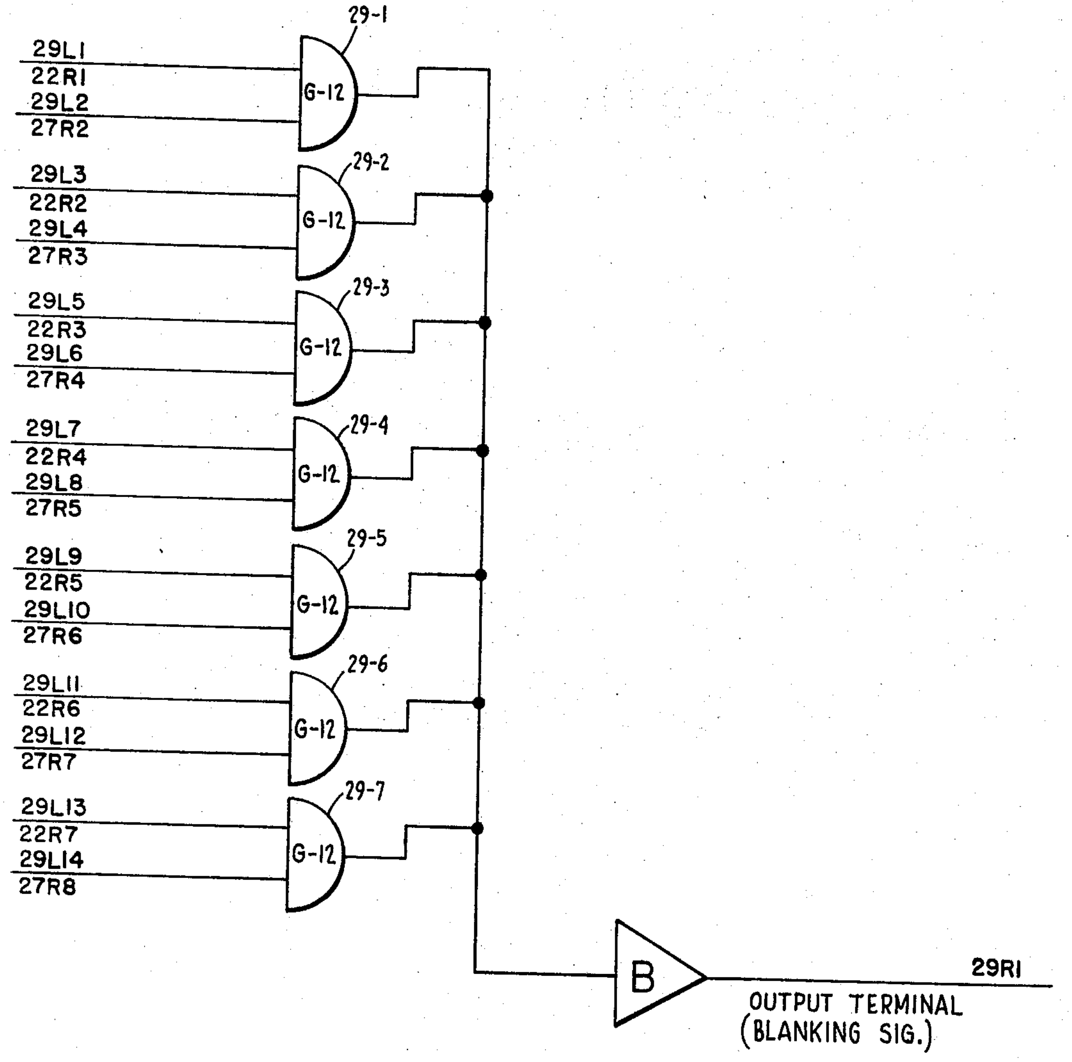
FIG. 29
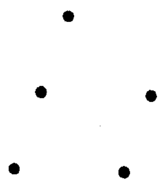
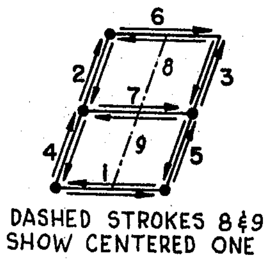
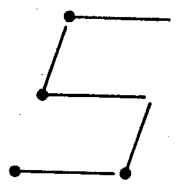
FIG. 30a FIG. 30b FIG. 30c Sept. 12, 1967 R. A. RAGEN 3,341,838

SIGNAL GENERATING APPARATUS

Filed Oct. 25, 1963 24 Sheets-Sheet 22

United States Patent Office 3,341,838

Patented Sept. 12, 1967

3,341,838

SIGNAL GENERATING APPARATUS

Robert A. Ragen, Hayward, Calif., assignor to Friden, Inc., a corporation of Delaware Filed Oct. 25, 1963, Ser. No. 322,549
5 Claims. (Cl. 340—324)

This invention relates to improved character display signal generator apparatus and to improved methods for generating character display signals. Character display signal generators are well-known in the prior art, being described in United States Patent No. 2,762,862 to Bliss, in United States Patent No. 2,766,444 to Sheftelman, in United States Patent No. 2,875,951 to Schreiner, in United States Patent No. 3,090,041 to Dell, and in United States Patent No. 2,834,831 to Giffard. A character display signal generator, then, may be defined as a device capable of producing a plurality of synchronized electrical signals, which, when applied to the proper input terminals of a cathode-ray tube, an oscilloscope, or the like, cause one or more symbols to be displayed thereupon; said symbols and their configuration, e.g., in rows and columns, being selectable by input signals, keyboard actuation, or the like. More particularly, the present invention relates to character display signal generating apparatus and methods which are free from the necessity of employing the costly, specialized and critical components and subcircuits which characterize the devices of the prior art.

As can be seen from the above-listed United States patents, many of the devices of the prior art were characterized by the employment of specialized, costly, and critical components and circuitry.

The device of the Bliss patent, for instance, employs a flying-spot cathode-ray tube scanner, or a kinescope, within the signal generator itself, in addition to the cathode-ray tube employed to display the symbols resulting from the generated signals.

Giffard employs a tube of the class known as monoscopes, ar phasmajectors, and also a Williams-type storage tube, both within the signal generator, in addition to the cathode-ray display tube.

The device of Sheftelman is also characterized by the employment of costly, specialized, and critical components, viz., a plurality of closely-matched delay lines, each having a plurality of critically located taps.

It will be clear from the above, then, that one of the principal problems in the character display signal generating apparatus of the prior art is the high cost, complexity, and criticality of certain components and circuits found therein. As is well-known to those skilled in the art, these characteristic features of the devices of the prior art render them applicable only to highly specialized applications wherein cost, compactness, and ease of maintenance are not primary considerations. It is to the solution of the problem of providing a novel character display signal generating apparatus and method characterized by low cost, compactness, and ease of maintenance that the present invention is directed.

It is therefore an object of the present invention to provide character display signal generating apparatus and methods which are substantially free from the need for special components that characterize present character display signal generators.

It is another object of the instant invention to provide character display signal generators employing noncritical circuitry throughout.

It is a further object of the instant invention to provide methods of generating character display signals, which methods may be carried out without the use of critical apparatus.

It is yet another object of the instant invention to provide a method of generating predetermined symbols upon the faces of fugitive pattern tracing display devices, which method may be practiced without the employment of critical circuits or components, or circuits or components specially adapted only to the practice of that method.

It is still another object of the instant invention to provide apparatus and methods for generating character display signals of minimum band width, thereby ensuring that said apparatus will be characterized by minimum criticality, and maximum ease of maintenance.

Other objects of the instant invention will in part be obvious, and will in part appear hereinafter.

The instant invention, accordingly, comprises the several steps and the relation of one or more of such steps to each of the others, and the apparatus embodying features of construction, combinations of elements, and arrangements of parts which are adapted to effect such steps, all of which are exemplified in the following detailed disclosure. The scope of the instant invention will be indicated in the claims.

For a fuller understanding of the nature and objects of the invention, reference should be had to the following detailed description, taken in conjunction with the accompanying drawings, in which.

Figure 3C:
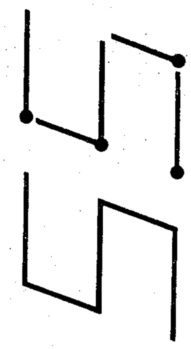
Figure 3B:
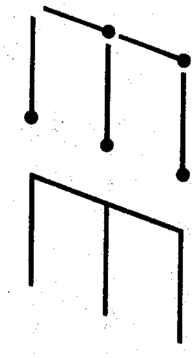
Figure 3A:
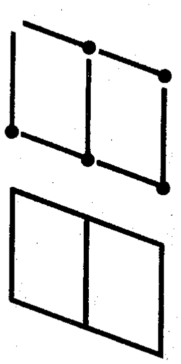
Figure 7:
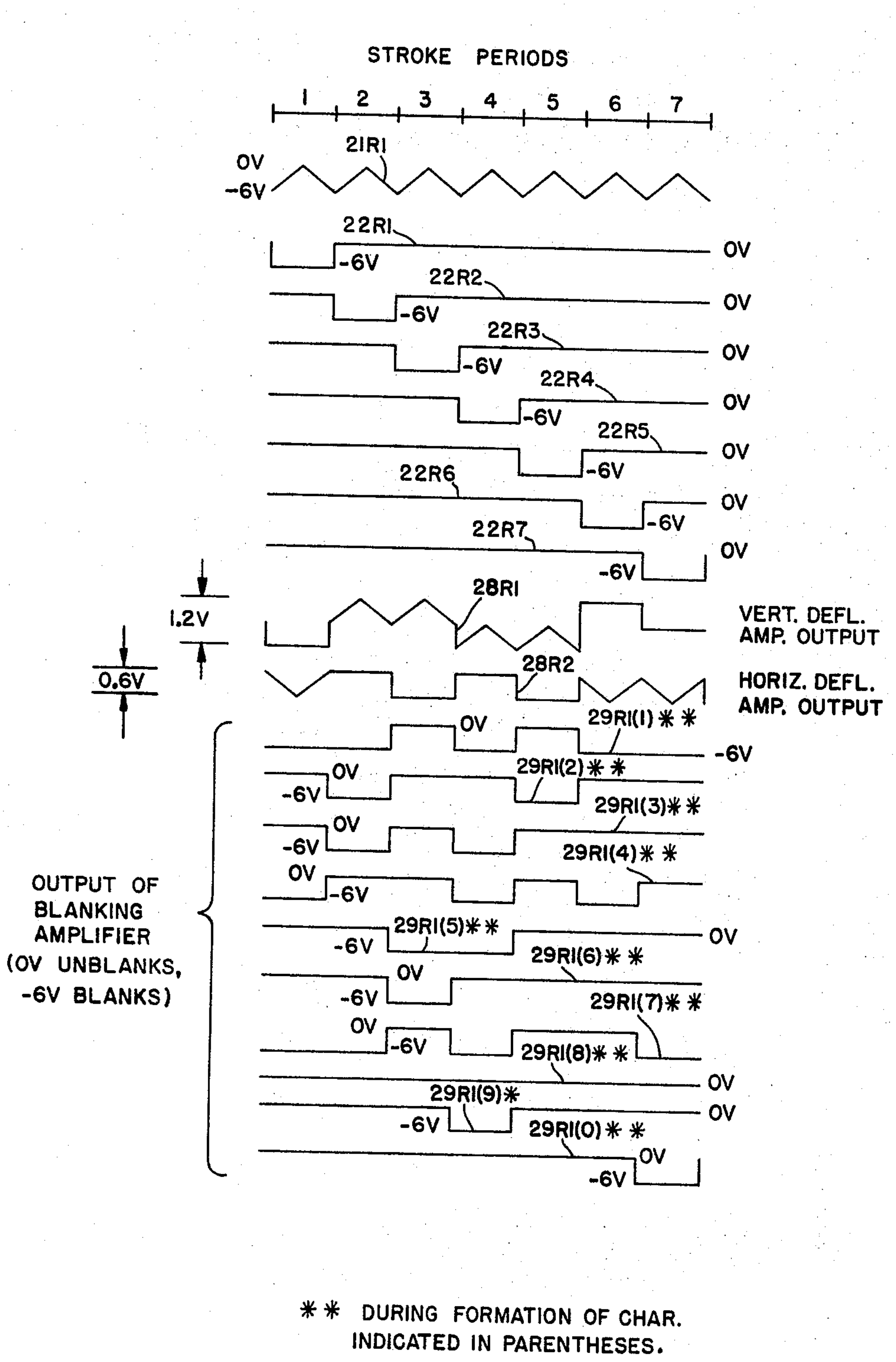
Figure 2A:
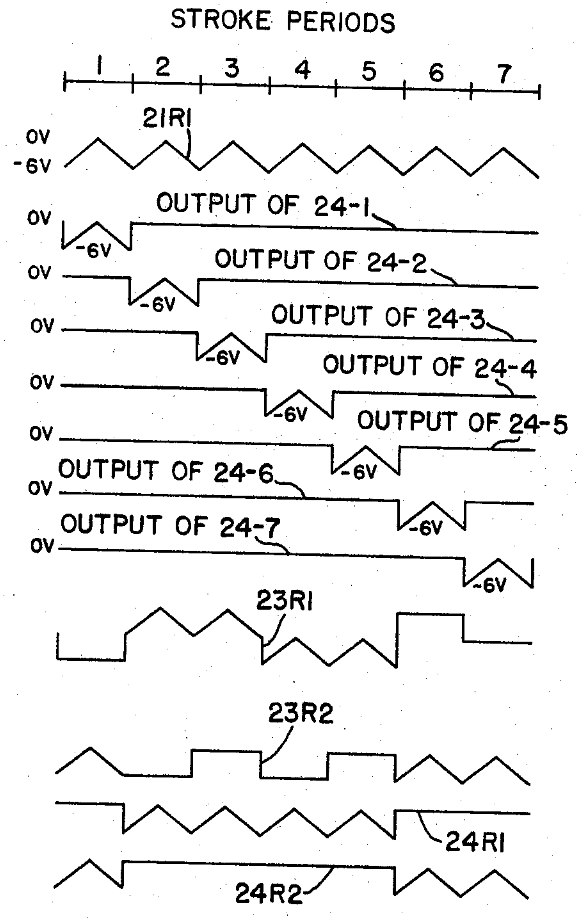
Figure 2B:
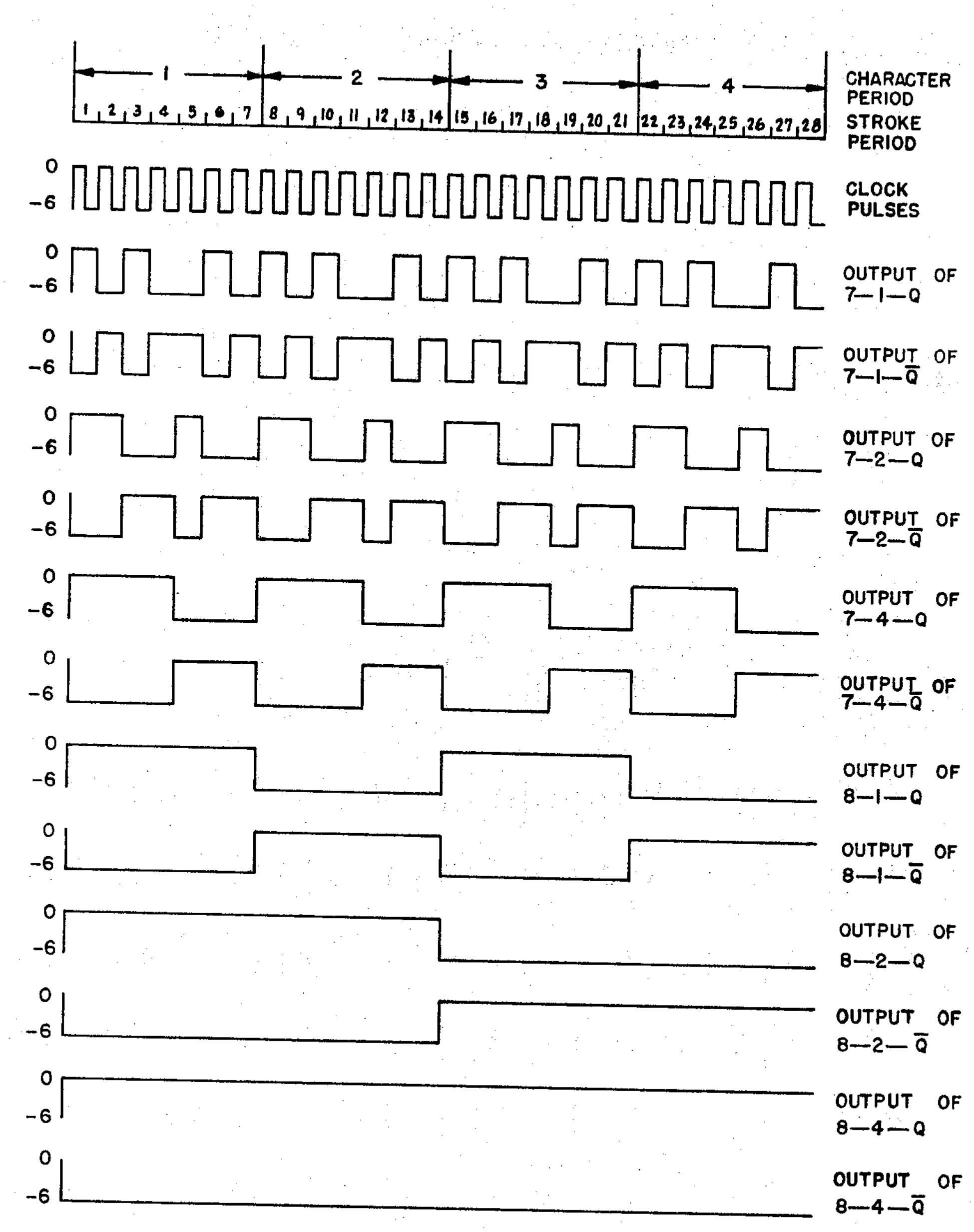

FIGS. 3*a*, 3*b*, and 3*c* show three of the symbols which may be generated by the device of the instant invention and the corresponding arrangement of stroke traces employed to display said symbols;

FIGS. 4 and 5 show the display rasters, or row and column arrangements of symbols, which may be displayed upon the face of a cathode-ray display device energized by the character display signal generator of the instant invention. The left-hand or right-hand position of the switch shown at the top of FIG. 23 determines whether the 2 x 4 (FIG. 4) or 1 x 8 (FIG. 5) register configuration, or display raster, is displayed on the face of the display device;

FIG. 6 shows a plurality of idealized waveforms corresponding to actual waveforms produced at certain points of the embodiment of the instant invention shown in FIGS. 21 through 26 and 27 through 29;

FIGS. 7, 7*a*, and 7*b* show a plurality of idealized waveforms corresponding to actual waveforms produced at various points throughout the embodiments of the instant invention shown and described herein;

FIGS. 8*a* through 20*b* show a plurality of subcircuits which may be used in the embodiment of the instant invention described herein in connection with FIGS. 21 through 26 ad 27 through 29, and the corresponding block symbols.

Figure 23:
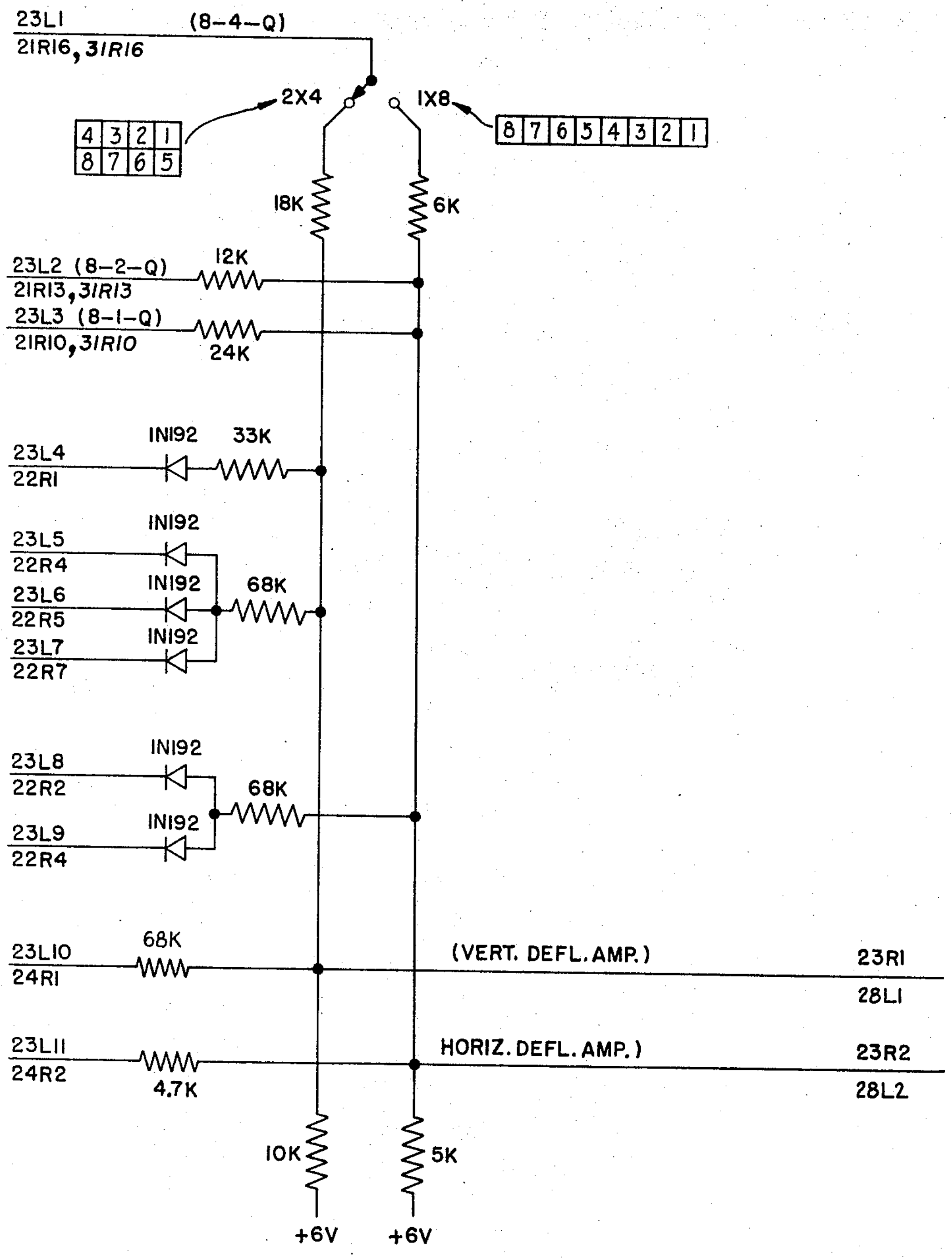
Figures 26, 26B:
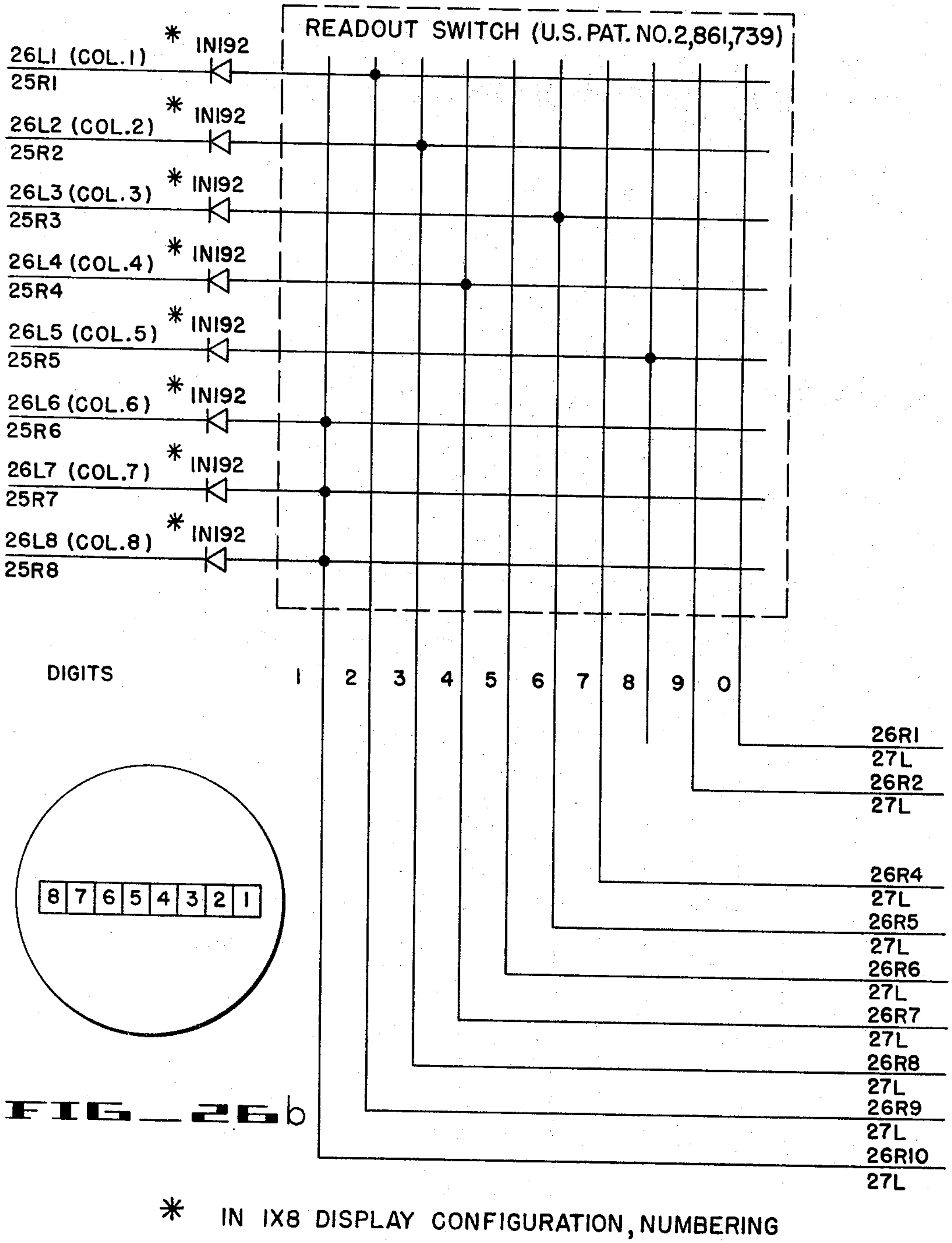
Figure 31:
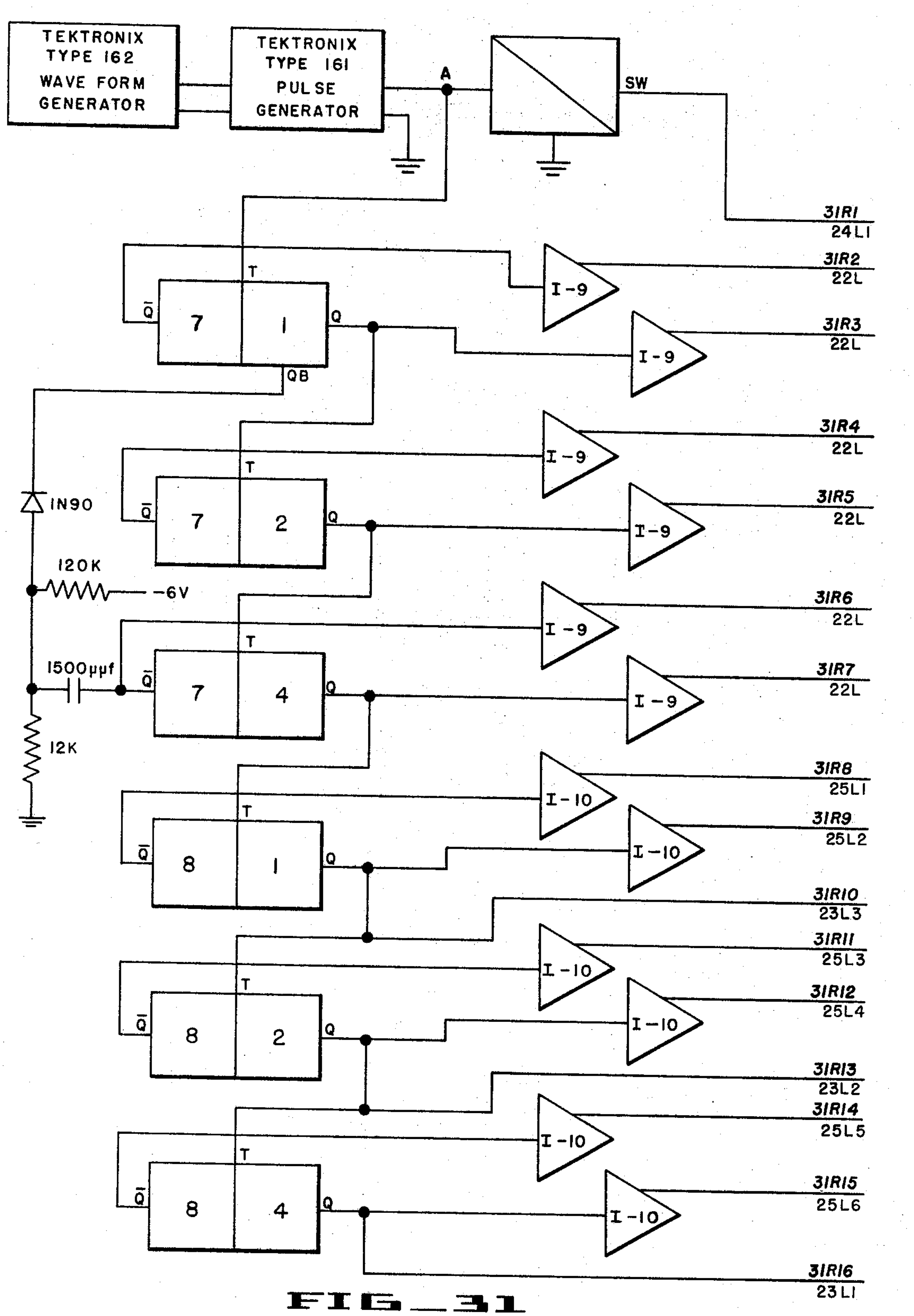
Figure 32A:
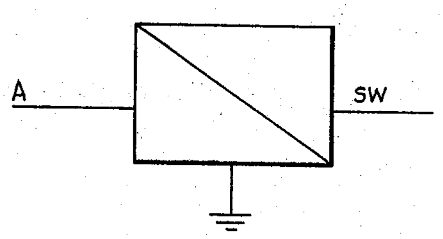
Figure 32B:
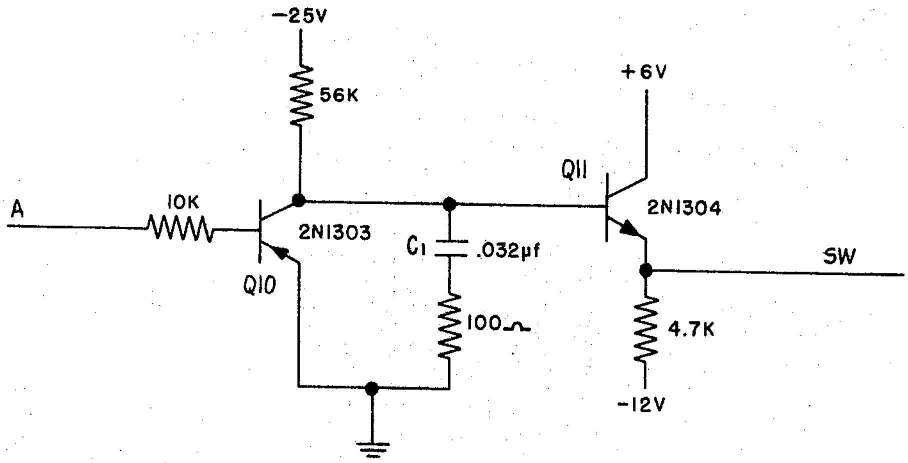
Figure 32C:
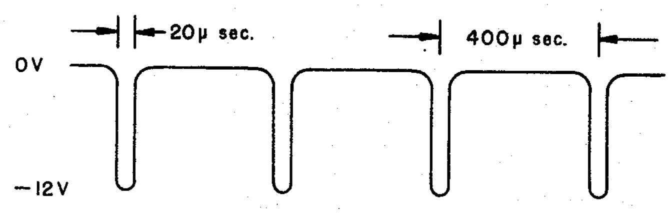
Figure 32D:
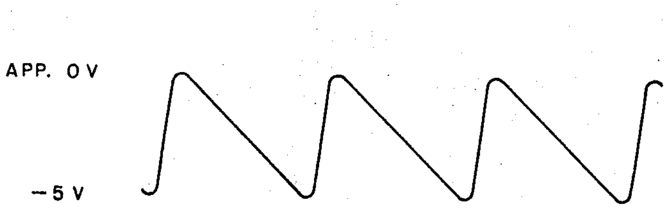
Figure 33:
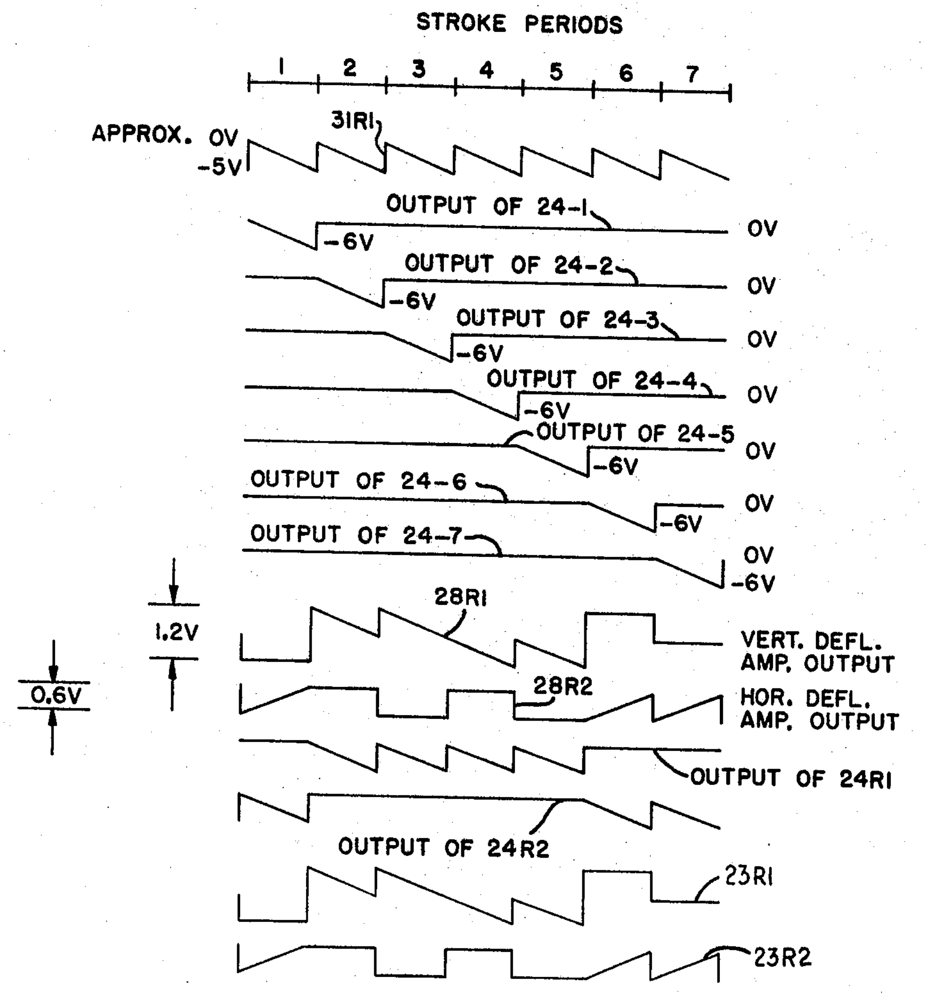

FIGS. 21 through 26 and 27 through 29, taken together, comprise a system block diagram of an embodiment of the instant invention;

FIG. 26*b* shows the order in which the successive digits generated by the character display signal generator of the instant invention are displayed upon the face of an associated cathode-ray tube when the switch of FIG. 23 is in its 1 x 8 position;

FIG. 30*a* shows the arrangement of stroke trace home positions employed in an embodiment of the instant invention;

FIG. 30*b* shows the stroke trace configuration of a symbol raster according to an embodiment of the instant invention, the strokes being numbered in order of their generation. The location of the displayed 3 and 5 strokes, denoted strokes 8 and 9, and forming the numeral 1 in an embodiment of the instant invention is also shown in FIG. 30*b*;

FIG. 30*c* shows the strokes making up a numeral "5" as displayed upon the face of a display device energized by the character display signal generator of the instant invention;

FIG. 31 is a block diagram showing the alternative means for generating timing signals and a sweep signal employed in a second embodiment of the instant invention;

FIG. 32*a* is the block symbol for the sawtooth wave generator shown in FIG. 31;

FIG. 32*b* is the wiring diagram of the sawtooth wave generator illustrated by the block symbol of FIG. 32*a*;

FIGS. 32*c* and 32*d* are the waveforms of a pulse train and a sawtooth wave which, respectively, form the input and output of the sawtooth wave generator of FIG. 32*a*;

FIG. 33 shows a plurality of idealized waveforms corresponding to those actual waveforms produced at various points throughout the second embodiment of the instant invention.

Figure 1:
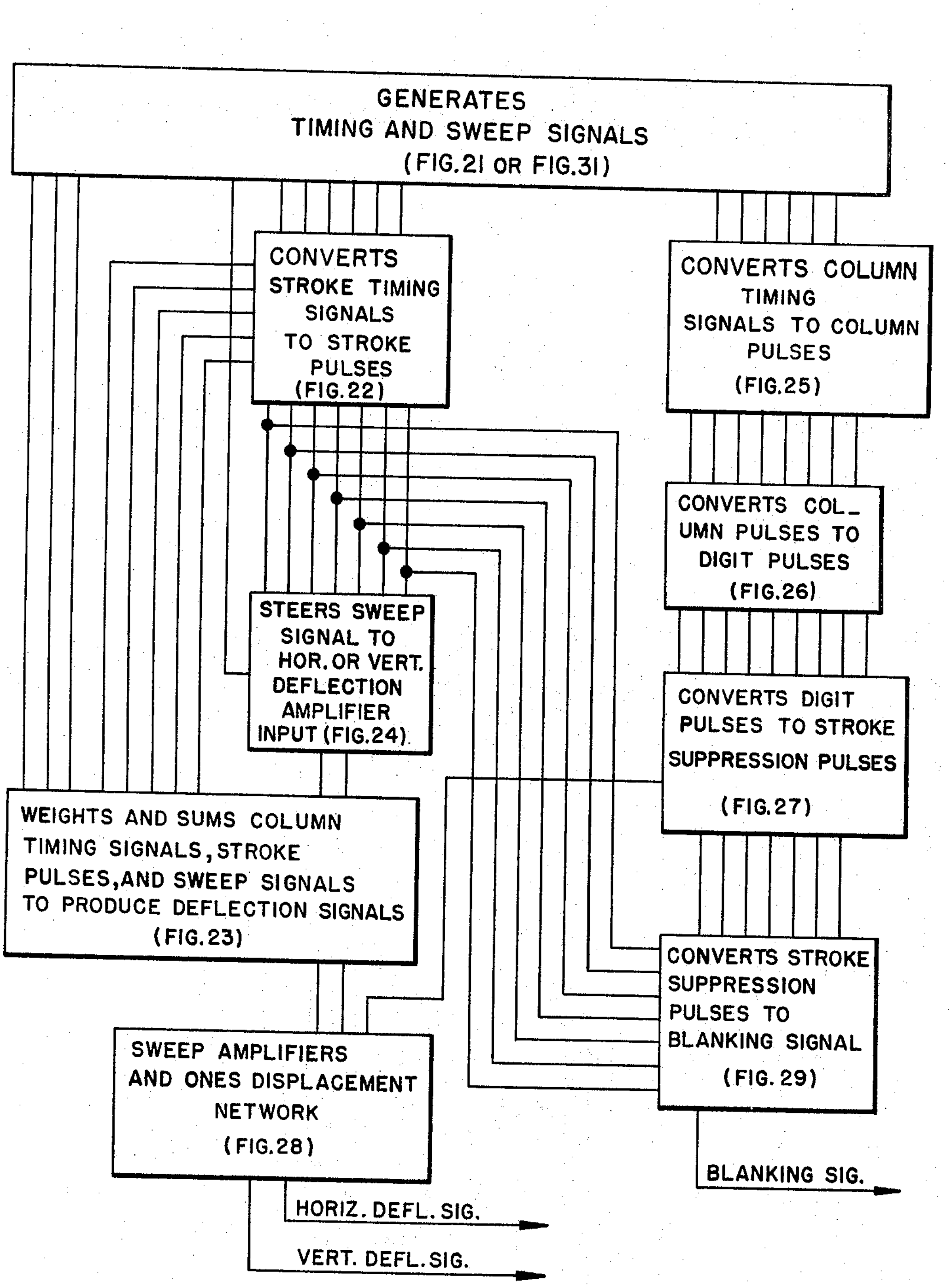
FIG. 1 is a functional block diagram of the embodiments of the instant invention shown and described herein.

As may be seen from FIG. 1, which is a functional block diagram of one embodiment of the instant invention, the instant invention may be conceived as comprising nine major functional units, each corresponding to a single figure of the drawings.

Figure 21:
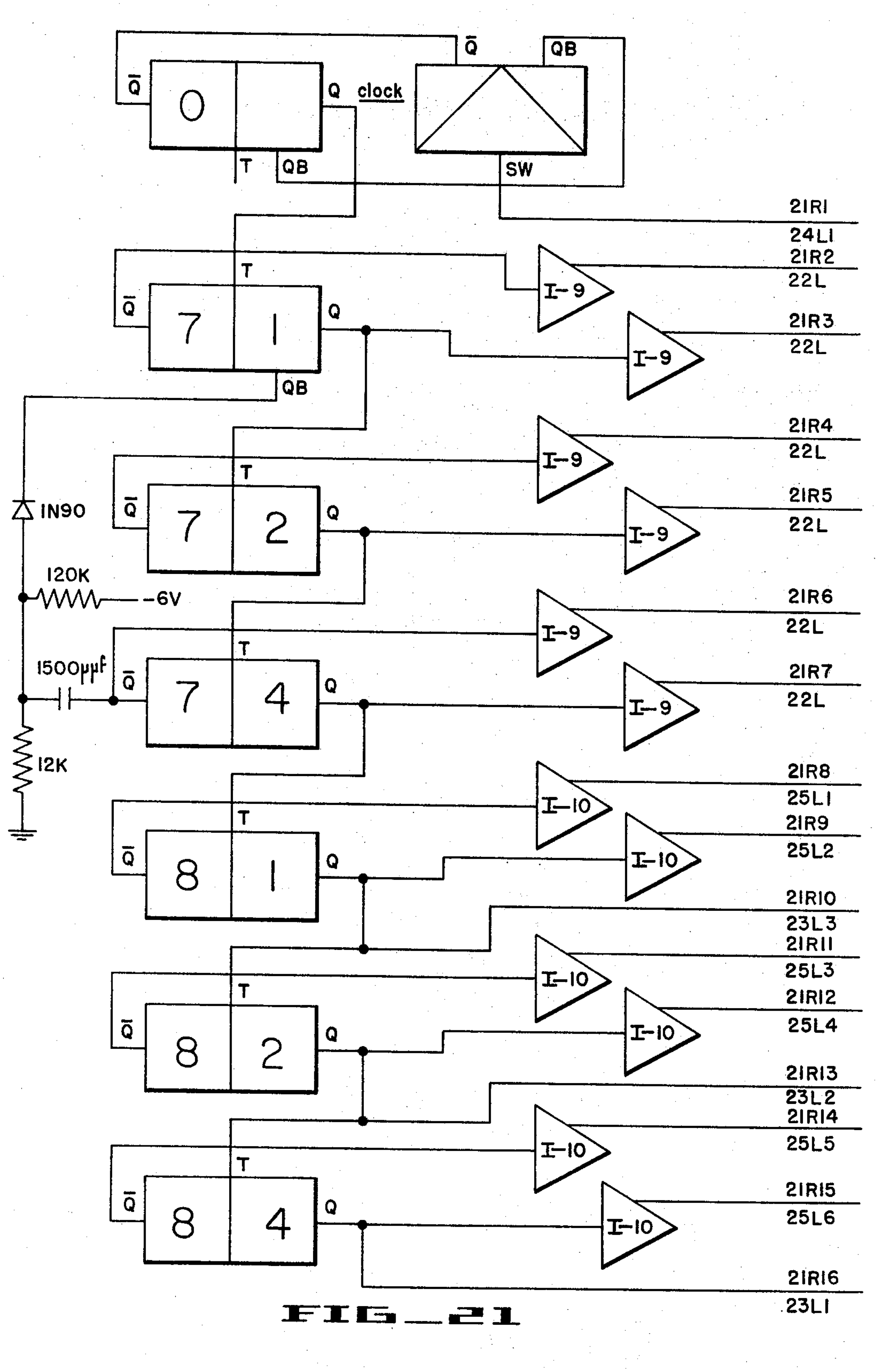

The first of these functional units shown in FIG. 21 and, as noted in FIG. 1, comprises means for generating synchronized timing signals (the outputs of the I–9 and I-10 inverters) and sweep signals (the output SW of the triangular wave generator). This first functional unit is free-running and serves to synchronize and time the operation of the remaining portions of the embodiment shown in FIG. 1, and also to supply a triangular sweep signal which deflects the cathode-ray beam to trace out each of the seven stroke traces making up each character raster having the form of a "box 8."

Figure 22:
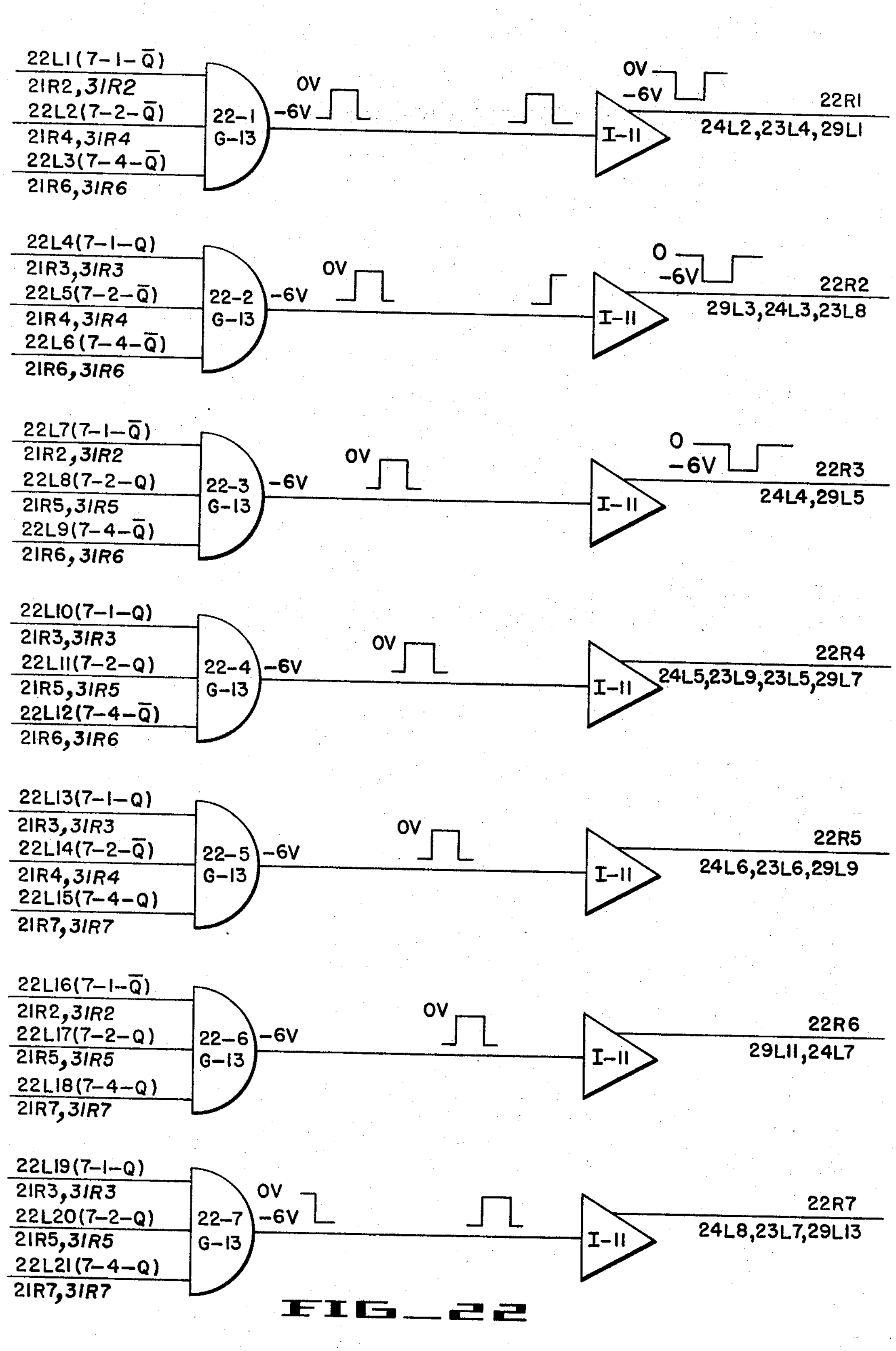

The second of these functional units, which corresponds to FIG. 22, operates to convert some of the timing signals produced by the first functional unit into sets of sequentially-appearing, or commutated, stroke pulses, which occur in time sequence upon a corresponding set of output terminals, each of these stroke pulses being identified with one of the seven strokes of which the character raster is comprised.

The third of the nine major functional units corresponds to FIG. 23 and is an analog current-summing network employed to weight and sum signals produced by the first (FIG. 21), second (FIG. 22), and fourth (FIG. 24) major functional units to produce deflection signals which are adapted, after amplification, to be applied to the deflection signal receiving means of the display device to which the character display signal generator of the invention is connected for modulating the cathode-ray beam deflecting field of said device to trace a character raster in a multi-character, multi-row display.

Figure 28:
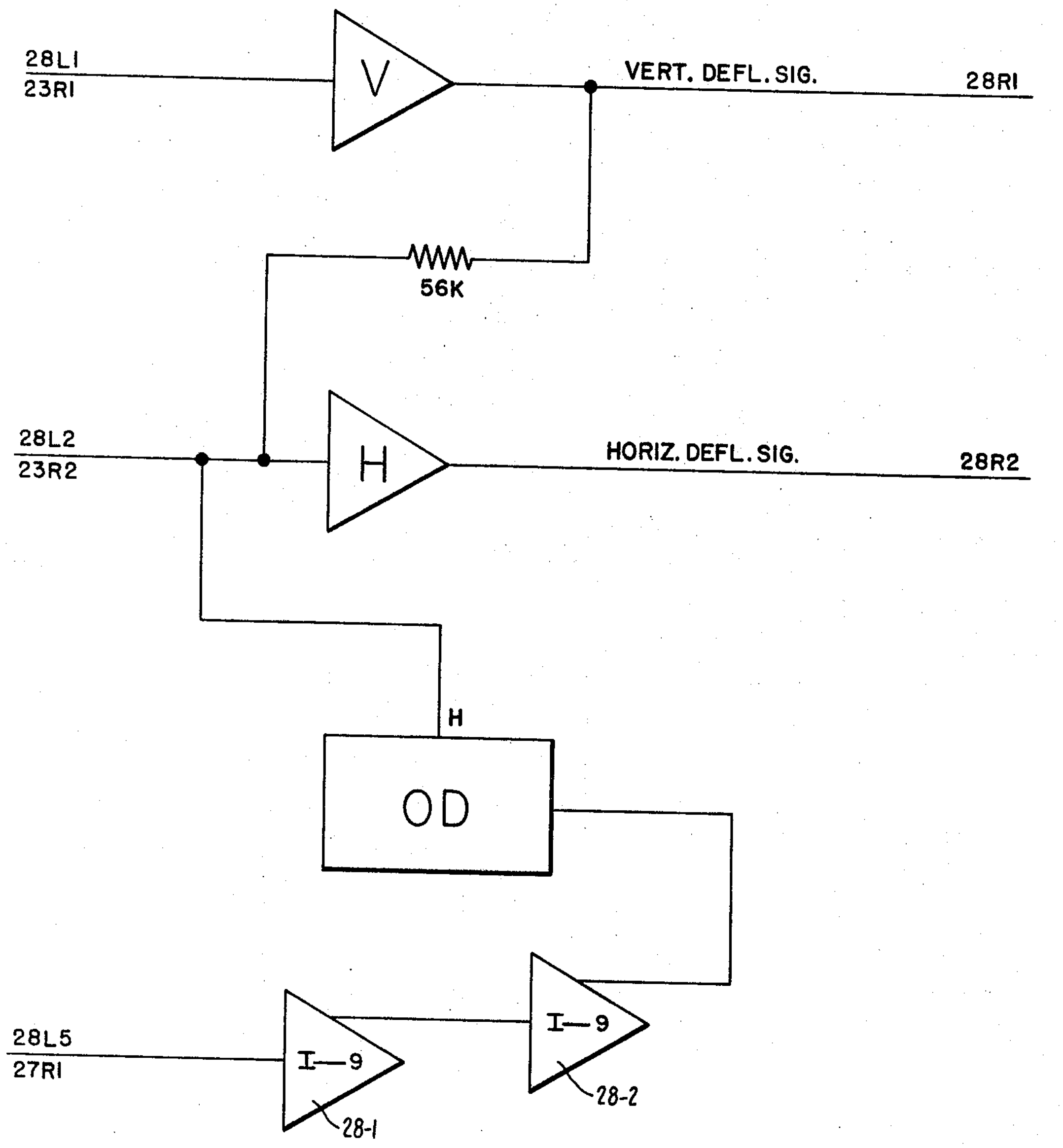

The amplification of the deflection signals produced by said third major functional unit is accomplished by the fifth major functional unit, to which FIG. 28 corresponds.

Figure 24:
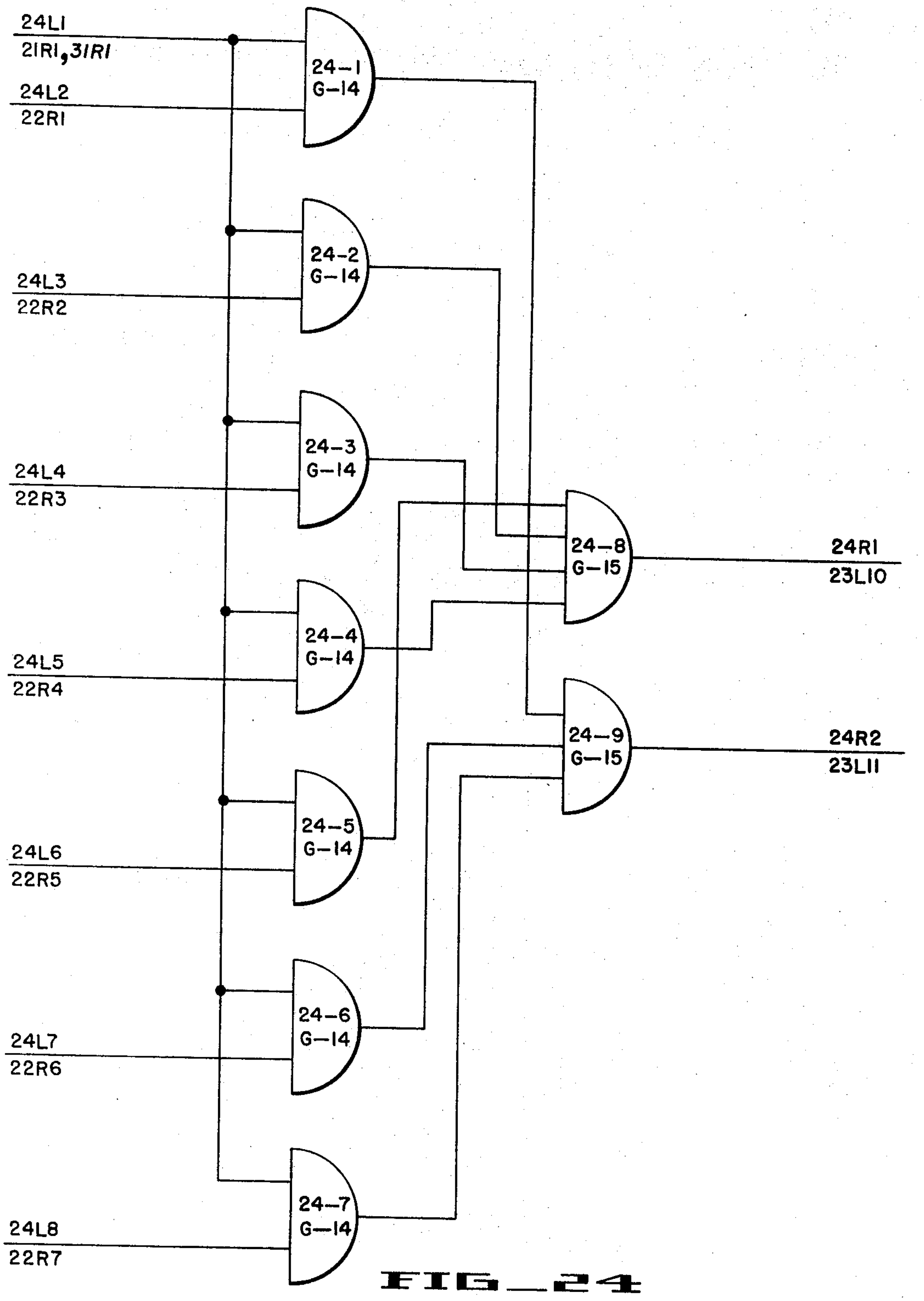

The fourth major functional unit, shown in FIG. 24, comprises gating means for "steering" the above said sweep signals to the horizontal or vertical input of the third major functional unit (FIG. 23) according to whether the stroke which is instantaneously being generated is horizontal or vertical.

Figure 25:
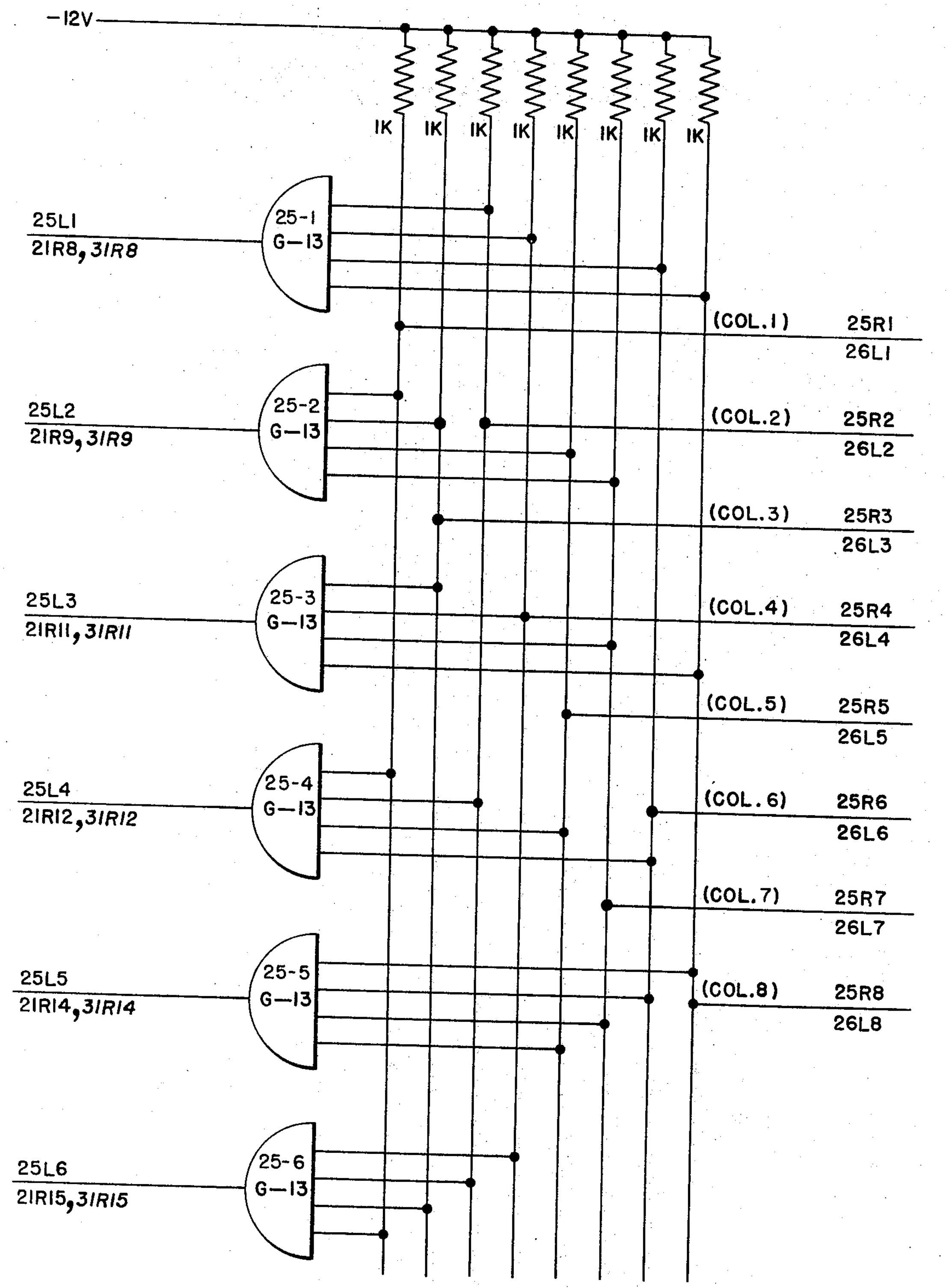

The sixth major functional unit, as shown in FIG. 25, comprises means for converting the column timing signals produced by the generator (FIG. 21) into a plurality of column pulses appearing sequentially upon a corresponding plurality of leads, each lead corresponding to a diverse character position. Each column pulse is synchronized with the generation of a character raster by said column timing signals.

The seventh major functional unit comprises means, as shown in FIG. 26, to indicate to further portions of this embodiment the digit to be displayed in a given column, the identity of which column is indicated by a significant signal from the sixth functional unit on a single one of a plurality of column pulse input lines. It should be understood that this converting means may comprise apparatus separate from the character display signal generator itself, as, for instance, the readout switch described in connection with the adding-perforating machine of United States Patent No. 2,861,739. An electronic switching network, comprised, for instance, of diode gates; a plugboard; or a card readout may serve the same function as said readout switch; as may other devices, the applicability of which to the uses of the instant invention will be clear to those having skill in the art.

Figure 27:
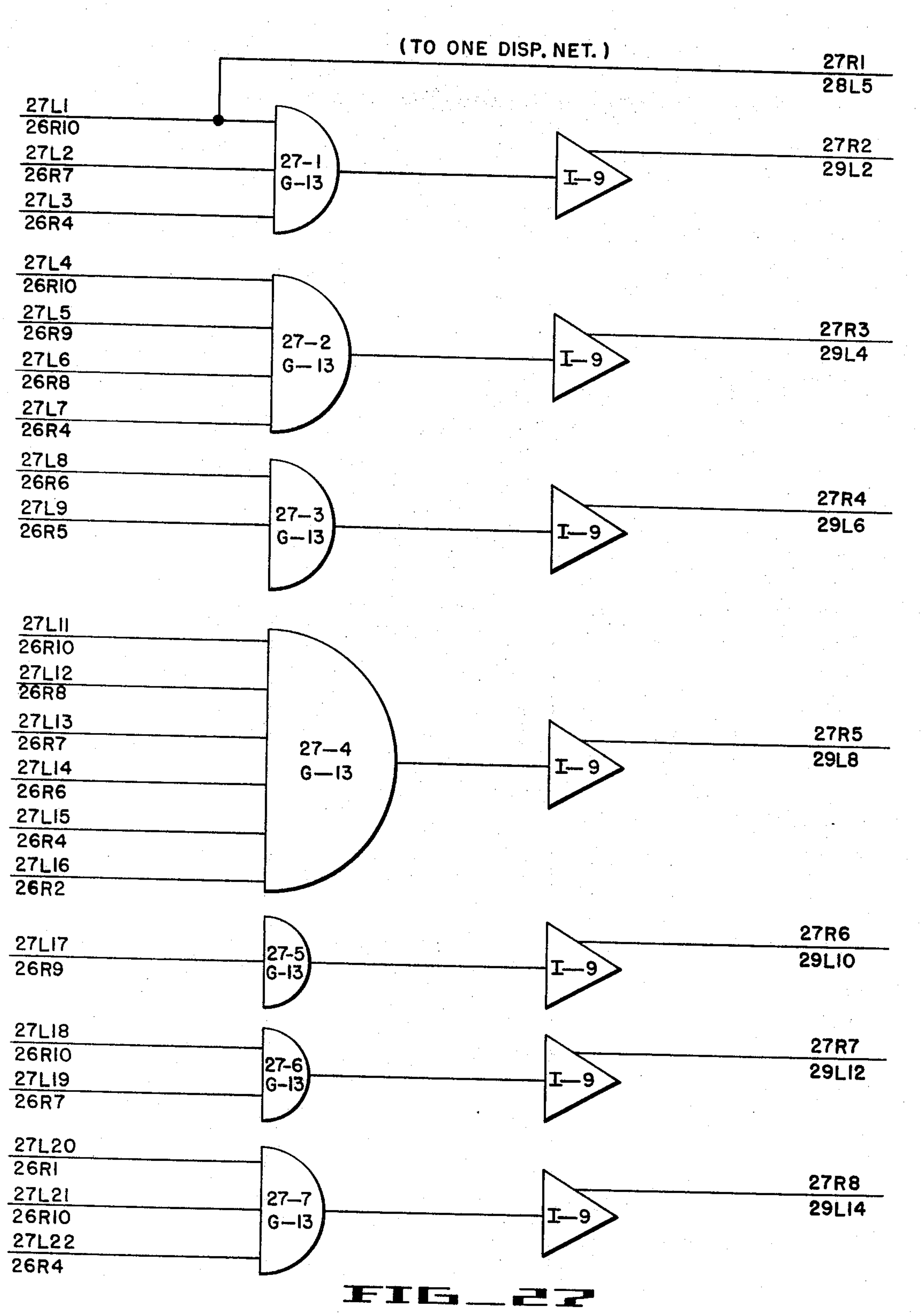

The eighth major functional unit of the instant invention, an embodiment of which is shown in FIG. 27, converts the output pulses of the device of FIG. 26 to stroke suppression pulses. As afore-mentioned, each output terminal of the device of FIG. 26 represents one numeral. Since there are ten Arabic numerals, there are ten output terminals on the readout switch. A signal on any one of the output terminals of the readout switch except "8" is applied to one or more input lines of FIG. 27. The number of input lines energized will depend upon the number of strokes of the seven stroke raster to be suppressed, or blanked. For instance, the digit "5" (see FIG. 30*c*) has strokes three and four suppressed; hence input lines of two gates (27–3 and 27–4), which correspond to the third and fourth strokes of the character raster, are connected to the numeral "5" line (26R6). The eighth major functional unit, then, decodes the signals on nine input lines, each input line representing an Arabic numeral, into simultaneously appearing signals on seven output lines, each output line representing one stroke of the seven stroke character raster. A signal may appear on none of the output lines, on one of the output lines or on several of the output lines, depending on the number of strokes to be suppressed to form a particular symbol. There are no input lines to FIG. 27 for the numeral "8," since no strokes are blanked, or suppressed, in representing it.

The ninth major functional unit of the preferred embodiment of the instant invention (FIG. 29) comprises a plurality of gate units, each gate unit having two inputs. Each of the seven outputs of the eighth major functional unit (FIG. 27) is an input to one of the aforesaid gate units. Each of the seven outputs of the second major functional unit (FIG. 22) is an input to one of the same gate units. Hence, when one of these gates receives a suppression pulse from the eighth functional unit and a stroke pulse from the second functional unit, it will pass a signal to energize the blanking amplifier, also shown in FIG. 29, and will thus suppress the corresponding stroke on the display screen. The signals sequentially passed to the blanking amplifier form a train of blanking signals which is synchronized with the generation of a particular character raster.

INTERCONNECTION CONVENTIONS

To facilitate the study of the embodiments of the instant invention shown herein in the form of circuits, block diagrams, and similar networks, those networks which cannot be shown with clarity in a single figure are divided into a plurality of sub-figures. Each link (i.e., interconnection having negligible impedance) between two points located in different sub-figures is specified herein by means of the following conventions.

(1) From each of such points there extends a lead which terminates adjacent to an edge of the sub-figure in which the point lies.

*Example.*—The lead in the lower, right-hand portion of the sub-figure designated FIG. 23, which lead extends from the point at the top of the 5K resistor to the right-hand edge of the sub-figure and is labelled, inter alia, 23R2 at its right-hand end.

(2) Each sub-figure is assumed to have four of such edges, which together form a rectangle (not illustrated).

*Example.*—In FIG. 25 the loci of the ends of the outwardly extending leads define three edges, right, left, and bottom, of the assumed rectangle. The top of the assumed rectangle is slightly above the bus which terminates at its left end in a connection to the −12 v. supply.

(3) One of said four edges is arbitrarily designated the top (or T) edge, and the other three are then designated the right-hand (or R), bottom (or B), and left-hand (or L) edges, in clockwise order.

*Example.*—The top (or T) edge in FIG. 25 is the edge adjacent to the −12 v. bus, and, thus, the edge having its leads designated 25R1, 25R2, 25R3, etc., is the right (or R) edge.

(4) All directional expressions, such as "above," "leftwardly of," etc., refer to sub-figures so oriented that the B edge thereof is toward the reader, the R edge to his right, etc.

*Example.*—Gate 25–1 is above gate 25–2 in FIG. 25.

(5) Any lead which terminates adjacent to an edge of a sub-figure is considered to be, and is called, a "terminal" thereof.

*Example.*—The lead 25R1 in the upper, right-hand corner of FIG. 25 is called "terminal 25R1."

(6) Each sub-figure terminal is uniquely identified by a code designation, called a "home number," located immediately thereabove.

*Example.*—The code designation "25R8" found directly above the terminal end of the lower, right-hand horizontal lead in FIG. 25 is the home number of that terminal.

(7) Each home number consists of three terms: the first term, the middle (or alphabetic) term, and the third term.

*Example.*—In the home number "25R8," "25" is the first term, "R" is the middle term, and "8" is the third term.

(8) The alphabetic term of every home number at the T edge of every sub-figure (cf., 3 supra) is T. The alphabetic term of every home number at the R edge of every sub-figure is R. The alphabetic terms of the home numbers at the B and L edges are B and L, respectively.

*Example.*—FIG. 25 which has terminals at its L and R edges, but no terminals at its bottom and top edges.

(9) Every home number in each sub-figure has, as its first term, the number of that sub-figure.

*Example.*—The sub-figure designated FIG. 25, in which the first term of each home number is "25."

(10) The third terms of the home numbers at any edge are identifying numerals assigned to the terminals at that edge. Along all R and L edges these identifying numerals increase in order from the T edge toward the B edge, though the sequence of these numerals may be broken, that is, may read 1, 2, 8, 9, 10, for example. Similarly, the identifying numerals (third terms) of the home numbers along the T and B edges increase in order, sometimes broken, from the L edge toward the R edge.

(11) The home numbers of one or more other terminals will be found below many of the terminals in the sub-figures. These remote terminal home numbers are called "remote numbers," and serve to indicate the remote terminals to which the terminal immediately thereabove is linked.

*Example.*—The remote number 26L3 found directly under terminal 25R3 of FIG. 25 indicates that terminal 25R3 is linked to terminal 26L3 of FIG. 26.

(12) The expression "terminal number" is used when a term generic to both home numbers and remote numbers is required.

(13) Specifying more than the minimum necessary number of links to interconnect any plurality of points does *not* imply that more than the minimum number is to be used in constructing an embodiment of the instant invention; the redundant links are specified merely for convenience in tracing and *not* to indicate necessary structure.

(14) Multiple connections from a single terminal to a plurality of terminals on a single edge of another sub-figure are indicated by omitting the third term from the remote number which is located under said single terminal. A terminal exemplifying this convention is 21R2 of sub-figure 21.

(15) In addition to their use for designating interconnections between sheets, these terminal numbers are also used to designate the wave shape of an electrical signal at a particular point.

*Example.*—The topmost waveform in FIG. 6 is labeled with the terminal number 28R2. This indicates that this waveform may be derived by connecting a suitable waveform display device to the point in an actual embodiment corresponding to point 28R2 of the drawing.

In addition to the above conventions respecting the interconnections between sub-figures; an additional convention is employed in labeling the block symbols found in FIGS. 21 through 26 and 27 through 29 to facilitate ready identification with the corresponding subcircuits defined in FIGS. 8*a* through 20*b*. As examples of this convention, all of the gate block symbols (semicircular) which correspond to the circuit diagram of FIG. 13*a*, are labelled "G–13," while all of the inverter block symbols corresponding to the circuit digram of FIG. 11*a* are labelled "I–11."

In addition, the practice is adopted of assigning to certain gate units a code designation comprising the sub-figure number, a hyphen, and a numerical serial number within the sub-figure. Thus, the gate units, G–13 in FIG. 22 are given the code designations "22–1," "22–2," etc. This notation distinguishes the various gates on the same figure.

The meaning of the expression (COL. 1), (COL. 2), etc., appearing upon the left-hand leads of FIG. 26 is made clear in FIG. 26*b*. FIG. 26*b* illustrates the eight character positions generated upon a display device associated with the signal generator of the instant invention; the electrical signal on the lead marked (COL. 1) in FIG. 26 enables the appearance of a character in position 1 of FIG. 26*b*; the electrical signal on the lead marked (COL. 2) enables the successive appearance of numerals in position 2 of FIG. 26*b*; etc. The numerals in the eight character positions are formed successively from right to left, to wit: the numeral in character position 1 is formed first, followed by the successive formation of numerals in character positions 2, 3, 4, 5, 6, 7 and 8. It will be recognized, of course, that the numbers shown upon the face of the cathode-ray tube in FIG. 26*b* are *not* necessarily the numbers which will be displayed upon the cathode-ray tube when the device of the invention is in use, but rather are merely ordinal numbers to indicate the order in which symbols are generated upon the face of the displaying cathode-ray tube by the operation of the character display signal generator of the instant invention. In addition to the above conventions adopted particularly for use in the instant specification, it is to be noted that certain conventions indigenous to the electronics field have also been adopted herein, as, for instance, the employment of "K" to indicate the number of thousands of ohms value of a resistor. Also, the well-known expedient has been adopted herein of employing a triangular symbol to indicate an amplifier, an output from the apex thereof being a non-inverting output, while an output from one side, rather than the apex, indicates an inverting output. Where other well-known conventions are employed herein, it is to be understood that they are employed in the expectation of being interpreted by those of ordinary skill in the art, and, for that reason, no extensive cataloguing of well-known notational expedients is provided herein.

With respect to the waveforms given in FIGS. 6, 7, 7*a*, and 7*b* it is to be understood that, absent any statement to the contrary, the upper level of such waveforms is to be taken as more positive than the lower level of such waveforms, though, as is common in electronic engineering practice, both the upper and lower levels of such waves *may* be negative with respect, or positive with respect, to some absolute ground level.

With reference to the polarities of the outputs of the vertical, horizontal, and blanking amplifiers, a particular oscilloscope which may be employed as the display device in conjunction with the embodiments of the instant invention described herein is the Tektronix Type 321 Oscilloscope. In using this particular oscilloscope in connection with the character display signal generator of the instant invention, the terminals labelled "INPUT," "EXT. HORIZ. INPUT," "CRT. GRID" (on the rear of the oscilloscope), and "GND." were employed. When using these terminals of this particular oscilloscope, the 28R2 terminal of the circuit of the invention was connected directly to the "EXT. HORIZ. INPUT" terminal of the oscilloscope, the 28R1 terminal of the circuit was attached to the "INPUT" terminal of the ocsilloscope, and the 29R1 terminal of the circuit was directly connected to the "CRT. GRID" terminal of the oscilloscope. When so connected, the appearance of ground at the 28R1 and 28R2 terminals produced no deflection, while the appearance of ground at 29R1 terminal produced a trace on the cathode-ray tube. The appearance of negative signals at the 28R1 and 28R2 terminals produced downward and rightward deflections, respectively, while the appearance of positive signals at the 28R1 and 28R2 terminals produced upward and leftward deflections, respectively.

It will be understood by those skilled in the art that no particular display device need be employed in conjunction with the character display signal generating device of the instant invention, since simple expedients for adapting the instant invention to other oscilloscopes than the Tektronix Type 321, or alternative display devices, will be apparent to those skilled in the art upon reading the instant disclosure.

Figure 8A:
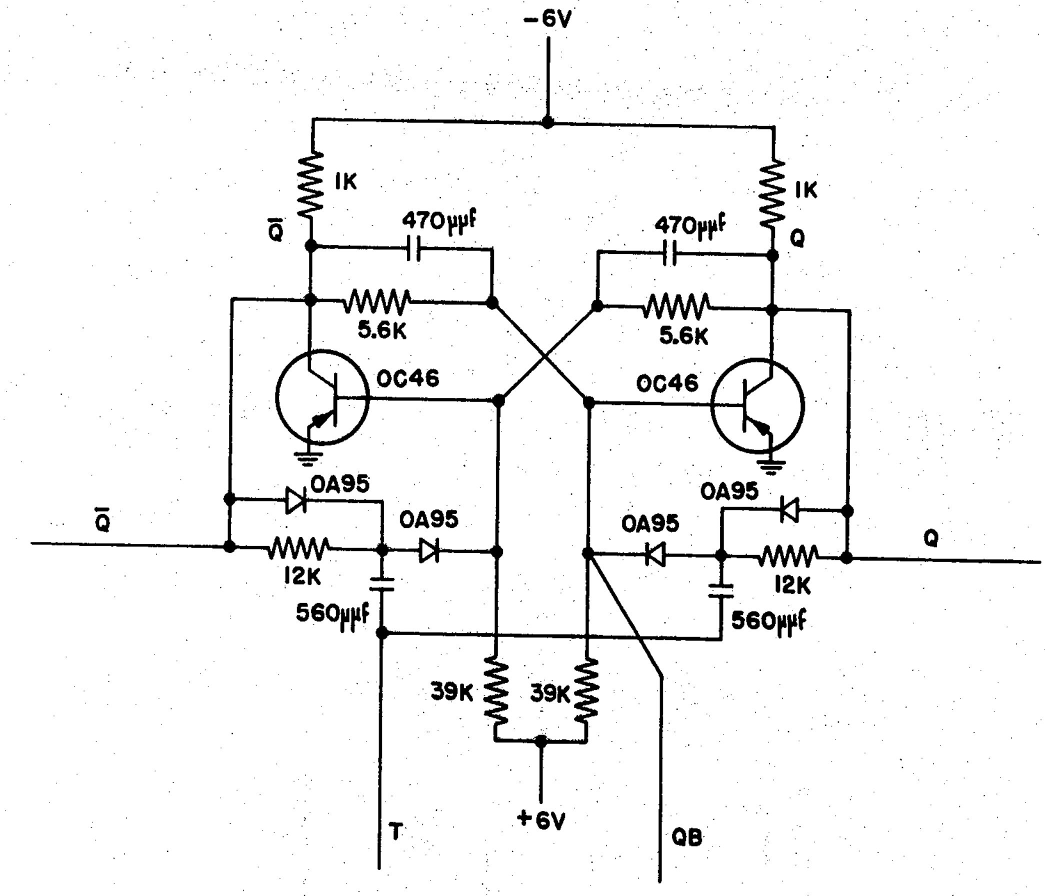
Figure 8B:
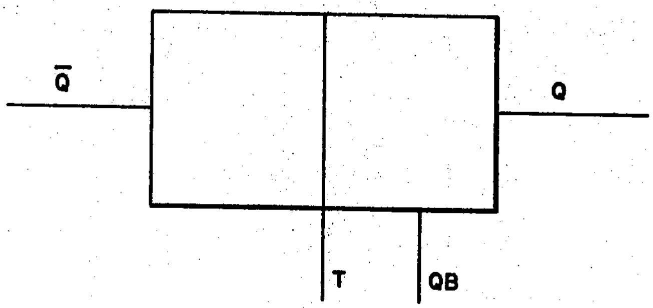

In FIG. 8*a* is shown a flip-flop circuit typical of those which may be employed in the construction of the embodiment of the instant invention shown in FIGS. 21 through 26 and 27 through 29. In FIG. 8*b* is shown the block symbol used in those figures to represent the flip-flop circuit of FIG. 8*a*. Corresponding terminals of the circuit of FIG. 8*a* and the block symbol of FIG. 8*b* have been provided with the same identifying symbol. Thus, the complementing input, or toggle input, has been labelled T in both FIGS. 8*a* and 8*b*. As will be apparent to those skilled in the art upon inspection of FIG. 8*a*, the T input is adapted to complement the flip-flop, i.e., to provide the binary complement of the number in the flip-flop upon receipt of a positive-going transition signal thereat. That is to say, receipt of a positive-going transition signal at complementing input T will cause conduction in the transistor which was previously nonconducing and vice versa.

The terminal of the flip-flop of FIGS 8*a* and 8*b* labelled Q is regarded as the output which defines the state of the flip-flop taken as a whole. Thus, the presence at the Q terminal of a voltage level of approximtely −6 v. indicates that the flip-flop is "set," i.e., in its state which is defined herein as logical 1 ("1"), while the presence at the Q terminal of an approximately volt 0 (ground) signal level indicates that the flip-flop is "reset," i.e., in its logical zero ("0") state. The $\overline{Q}$ terminal, on the other hand, is regarded as merely supplying a voltage level signal which is at all times the complement, or inverse, of the state of its flip-flop. In thes terms, it may be seen that the T input operates, when a positive-going transition signal is applied thereto, to change the state of the flip-flop either from "1" to "0," or from "0" to "1"; these changes of state being indicated by the voltage level signal at the Q terminal changing from approximately −6 v. to approximately ground, or vice versa. It should be further noted that, in accordance with well-established convention, a flip-flop is said herein to be "set" when its Q output is in its "1" state, and is said herein to be "reset" when its Q output is in its "0" state. The QB terminal shown in FIGS. 8*a* and 8*b* is adapted, as will be apparent to those skilled in the art, to set the flip-flop, i.e., produce a 6 v. or "1" signal at the Q terminal, upon application of a ground level or positive signal thereto. The circuit of this flip-flop constitutes no part of the instant invention, being readily available commercially as a pre-packaged module, and being described at pages 160 to 163 of Digital Computer Components and Circuits, R. K. Richards, D. Van Nostrand Company, Inc., New York, 1959.

Figure 9A:
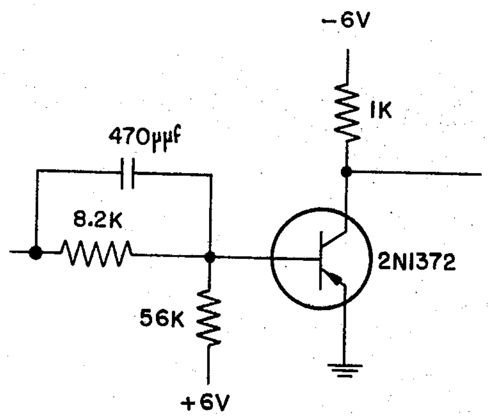
Figure 9B:
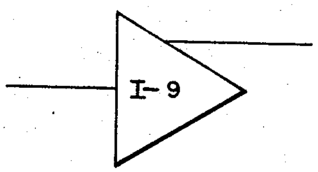

In FIG. 9*a* is shown an inverter which is used at several places throughout the embodiments of the instant invention described herein. The circuit shown in FIG. 9*a* is merely typical, it being understood that many variants of the same may be used in building up alternative embodiments of the instant invention. For instance, other transistors may be substituted for that designated in FIG. 9*a*, and the value of the speed-up capacitor may be altered somewhat without significantly altering the performance of the device of the invention. The block symbol used in the circuit of FIGS. 21 through 26, and 27 through 29 to represent the inverter circuit of FIG. 9*a* is shown in FIG. 9*b*. The designation I–9 within this block symbol indicates that the device of the block symbol operates as an inverter, and that the particular circuit which may be substituted for the block symbol is that shown in FIG. 9*a*. This designation, viz., I–9, is used throughout the circuits of FIGS. 21 through 26 and 27 through 29 wherever the inverter of FIG. 9*a* is employed in the complete working embodiments described herein.

Figure 10A:
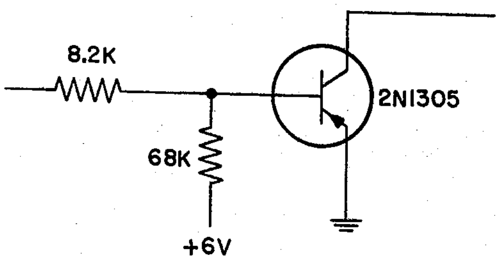
Figure 10B:
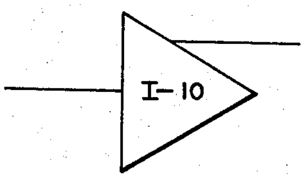
Figure 11A:
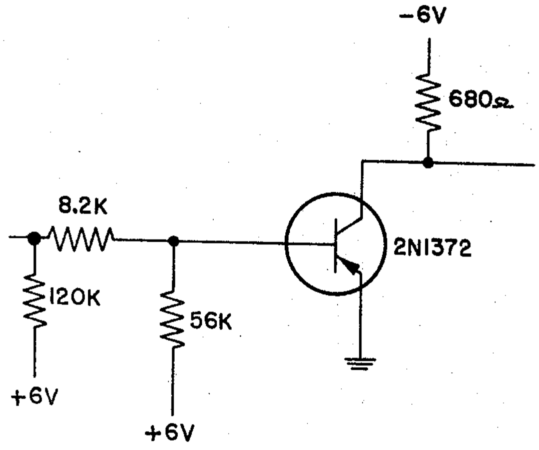

In FIG. 10*a* is shown an inverter suitable for use at several places in the embodiments of the instant invention as described herein. The particular component values given in FIG. 10*a* are not critical to the operation of the embodiment of the invention shown in FIGS. 21 through 26 and 27 through 29, and substitutions of different component values will occur to those skilled in the art. In FIG. 10*b* is shown the block symbol employed in the described embodiments to represent the inverter circuit of FIG. 10*a*. The designation I–10 is used to indicate that this block symbol, wherever used in the embodiments described herein, represents the circuit of FIG. 10*a*.

Figure 11B:
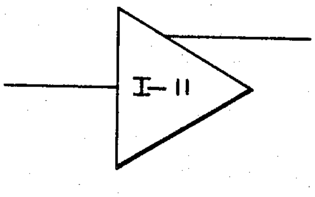

Similarly, FIG. 11*a* shows an inverter circuit suitable for use in the herein described embodiments of the instant invention at those places where the block symbol of FIG. 11*b* is found.

Figure 12A:
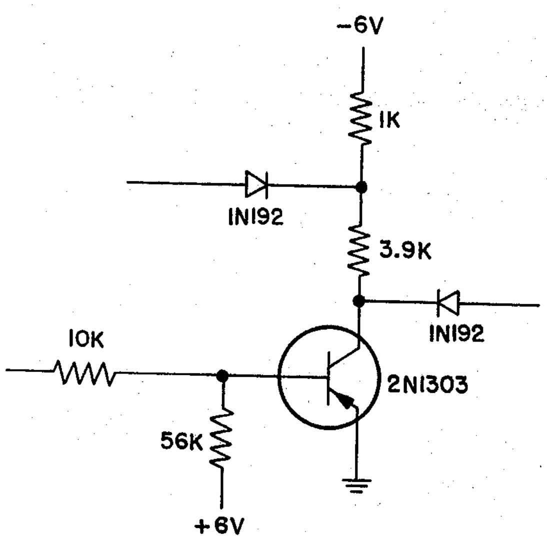
Figure 12B:
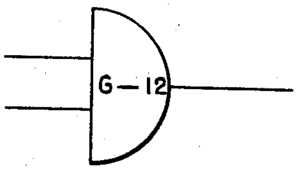
Figure 13A:
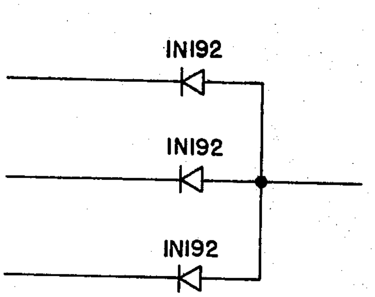
Figure 13B:
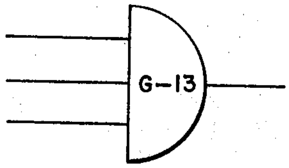

In FIG. 12*a* is shown a gate circuit suitable for use in the embodiments of the instant invention described herein. In FIG. 12*b* the numeral 12 inside the block symbol is used to indicate that the circuit of FIG. 12*a* may be substituted for the block symbol shown in FIG. 12*b* at any point in the embodiments shown herein. The upper, left-hand terminal of the block symbol of FIG. 12*b* corresponds to the lead connected to the plate of the left-hand diode in FIG. 12*a*, while the right-hand terminal of the block symbol of FIG. 12*b* corresponds to the lead connected to the plate of the right-hand diode in FIG. 12*a*. The lower, left-hand lead of the block symbol of FIG. 12*b* corresponds to the lead connected to the left-hand side of the 10,000 ohm resistor of FIG. 12*a*.

In FIG. 13*a* is shown a partial diode gate circuit, from which the conventionally included load resistor is missing. This partial circuit is represented by the block symbol of FIG. 13*b* at several places in the embodiment of the instant invention shown herein. According to the convention adopted herein, the designation G–13 in the block symbol of FIG. 13*b* indicates that the particular circuit represented by that block symbol functions as a gate, or part of a gate, and that the corresponding circuit is shown in FIG. 13*a*. As will be apparent to those skilled in the art, the common-tied group of diodes shown in FIG. 13*a* will function as a gate when its rightwardly-extending output terminal is connected to one end of a load, the other end of this load being connected to a source of supply voltage. Thus, for example, the circuit of FIG. 13*a* will act as a gate when combined with the inverter circuit of FIG. 11*a* in the manner indicated in FIG. 22. It is to be noted in connection with FIG. 13*b* that the block symbol of this figure may be shown as having any number of input leads connected to the left-hand side thereof. Whatever the number of input leads so shown, the usual convention is adopted herein that each of these input leads should be considered to be connected to a branch of a circuit corresponding to that of FIG. 13*a*, said branch comprising a diode having its plate directly connected to the common junction shown by a dot in FIG. 13*a* and its cathode directly connected to said one of said input leads. This same convention is adopted, where applicable, in connection with all other diode gates used herein.

Figure 14A:
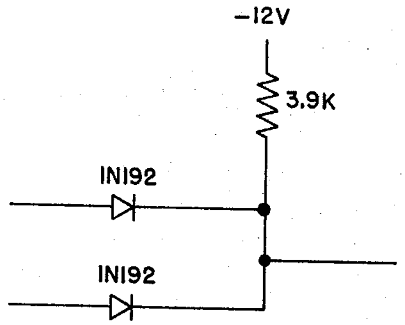
Figure 14B:
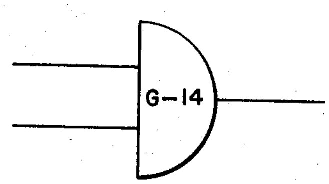

In FIG. 14*a* is shown a diode gate of the well-known type, suitable for use in the embodiment of the instant invention shown in FIGS. 21 through 26 and 27 through 29. At any place in those figures at which the block symbol of FIG. 14*b* appears, the circuit of FIG. 14*a* may be substituted there. As noted above in connection with FIG. 13*b*, the employment of a different number of input leads than that shown in FIG. 14*b* should be considered to merely indicate that a larger number of diode branches is used in FIG. 14*a*, each branch having the plate of its diode connected to an input terminal, and its cathode connected to the common junction with the output terminal shown by the lower dot in FIG. 14*a*. The numeral 14 appearing in the block symbol of FIG. 14*b* indicates that the circuit of FIG. 14*a* may be substituted therefor, or its equivalent having a greater or lesser number of input terminals, at any place at which the block symbol of FIG. 14*b* appears.

Figure 15A:
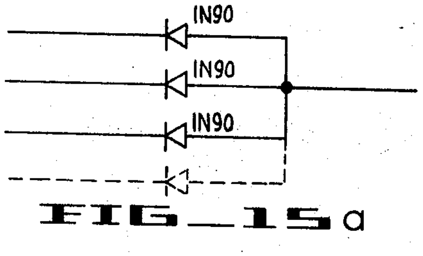
Figure 15B:
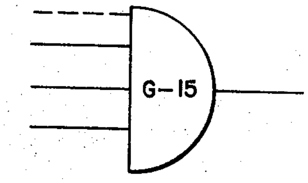

FIG. 15*a* shows a partial gate circuit which may suitably be employed at those places in the circuit of FIGS. 21 through 26 and 27 through 29 at which the block symbol of FIG. 15*b* appears. It is to be noted in connection with the block symbol of FIG. 15*b* that a greater or lesser number of input leads may be shown at the left-hand side of this symbol when employed in the above-mentioned figures. Whatever the number of input leads so shown, this block symbol should be considered to represent a partial gate circuit of the type shown in FIG. 15*a*, having a number of diode input branches equal to the number of input leads shown at the left-hand side of the block symbol.

Figure 16A:
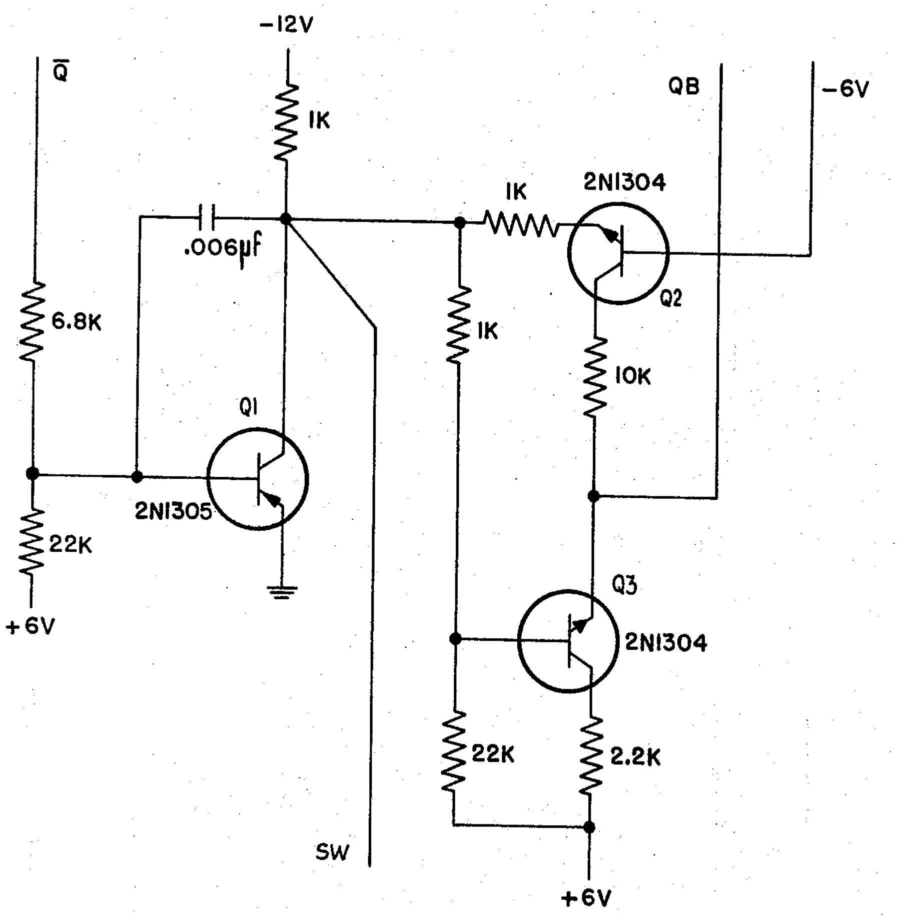
Figure 16B:
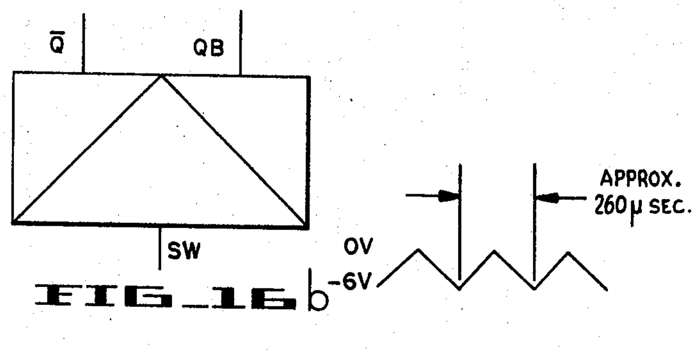

In FIG. 16*a* is shown a circuit adapted to co-operate with one flip-flop of the type shown in FIG. 8*a* to constitute together a free-running clock circuit when interconnected in the manner shown at the top of FIG. 21. The flip-flop co-operating with the circuit of FIG. 16*a* is represented by a flip-flop block symbol as shown in FIG. 8*b* having a "0" in its left-hand rectangular portion, and the circuit of FIG. 16*a* is represented by the block symbol of FIG. 16*b*. Thus, the clock pulse and triangular wave generator represented by the uppermost two blocks in FIG. 21 may be considered to be a flip-flop such as shown in FIG. 8*a* and a circuit such as shown in FIG. 16*a*, the $\overline{Q}$ and QB terminals of FIG. 8*a* being directly connected to the $\overline{Q}$ and QB terminals of FIG. 16*a*, respectively.

Considering now the circuit of FIG. 16*a*, it may be seen that the transistor Q1, its associated condenser, the 1K resistor directly connected to its collector from −12 v., and the two resistors connected directly to the base of Q1 serve to produce the substantially linear portions of the triangular waveform produced at the collector of transistor Q1. The transistors Q2 and Q3, and their associated resistor networks, serve to set the upper and lower voltage limits of the triangular wave produced at the collector of transistor Q1 (the SW terminal).

The operation of this free-running clock pulse and triangular wave generating circuit may be briefly described as follows:

It will be apparent that the transistor Q1 and its associated circuit components comprise a conventional Miller integrating circuit of the type illustrated on pages 158 through 161 of "Electron-tube Circuits" by Seely, published by McGraw-Hill in 1950. When the flip-flop is considered to be in the "set" condition, the $\overline{Q}$ terminal of the network of FIG. 16*a* will be approximately at ground potential. Accordingly, the integrating circuit will cause the voltage level at the collector of Q1 to move substantially linearly from ground potential toward −12 v. When, however, the right-hand plate of the condenser (collector of Q1) reaches, or slightly exceeds, the −6 v. level (i.e., tends to become *more negative* than −6 v.), transistor Q2 will begin to conduct, since its base is at −6 v. Conduction in the emitter-base circuit of Q2, however, initiates conduction in the emitter-collector circuit if this circuit is properly biased. The collector of Q2 is, of course, connected through 10,000 ohms (FIG. 16*a*) to the QB terminal of FIG. 8*a*. The QB terminal of FIG. 8*a* is connected through 39,000 ohms to a +6 v. supply and also through 5600 ohms to ground (when the flip-flop is in the "set" condition); hence, Q2 *is* properly biased for emitter-collector conduction. The resulting emitter-collector conduction in Q2, however, effectively connects the QB terminal of FIG. 8*a* through a 10,000 ohm resistor (connected directly to the collector of Q2) and a 1,000 ohm resistor (connected directly to the emitter of Q2) to the −6 v. potential at the collector of Q1, thus driving the base of the Q transistor in FIG. 8*a* considerably negative. This negative potential applied to the base of the Q transistor in FIG. 8*a* causes this transistor to conduct, thus terminating the conduction of the $\overline{Q}$ transistor because of the nature of the flip-flop circuit, and "resetting" the flip-flop. The "resetting" of the flip-flop results in the application of an approximately −6 v. potential to the $\overline{Q}$ terminal of FIG. 16*a*. This change of potential at the $\overline{Q}$ terminal tends to apply a negative potential to the base of Q1, thereby causing it to conduct. However, the charge stored on the condenser during the previous portion of the cycle (when $\overline{Q}$ was at ground) now discharges through, inter alia, the 6.8K resistor at the left-hand side of FIG. 16*a*, thereby effectively opposing the tendency of the −6 v. signal at the $\overline{Q}$ terminal of FIG. 16*a* to turn Q1 "on." This causes the potential at the base of Q1 to vary in such manner as to cause the collector potential to follow a substantially linear curve from −6 v. to ground, substantially as shown in the lower right-hand portion of FIG. 16*b*. At the time when the collector of Q1 has subsided to substantially ground level, the potential at the base of Q3 will be more positive than the potential at the emitter of Q3 and will turn transistor Q3 "on," thereby causing a signal on lead QB which will "set" the flip-flop of FIG. 8*a* in the manner which will be clear to those skilled in the art. As will now be clear to those having skill in the art, the circuit of FIG. 16*a* will function to successively "set" and "reset" the flip-flop of FIG. 8*a*, while the $\overline{Q}$ output of the flip-flop of FIG. 8*a* will successively function to bring about the charge and discharge of the condenser in FIG. 16*a*, the circuits of FIGS. 8*a* and 16*a* serving together as a free-running oscillator, which produces a rectangular wave at the $\overline{Q}$ output and a triangular wave at the SW output, both of which are utilized in the device of the invention in the manner which will be hereinafter set forth more fully. While FIGS. 8*a* and 16*a* are referred to hereinabove in the discussion of the clock pulse and triangular wave generator shown at the top of FIG. 21, it is to be understood that the circuit of FIG. 8*a* is employed at other places in the system according to the invention, e.g., as flip-flop 8–4 at the bottom of FIG. 21. The circuit of FIG. 8*a*, when employed at other places than the upper left-hand corner of FIG. 21, has neither its $\overline{Q}$ terminal nor its QB terminal connected to the circuit of FIG. 16*a*.

In FIG. 17*a* is shown an amplifier circuit conveniently employed in the embodiments of the instant invention described herein to assist in driving the vertical deflection plates of a cathode-ray tube with the vertical character generating signal. In FIG. 17*b* is shown the block symbol employed herein to represent the circuit of FIG. 17*a*. It will be understood by those skilled in the art upon reading the instant specification that many other and diverse circuits may be employed for amplification of the character generating signals produced by the device of the instant invention, and that the instant invention is in no way limited to the employment of the particular circuit shown in FIG. 17*a*.

In FIG. 18*a* is shown an amplifier conveniently employed in the embodiments of the instant invention shown herein to assist in applying the horizontal character generating signals produced by the device of the instant invention to the horizontal deflection plates of a cathode-ray tube in order to display the characters corresponding to the signals generated by the instant invention. In FIG. 18*b* is shown the block symbol employed herein to represent the circuit of FIG. 18*a*. As will be seen by those skilled in the art, many alternative amplifying circuits may be employed to perform this function in other embodiments of the instant invention, and it is not intended that the instant invention be limited to the use of the particular amplifying circuit shown in FIG. 18*a*.

Figure 19A:
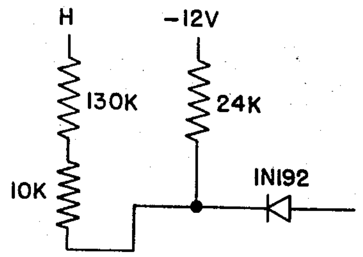
Figure 19B:
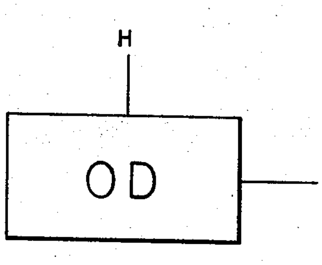

In FIG. 19*a* is shown a portion of the circuit embodiments of the instant invention described herein, which portion is particularly employed to cause a displacement of the numeral "1" as generated by the device of the instant invention and displayed upon the face of the associated cathode-ray tube, whereby the numeral "1" is centered in the middle of the character raster (see FIG. 30*b*) rather than along the right side thereof, thus conducing to easier reading and recognition of the numerals displayed upon the associated cathode-ray tube, or other display device. In FIG. 19*b* is shown the block symbol employed herein to designate the circuit of FIG. 19*a*.

Figure 20A:
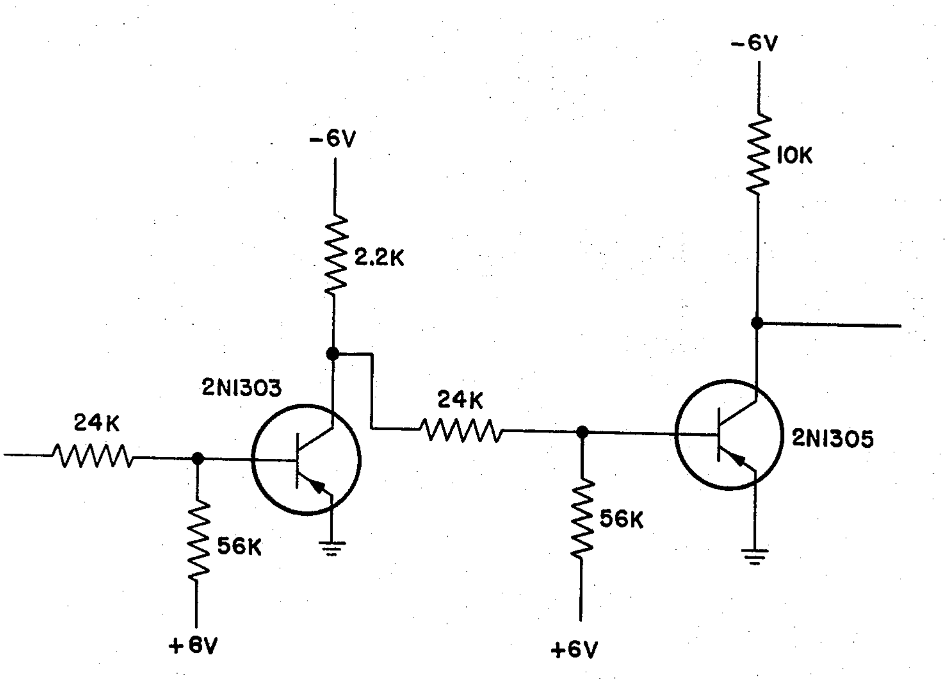
Figure 20B:
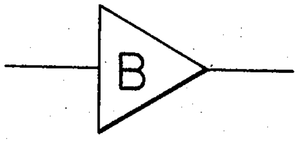

In FIG. 20*a* is shown a multi-stage amplifier circuit employed herein to blank, i.e., suppress the appearance of, certain strokes of the character raster in response to blanking signals provided by the combined inverter gate circuits shown in FIG. 29. In FIG. 20*b* is shown a block symbol employed elsewhere herein to denote the circuit of FIG. 20*a*.

It should be noted that each of the pairs of figures used hereinabove to indicate the meaning of a block symbol, e.g., FIG. 8*a* and FIG. 8*b*, is so arranged that a given lead of the block symbol may readily be identified with the corresponding lead of its corresponding circuit diagram by the direction and placement of these leads. For instance, the leftwardly-projecting group of three leads in FIG. 13*b* may be seen to correspond to the leftwardly-projecting group of three leads in FIG. 13*a*; while the single rightwardly-projecting lead of FIG. 13*b* may be easily identified as corresponding to the single rightwardly-projecting lead of FIG. 13*a*. Similarly, the leftwardly-projecting lead of FIG. 20*b* may easily be identified with the leftwardly-projecting lead (including a 24K resistor) of FIG. 20*a*, while the rightwardly-projecting lead of the block symbol of FIG. 20*b* may easily be identified with the single rightwardly-projecting lead of the circuit diagram of FIG. 20*a*.

FIG. 32*b* illustrates a sawtooth wave generator which is adapted to co-operate with a suitable pulse generator to form a free-running clock circuit. A suitable pulse generator is connected to the sawtooth wave generator in the manner shown in FIG. 31. A pulse generator which has been successfully used in a practical embodiment of the present invention is the TYPE 161 PULSE GENERATOR manufactured by the Tektronix Co., Portland, Oreg., driven by a Type 162 WAVEFORM GENERATOR of the same manufacturer. A pulse train, as seen in FIG. 32*c*, is generated by this pulse generator and comprises a plurality of negativegoing pulses, each having a width of approximately 20 microseconds and a period of approximately 400 microseconds. This pulse train is supplied to input terminal A of the sawtooth wave generator FIG. 32*b*. Referring to FIG. 32*b*, it will be seen that terminal A is connected through a 10K resistor to the base of transistor Q10, so that the PULSE train generated by the Type 161 PULSE GENERATOR is thus applied to the base of transistor Q10.

When input terminal A is at ground potential transistor Q10 does not conduct, since there is no potential difference between the emitter (at ground potential) and the base (at ground potential), i.e., the junction between the base and the emitter is not forward biased. As seen in FIG. 32*c*, the period between the −12 v. pulses generated by the pulse generator is 400 microseconds. Accordingly, it will be apparent that during the 400 microsecond time period between negative pulses transistor Q10 will not conduct. When transistor Q10 is not conducting its back resistance may be considered as infinitely high. Therefore, the −25 v. source will cause the capacitor C1 to commence charging through the 56K and 100 ohm resistors. The time constant of this RC network is such that the .032 microfarad capacitor, C1, will be charged to only twenty percent of the −25 v. charging voltage, or −5 v., during a 400 microsecond period. It is to be noted that the plate of the capacitor C1 which is connected to the base of transistor Q11 is charged so that it is negative with respect to its opposite plate.

When a −12 v. pulse from the pulse generator is fed through the 10K resistor to the base of transistor Q10, the negative voltage at the base of transistor Q10 forward biases the base-emitter junction causing the transistor to conduct heavily. When transistor Q10 conducts, its collector is connected to ground through its very low forward resistance. Thus, when transistor Q10 conducts, capacitor C1, which now has accumulated a charge of −5 v., immediately discharges through a 100 ohm resistor. The voltage at the base of transistor Q11 during the discharge of the capacitor C1 is positive with respect to the −12 v. source connected to the emiter of Q11. Thus, the base-emitter junction of transistor Q11 is forward biased, and Q11 will conduct heavily, or be "turned on." When Q11 is conducting the voltage at its emitter follows the voltage at its base. An output terminal is connected to the emiter of transistor Q11, and the voltage which appears thereat is considered to pe the output, SW, of the sawtooth wave generator. Since Q11 is connected as an emiter follower, the voltage waveform which appears at its base, i.e., the upper terminal potential of capacitor C1, will also appear at its emitter.

The discharge of the capacitor C1 initiated by each 20 microsecond negative-going input pulse at terminal A occurs in a very short time interval: in the present illustration, approximately 3.2 microseconds. This discharge is shown in FIG. 32*d* as the change of the output voltage from −5. v to 0 volts. Since the duration of the input pulse at A is approximately 20 microseconds, it may be seen from FIGS. 32*c* and 32*d* that the discharge of the capacitor is completed before the end of the input pulse.

When the input voltage is at point A, the base transistor Q10, returns to 0 v., transistor Q10 is not forward biased, and thus is cut off. Since Q10 is not conducting, capacitor C1 is again charged by the −25 v. source. During a time period of approximately 400 microseconds the capacitor C1 charges from 0 to −5 v. Transistor Q11 is conducting during this 400 microsecond period, so the 0 v. to −5 v. charging waveform of capacitor C1 will appear at the emitter of transistor Q11. The charging of the capacitor C1 from 0 v. to −5 v. is substantially linear as shown in FIG. 32*d*.

Since a train of −12 v. pulses at 400 microsecond intervals appears at input A of the sawtooth generator, it will be apparent that capacitor C1 will continue to repeatedly discharge from −5 v. to 0 v. in approximately 3.2 microseconds and then charge from 0 v. to −5 v. in 400 microseconds so long as this input is supplied. The discharge and charge waveform of capacitor C1 thus appears at the output terminal SW of the sawtooth wave generator as a wave which has approximately the form shown in FIG. 32*d*.

Figure 2:
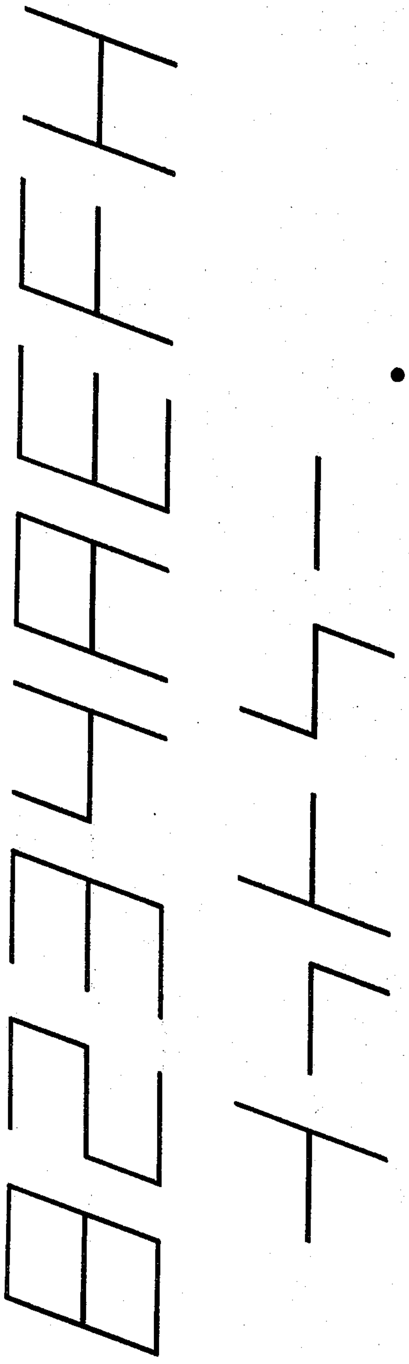
FIG. 2 illustrates some of the symbols which may be generated upon the screen of a cathode-ray display device by the character display signal generator of the instant invention.

In FIG. 2 are shown some of the symbols which the character display signal generating apparatus of the instant invention is capable of displaying, or may be modified to display, upon the screen of a display device. The group of symbols illustrated in FIG. 2 does not include all the symbols which may be generated by the device of the instant invention as shown and described herein, or by such modifications of the embodiments described herein as will be apparent to those skilled in the art upon reading the instant disclosure. As may be seen in FIG. 2, the device of the instant invention, or a suitable modification thereof, is capable of causing a display device to display Arabic numerals, e.g., "8," "2," "3," or "4"; a limited number of letters of the alphabet, such as "A," "E," "F," and "H"; a limited number of arbitrary symbols, examples of which are shown in the lower portion of FIG. 2; mathematical symbols such as the minus-sign; and the period. It will be recognized by those skilled in the art that a slight modification of the embodiments disclosed herein may be easily made in order to produce a centered period, and, similarly, it will be evident to those skilled in the art upon reading the instant disclosure that a plus sign may also be produced by a modification of the embodiments disclosed herein. It will also be evident from FIG. 2 that, while the term "character" is employed at several places herein to designate the symbols which may be displayed upon the display surface of a display device under control of the signal generator of the instant invention, the device of the instant invention is capable of causing the display of a number of entirely arbitrary characters such as shown in the lower portion of FIG. 2 in addition to alphabetic and numeric symbols more commonly designated as "characters." Therefore, it is to be appreciated that the term "characters" as employed herein is employed in its broadest acceptation to include arbitrary signs and symbols, and mathematical symbols, in addition to alphabetic and numeric characters. That is to say, the term "character" and the term "symbol" are used synonymously herein.

FIGS. 3*a*, 3*b*, and 3*c* show, in their left-hand portions, the numerals "8," "3," and "5," respectively, as they will be displayed upon the screen of a display device excited by the character display signal generator of the instant invention. In the right-hand portion of these figures are shown schematic representations of the strokes of the corresponding character rasters which are used to make up these characters. Each stroke is shown by a straight line having a dot at one end thereof. The dot represents the "home" position of the stroke. FIG. 3*a*, of course, represents the entire character raster, no portion of which is blanked. FIG. 3*b* illustrates the manner of blanking two strokes, viz., the left-hand vertical strokes, to display a "3." FIG. 3*c* shows the manner of blanking two strokes to display a "5." It is to be understood, however, that the numerals as displayed upon the display device will resemble the left-hand portions of FIGS. 3*a*, 3*b*, and 3*c*, and *not* the right-hand portions of these figures. The representation of the strokes of the character raster by straight lines having dots at one end thereof should not be taken to imply that the actual strokes displayed upon the display surface of the display device will exhibit bright spots at one end thereof. Rather, the "home position" dot is used merely to indicate the end of a stroke trace at which the tracing begins, each stroke trace being traced from the dot to the other end of the line without the beam lingering at any particular point such that it produces a bright spot, or unaided eye-perceptible non-uniformity, anywhere on the stroke trace.

FIGS. 4 and 5 illustrate the two configurations of the position of the characters which will be produced upon the screen of the display device associated with a device of the instant invention when the switch shown in FIG. 23 is actuated to its 2 x 4 or 1 x 8 position, respectively. That is to say, the display of FIG. 4 would be viewed upon the display device if the readout switch means of FIG. 26 were so set as to connect the vertical 8-digit bus bar to each horizontal column bus bar, and the switch of FIG. 23 were set to its 2 x 4 position. FIG. 5 illustrates the appearance of the display device if the readout switch means of FIG. 26 were set so that all of the horizontal column bus bars were connected to the 8-digit bus bar, and the switch of FIG. 23 were set to its 1 x 8 position. As will be apparent to those skilled in the art from a study of the idealized waveforms of FIGS. 6 and 7, the characters of FIG. 4 will be successively regenerated in a repetitive cycle starting with the upper right-hand character, proceeding to the upper left-hand character, thence to the lower right-hand character, and thence to the lower left-hand character, returning then to the upper right-hand character, etc. The display of FIG. 5 will also, as shown in FIG. 26*b*, be regenerated repetitively and successively, starting each cycle of repetition with the right-hand character, proceeding to the left-hand character, and returning to the right-hand character to repeat the cycle. It will be apparent to those skilled in the art, of course, that during any setting of the readout switch shown in FIG. 26 the characters designated by the setting of this switch will be displayed upon the screen of the display device, and successively regenerated. Thus, with the switches of FIGS. 23 and 26 set as shown in the illustrations, a display will be formed upon the display device as follows:

4632
1118

Were the situation the same, with the exception that the switch of FIG. 23 is set to 1 x 8, the display would read, configured as in FIG. 5, a single horizontal row of characters 11184632 (from the left of the screen to right).

In FIG. 30*a* is shown a plurality of dots corresponding to the "home" positions of the stroke traces which go to make up the character raster of the herein illustrated and described embodiments of the instant invention. These "home" positions are merely given by way of illustration and do *not* constitute specially bright, or even distinguishable, positions on the face of the display device associated with the device of the instant invention.

FIG. 30*b* shows the character raster employed in the herein illustrated and described embodiment of the instant invention. The numerals 1 through 7 set adjacent to the strokes shown in FIG. 30*b* are used when referring to any particular stroke, and also serve, by their numerical order, to indicate the order in which these strokes are traced upon the display surface during the generation of each character raster.

FIG. 30*c* indicates a character "5" as produced by suppression of the strokes numbered 3 and 4 in FIG. 30*b*.

FIG. 1 is a system block diagram alternatively showing two possible embodiments of the instant invention. The embodiments of the instant invention shown in FIG. 1 are arbitrarily divided into nine functional units, each of these functional units corresponding to the structure shown in one subsequent figure of the drawings. Each of said functional units is represented in FIG. 1 by a rectangle, or block symbol, bearing a legend which generally describes the function thereof, and, in parenthesis, the number of the subsequent figure to which it corresponds. The interconnections between the nine rectangles, or block symbols, shown in FIG. 1 may be more specifically identified by consulting the figures indicated in parenthesis in any pair of block symbols. Thus, the six connections shown in FIG. 1 as extending vertically between the rectangle corresponding to FIG. 21 (or FIG. 31) and the rectangle corresponding to FIG. 22 may be identified wth specific structural interconnections by consulting FIGS. 21 (or 31) and 22.

In FIG. 21, at the R edge thereof, is found a plurality of terminals, each of which is designated by a home number, such as 21R1, 21R2, 21R3, etc. Six of these rightwardly extending terminals of FIG. 21, viz., 21R2, 21R3, 21R4, 21R5, 21R6, and 21R7, may be identified as extending from FIG. 21 to FIG. 22 by the remote number 22L placed therebelow. Further, as explained hereinabove, the L in the code designation 22L also indicates that each of these six terminals extends to some terminal found on the L edge of FIG. 22. Going, then, to the L edge of FIG. 22, it may be seen that each of the leftwardly extending terminals of FIG. 22 is connected to one of the six terminals of FIG. 21 below which is placed the remote number 22L. Thus, for example, the leftwardly extending terminal of FIG. 22 having the home number 22L1 placed thereabove has the remote number 21R2 placed therebelow, indicating that it (i.e., 22L1) is linked to the terminal at the R edge of FIG. 21 which has the home number 21R2 placed thereabove. Similarly, since each of the leftwardly extending terminals found at the L edge of FIG. 22 has a remote number placed therebelow comprising the designation 21R, it may be seen that each of the leftwardly extending terminals found at the L edge of FIG. 22 is connected to one of the six above-mentioned terminals found at the R edge of FIG. 21, each having the remote number 22L placed therebelow.

As an additional example, the single lead shown in the lower central portion of FIG. 1 extending from the rectangle corresponding to FIG. 28 may be identified with specific structure by consulting FIGS. 27 and 28. Going, then, to FIG. 27, it may be seen that the only terminal thereon having a "remote" number whose first term is 28 is the upper, right-hand terminal having the "home" number 27R1. This terminal 27R1, then, is the only terminal of FIG. 27 connected directly to FIG. 28, and, thus, must be one terminal of the link extending from FIG. 27 to FIG. 28 shown in FIG. 1. The point at which this terminal, 27R1, is connected to structures found in FIG. 28 may be determined by finding the remote number in FIG. 28 having 27 as its first term. The terminal of FIG. 28 having this remote number has the home number 28L5 and is found at the lower end of the L edge thereof. The correctness of this interconnection may be confirmed by the fact that the remote number 27R1 is placed therebelow. Thus, it may be determined by inspection of FIGS. 27 and 28 that the single lead shown in FIG. 1 as extending from the rectangle corresponding to FIG. 27 to the rectangle corresponding to FIG. 28 is a link between the input of gate 27–1 of FIG. 27 and the input of the inverter 28–1 found in the lower left-hand corner of FIG. 28. The interconnections between the rectangles corresponding to FIGS. 22, 24, and 29 shown in FIG. 1 may also be found to represent specific structural interconnections by reference to FIGS. 22, 24, and 29. Going, then, to the R edge of FIG. 22, it will be noted that each one of the seven terminals shown thereat has at least two remote numbers set therebelow, one of which includes the first term 29. Thus, the seven terminals at the R edge of FIG. 22 must correspond to the seven terminals shown in FIG. 1 at the bottom edge of the rectangle, or block symbol. Similarly, it will be found that the terminals at the L edge of FIG. 24, having the home numbers 24L2 through 24L8 and the remote numbers 22R1 through 22R7 correspond to the seven terminals shown in FIG. 1 at the top edge of the rectangle corresponding to FIG. 24. From the above examples, it may be seen that each of the interconnections shown in FIG. 1 may be identified with structural interconnection in the embodiments corresponding to FIG. 1 which are shown in detail in FIGS. 21 through 26, 27 through 29, and 31. The output leads of the embodiment shown in FIG. 1 are found at the bottom of FIG. 1 and may be identified by the arrowheads appended thereto. As seen in FIG. 1, these three output terminals are labelled respectively HORIZ. DEFL. SIG., VERT. DEFL. SIG., and BLANKING SIG. The first two of these three output leads may be seen from FIG. 1 to emanate from the rectangle identified with FIG. 28. Therefore, the structural connection of these two output leads to the specific structure of this embodiment may be determined by reference to FIG. 28. Going, then, to FIG. 28, it will be seen that the HORIZ. DEFL. SIG. output terminal is connected directly to the output of the horizontal deflection amplifier, while the VERT. DEFL. SIG. output terminal is connected directly to the output of the vertical amplifier, the output terminals having the home numbers 28R2 and 28R1, respectively. Similarly, the BLANKING SIG. output terminal may be seen from FIG. 1 to emanate from FIG. 29. FIG. 29 shows that this output terminal is connected directly to the output of the blanking amplifier, and has the home number 29R1. These three output leads, may, of course, be connected to any well-known oscilloscope, or cathode-ray tube driving circuit, in the manner that will be apparent to those having ordinary skill in the art. An example of such a well-known oscilloscope is the Tektronix Model No. 321, referred to hereinabove. Having thus connected an oscilloscope, or other cathode-ray tube driving circuit, to the device of this embodiment, one may then display thereupon a plurality of numeric symbols, selected by the actuation of the readout switch referred to in FIG. 26. The plurality of characters are disposed in one of two selectable register arrangements by the actuation of the switch shown at the top of FIG. 23. From the above, it may be seen that the circuit structures of FIGS. 21 through 26, 27 through 29 and 31 mutually interconnected as indicated in FIG. 1 constitute a complete embodiment of the instant invention, capable of producing a numeric character display upon the screen of an associated cathode-ray tube.

Turning now to FIG. 21, the manner in which the circuit shown in this figure functions to generate timing signals is as follows: the flip-flop labeled "0" shown at the top of FIG. 21 coacts with the sweep generator also shown at the top of FIG. 21 to constitute a free-running clock circuit, which produces a rectangular pulse train at its Q output terminal and a sweep signal (a triangular wave in the first embodiment) at its SW terminal. The waveform of the rectangular wave is shown in FIG. 7*b* wherein it is identified by the term "CLOCK PULSES." The waveform of the sweep signal is shown in FIG. 7*a* wherein it is identified by the number "21R1." The rectangular pulse train produced at the Q terminal is applied to the complementing input of the first flip-flop in the driver chain comprising the flip-flops labelled 7–1, 7–2, 7–4, 8–1, 8–2, and 8–4, respectively. The flip-flops of this chain are connected in a manner well-known to those skilled in the art, as shown in FIG. 21. Thus, successive alternate transitions of the rectangular pulse train produced at output Q of the clock generator cause the flip-flops of the counter to produce rectangular pulse train outputs which, when inverted, constitute the timing signals on terminals 21R2 through 21R16. These timing signals are illustrated by the waveforms shown in FIG. 7*b*. These timing signals are utilized, as described hereinbelow, to time and synchronize the operation of the remaining portions of the circuit of this embodiment.

The three flip-flops at the left-hand side of FIG. 21 which are labeled 7–1, 7–2, and 7–4, respectively, are so labeled because they constitute, when taken together, a subcircuit which may be thought of as a seven-count counter, that is to say, successive alternate transitions of the rectangular pulse train produced by the clock generator at the top of FIG. 21, as applied to the T terminal of the 7–1 flip-flop, cause these three flip-flops to successively assume the following states:

Q TERMINAL OF COUNTER

| Decimal Equivalent | 7–1 | 7–2 | 7–4 |
|---|---|---|---|
| 0 | 0 v. | 0 v. | 0 v. |
| 1 | −6 v. | 0 v. | 0 v. |
| 2 | 0 v. | −6 v. | 0 v. |
| 3 | −6 v. | −6 v. | 0 v. |
| 5 | −6 v. | 0 v. | −6 v. |
| 6 | 0 v. | −6 v. | −6 v. |
| 7 | −6 v. | −6 v. | −6 v. |
| 0 | 0 v. | 0 v. | 0 v. |

As will be apparent to those skilled in the art upon inspection of this tabulation, the first four states, or lines, of this tabulation correspond to the usual progression of a well-known three-stage binary counter, taking 0 v. to be binary "0" and −6 v. to be binary "1." The transition between the fourth and fifth tabulated stages (shown by the horizontal dashed line), however, does *not* follow the usual progression of a binary counter. Rather, this transition between the fourth and fifth states of the 7-counter (i.e., the 7–1, 7–2, and 7–4 flip-flops) is equivalent to a "skip," or "jump," from a decimal equivalent 3-count in a conventional binary counter to a decimal equivalent 5-count in a binary counter. The remaining progression of states shown in the tabulation follows the usual progression in the well-known binary counters, the last state tabulated constituting a return to the first, or "0" state of the first line of the tabulation. Thus, it may be seen that flip-flops 7–1, 7–2, and 7–4 of FIG. 21 constitute a binary counter specially adapted to "skip" the binary state equivalent to the decimal "4."

This "skip" is brought about by the circuit at the L edge of FIG. 21, which is connected to the $\overline{Q}$ terminal of flip-flop 7–4 and to the QB terminal of flip-flop 7–1, and which comprises two resistors, a capacitor, and a diode, the values of the resistors and capacitor and the type-number of the diode being indicated in FIG. 21. This "skip 4" circuit is not to be understood to constitute a critical, or limiting, feature of the instant invention, and its operation wil be apparent to those having ordinary skill in the art from a study of the above tabulation. Briefly, this "skip 4" circuit operates as follows: when the counter is in the decimal "3" state, the Q terminals of flip-flops 7–1, 7–2 and 7–4 have the voltage levels −6 v., −6 v. and 0 v. (see the tabulation). Hence, the $\overline{Q}$ terminal of flip-flop 7–4 has the voltage level of −6 v. This means that the 1500 micromicrofarad condenser of the "skip 4" circuit contains a charge such that the left-hand plate is relatively positive with respect to its right-hand plate. If the "skip 4" circuit is momentarily disregarded, flip-flops 7–1, 7–2 and 7–4 may be considered as a binary counter and a rectangular pulse from the clock circuit at the complementing input of flip-flop 7–1 would then place the counter in the decimal 4 state. The Q terminals of flip-flops 7–1, 7–2 and 7–4 would then have voltage levels 0 v., 0 v. and −6 v., respectively, and the $\overline{Q}$ terminal of flip-flop 7–4 would be at voltage level 0 v. With the "skip 4" circuit in operation, however, and the potential on the $\overline{Q}$ terminal at 0 v., the left-hand terminal of the capacitor will, before the capacitor discharges, go to a potential considerably positive with respect to ground. This positive excursion will be of short duration as compared with the width of the rectangular pulses making up the rectanguar pulse trains produced by the 7–1 flip-flop. That is to say, for purposes of comparison with the waveforms produced b ythe other portions of the 7-counter, the signal appearing at the left-hand terminal of the condenser, when the $\overline{Q}$ terminal of flip-flop 7–4 changes potential from −6 v. to 0 v., may be thought of as a positive-going "spike." This positive-going "spike" is, of course, applied to the plate of the 1N90 diode, and, thus, to the QB terminal of the 7–1 flipflop. Since, as shown in FIG. 8*a*, the QB terminal is tied directly to the base of the Q transistor of flip-flop 7–1 whose colelctor is tied to the Q output. This "spike" will immediately cause the 7-counter to "skip" to the decimal equivalent "5" state (the fifth tabulated state), since it will cut off conduction in the Q transistor of the 7–1 flip-flop, thus bringing the Q output of the 7–1 flip-flop to −6 v. (and the $\overline{Q}$ output to ground). Summarizing, it may be seen that this "skip 4" circuit operates to force the 7-counter to "skip" from the decimal 3 state (see tabulation) to the decimal 5 state.

The Q output of the 7–4 flip-flop drives the complementary (T) input of the 8–1, 8–2, 8–4 counter in the manner indicated in FIG. 21. Thus, it may be seen that the driver chain of FIG. 21 serves to produce the following timing signals:

Rectangular waves corersponding to the progressions of levels shown in the columns of the above tabulation (Q terminals of flip-flops 7–1, 7–2 and 7–4); the complements of these signals produced at the $\overline{Q}$ terminals of flip-flops 7–1, 7–2 and 7–4; a binary set of rectangular pulse train signals whose decimal equivalent corresponds to a count of the positive-going transitions at the Q terminal of the 7–4 flip-flop (Q terminals of flip-flops 8–1, 8–2, and 8–4); and the complements of said binary set of rectangular pulse train signals ($\overline{Q}$ terminals of flip-flops 8–1, 8–2, and 8–4).

In addition, rectangular pulse trains are produced at the 21R10, 21R13, and 21R16 terminals which correspond in timing and relative level, though not necessarily in amplitude, to the binary count signals produced at terminals 21R8, 21R11, and 21R14, respectively.

The sawtooth wave generator shown in FIG. 21 as a rectangle with three terminals labeled Q, QB and SW produces at output SW a sweep signal having a periodic triangular waveform (see waveform 21R1 in FIG. 7). The circuit of the sawtooth wave generator is illustrated in FIG. 16*a*. As seen in FIG. 21, the sweep signal appears at home terminal 21R1. The remote terminal, 24L1, indicates that the sweep signal is applied to a terminal, located at the left edge of FIG. 24 near the top of that figure.

From the above, it may be seen that the circuit structure shown in FIG. 21 functions effectively to produce timing signals and a sweep signal, as stated in the corresponding rectangle in FIG. 1.

Referring to FIGS. 1, 21, and 22, it may be seen that there are six terminals of FIG. 21 linked to one or more terminals of FIG. 22. Looking at FIG. 21, the terminals having a remote number whose first term is 22 are 21R2, 21R3, 21R4, 21R5, 21R6 and 21R7. The signals on all six of these terminals originate at the 7–1, 7–2 and 7–4 flip-flops, i.e., the 7-count counter. The signals on terminals 21R2, 21R4 and 21R6 originate at the $\overline{Q}$ terminals of flip-flops 7–1, 7–2 and 7–4, respectively; while the signals on terminals 21R3, 21R5 and 21R7 originate at the Q terminals of flip-flops 7–1, 7–2 and 7–4, respectively. Inverters I–9 invert each of the 7-flip-flop output signals so that the inversions, or complements, of the 7-flip-flop output signals appear at the corresponding subfigure terminals (e.g., the flip-flop 7–4–$\overline{Q}$ signal appears inverted at the 21R6 terminal).

The circuit of FIG. 22 is provided for converting timing signals produced by the timing and sweep signal generating means of FIG. 21 into a plurality of trains of pulses of substantially equal width and repetition rate, each train appearing upon one of the R terminals of FIG. 22 and having its pulses interspersed with those of the other trains appearing at the R terminals of FIG. 22 in the manner shown in the upper portion of FIG.

7. Such a set of interspersed pulse trains will hereinafter at some places be termed a "commutated set," "a commutated set of pulses," "a commutated set of pulse trains," "a commutated set of signals," or the like.

The circuit of FIG. 22 comprises gating means each of which is coupled to inverting means so that timing signals received from the timing signal and sweep signal generating means are converted into a commutated set of pulses, and the loading effects of the gating means compensated. The pulses of the commutated set of pulse trains appearing at the R terminals of FIG. 22 are sometimes called "stroke pulses" herein, for reasons that will become apparent hereinafter. More particularly, it will be seen in FIG. 22 that gating means is provided in the form of a bank of seven AND gates, designated 22–1, 22–2, 22–3, 22–4, 22–5, 22–6, and 22–7. The block symbol for each of the seven AND gates is G–13 and one corresponding embodiment of a circuit which has been successfully used in the practice of the present invention is illustrated in FIG. 13*a*. Each of the gating means, G–13, is provided with a plurality of inputs, which plurality, in the present instance, is three, these inputs being selectively connected in a predetermined manner to certain outputs of the timing signal and sweep signal generating means of FIG. 21 for receiving thereon timing signals occurring in a predetermined manner.

An inverting means in the form of an inverter, designated oy the block symbol I–11, is coupled to the output of each AND gate G–13 for inverting the signal produced by the gating means. An inverter circuit for the inverter I–11 is illustrated in FIG. 11*a* but it will be well recognized by those skilled in the art that other equivalent inverter circuits may easily be substituted for the particular circuit illustrated.

As an illustrative example of the manner in which the conversion means shown in FIG. 22 operates to convert timing signals into commutated stroke pulses, the combination of the AND gate 22–1 and its associated inverter I–11 will be examined in detail. The three inputs of the AND gate 22–1 are 22L1, 22L2 and 22L3, and have the remote numbers of 21R2, 21R4, and 21R6, respectively. It will be seen from an inspection of FIG. 21, that these terminals receive timing signals emanating from the 7–1–$\overline{Q}$, 7–2–$\overline{Q}$, 7–4–$\overline{Q}$ terminals of the 7-count counter of FIG. 21, and inverted by I–9 type inverters.

It will be apparent from an inspection of the diagrams of FIGS. 13*a* and 11*a* that the output terminal 22R1 of FIG. 22 will have an output signal of −6 v. only when the significant level of the three input voltages on the input terminals 22L1, 22L2 and 22L3 of gate 22–1 is 0 v. When any other combination of allowable voltages, such as −6 v., −6 v., −6 v.; 0 v., −6 v., 0 v.; 0 v., 0 v., −6 v.; etc., are received by the AND gate 22–1, the potential level of the output terminal 22R1 of the associated inverter I–11 will be at 0 v.

The timing signals 7–1–$\overline{Q}$, 7–2–$\overline{Q}$, and 7–4–$\overline{Q}$ from the 7-count counter of FIG. 21 will have a voltage level of −6 v. during a predetermined period of time which will be designated, for reasons which will be hereinafter set forth more fully, as stroke period 1. After inversion by inverters I–9, the signals from 7–1–$\overline{Q}$, 7–2–$\overline{Q}$ and 7–4–$\overline{Q}$ will have a voltage level of 0 v. during stroke period 1. Thus, during stroke period 1, the three inputs to the AND gate 22–1 will have a voltage level of 0 v. and the output potential at terminal 22R1 will be −6 v. The three inputs to each of the other six AND gates of the conversion means illustrated in FIG. 2 are selected so that at least one thereof has a −6 v. level during stroke period 1. Thus, during stroke period 1 the output terminal 22R1 of the inverter I–11 connected to the AND gate 22–1 is at −6 v. and the output voltage of each of the other six inverters I–11 of the conversion means, which appears at the six output terminals 22R2, 22R3, 22R4, 22R5, 22R6 and 22R7, will be at 0 v. during stroke period 1.

Similarly, the three inputs from FIG. 21, 21R3, 21R4 and 21R6, to the AND gate 22–2, each have a voltage level of 0 v. immediately following stroke period 1. These inputs to the AND gate 22–2 remain at 0 v. for a predetermined period of time which is equal to the time interval of stroke period 1 and which will be designated as stroke period 2. During stroke period 2, at least one of the three inputs of each of the other AND gates 22–1, 22–3, 22–4, 22–5, 22–6 and 22–7 is at a voltage level of −6 v. During the second stroke period, the voltage level at terminal 22R2, which is the output terminal of the portion of the conversion means which includes the AND gate 22–2, will be at −6 v. and the voltage at the other output terminals 22R1, 22R3, 22R4, 22R5, 22R6 and 22R7 will be 0 v. Following stroke period 2, the stroke periods 3, 4, 5, 6 and 7 occur, each stroke period having a time period substantially equal to the time period of stroke periods 1 and 2. The voltage levels at terminals 21R1 through 21R6 during the seven stroke periods is clearly illustrated in the following chart:

VOLTAGE LEVELS AT R TERMINALS (FIG. 22) VERSUS STROKE PERIOD

| Terminal | Stroke Period | | | | | | |
|---|---|---|---|---|---|---|---|
| | 1 | 2 | 3 | 4 | 5 | 6 | 7 |
| 22R1 | −6 v. | 0 v. | 0 v. | 0 v. | 0 v. | 0 v. | 0 v. |
| 22R2 | 0 v. | −6 v. | 0 v. | 0 v. | 0 v. | 0 v. | 0 v. |
| 22R3 | 0 v. | 0 v. | −6 v. | 0 v. | 0 v. | 0 v. | 0 v. |
| 22R4 | 0 v. | 0 v. | 0 v. | −6 v. | 0 v. | 0 v. | 0 v. |
| 22R5 | 0 v. | 0 v. | 0 v. | 0 v. | −6 v. | 0 v. | 0 v. |
| 22R6 | 0 v. | 0 v. | 0 v. | 0 v. | 0 v. | −6 v. | 0 v. |
| 22R7 | 0 v. | 0 v. | 0 v. | 0 v. | 0 v. | 0 v. | −6 v. |

As can be seen from the above chart, a −6 v. pulse successively appears at terminals 22R1, 22R2, 22R3, 22R4, 22R5, 22R6 and 22R7 of the conversion means illustrated in FIG. 22 during stroke periods 1, 2, 3, 4, 5, 6 and 7, respectively. Thus, a negative pulse signal appears in time sequence at an output terminal of the conversion means in a predetermined timed sequence.

Examples of these commutated signals are also shown in the waveforms which appear on FIG. 22 adjacent to the portions of the circuit in which they appear. The waveforms appearing at terminals 22R1 through 22R7 are also illustrated in the upper portion of FIG. 7. The waveform at terminal 22R1 is designated in FIG. 7 by the number 22R1; the waveform appearing at terminal 22R2 is similarly denoted in FIG. 7 by the number 22R2, and the waveforms which appear at the other 22R terminals are similarly identified.

Thus, it has been clearly shown in connection with FIG. 22 how timing signals generated by the timing signal and sweep signal generating means of FIG. 21 are converted into commutated signals, or stroke pulses, as stated in the corresponding rectangle in FIG. 1.

FIG. 24 shows means for steering the sweep signal appearing on terminal 21R1 to one of the two amplifying means associated respectively with the horizontal and vertical deflection means of the display device. In the illustrated embodiments of the instant invention, this means takes the form of first gating means, each of which has two inputs, one for receiving stroke pulses from the stroke timing signal conversion means of FIG. 22, and the other connected to output 21R1 of the timing signal and sweep signal generating means for receiving a sweep signal. A second gating means is coupled to said first gating means and is provided with two outputs. One output yields a signal which will ultimately be transmitted to the horizontal deflection means of a cathode-ray display device and the other output yields a signal which will ultimately be transmitted to the vertical deflection means of said display device.

More particularly, the first gating means of said sweep signal steering means (FIG. 24) comprises a plurality of AND gates which, in the present instance, are the seven AND gates 24–1 through 24–7. Each of the AND gates 24–1 through 24–7 is designated by the block symbol G–14. FIG. 14a illustrates a circuit for the AND gate G–14 which has been successfully used in the practice of the present invention, although it will be readily apparent to those skilled in the art that other equivalent AND gate circuits could be easily substituted therefor.

The inputs of the seven AND gates 24–1 through 24–7 comprise the seven sequentially timed stroke pulses appearing at terminals 22R1 through 22R7 of FIG. 22 and the sweep signal SW appearing at the output terminal 21R1 of FIG. 21. The stroke pulses appearing at terminals 22R1 through 22R7 are applied in a predetermined manner to the inputs 24L2 through 24L8. The stroke pulse appearing at the output terminal 22R1 of the stroke timing signal conversion means is transmitted to the input terminal 24L2 of the AND gate 24–1. Similarly, the output terminal 22R2 of the stroke timing signal conversion means is transmitted to the input terminal 24L3 of the AND gate 24–2. The output terminals 22R3 through 22R7 are then connected in a similar manner in descending order to the input terminals 24L4 through 24L8 of FIG. 24.

The sweep signal generated by the timing signal and sweep generating means appears at terminal 21R1 in FIG. 1 and is applied to the input 24L1 which directs the sweep signal to an input of each of the seven AND gates 24–1 through 24–7 of FIG. 24. Thus, each of the seven AND gates 24–1 through 24–7 in FIG. 24 is provided with two inputs: a stroke pulse and a sweep signal.

Referring to the circuit of the AND gate G–14 which is illustrated in FIG. 14a, it will be readily apparent that it is only when both of the input voltages to the gate G–14 have the significant level of −6 v. that the output will be −6 v. When the two input voltages to G–14 are any other combination of allowable voltages such as −6 v., 0 v.; 0 v.; −6 v.; or 0 v., 0 v., the output will be 0 v. Thus, the outputs of all of the gates 24–1 through 24–7 will be 0 v., except for the gate having a stroke pulse, as per waveforms 22R1 through 22R7 in FIG. 7, at its lower input. This gate will pass the sweep signal (see waveform 21R1 in FIG. 7) received from the sawtooth generator of FIG. 21 to its output terminal.

Referring to FIG. 7a, the waveform of the output of each of the AND gates 24–1 through 24–7 is illustrated. During stroke period 1, the outupt of the AND gate 24–1 starts at 0 v., changes voltage substantially instantaneously to −6 v., rises linearly to 0 v., returns linearly to −6 v., and then changes voltage substantially instantaneously to 0 v. and remains at 0 v. through the remaining six stroke periods. Similarly, throughout the other six stroke periods, the output of at least one of the AND gates 24–2 through 24–7 drops instantaneously to −6 v. from 0 v., rises linearly to 0 v., and returns linearly to −6 v. before again rising instantaneously to 0 v. during a specific stroke period.

The second gating means of the sweep signal steering means comprises a pair of AND gates 24–8 and 24–9. The block symbol for each of the AND gates 24–8 and 24–9 is G–15 and a suitable wiring diagram for this AND gate is illustrated in FIG. 15a. The outputs from selected ones of the AND gates 24–1 through 24–7 are connected to the inputs of the AND gate 24–8 and the AND gate 24–9 in a predetermined manner. As will be seen in FIG. 24, the AND gates 24–2, 24–3, 24–4 and 24–5 of the first gating means are connected to the AND gate 24–8. Also, the AND gates 24–1, 24–6 and 24–7 of the first gating means areconnected to the AND gate 24–9 of the second gating means. The output of the AND gate 24–8 appears at terminal 24R1 of FIG. 24. The waveform of the output signal passed by AND gate 24–8 is seen in FIG. 7a (that particular waveform is designated by the home terminal number 24R1). Similarly, the output of AND gate 24–9 of the second gating means appears at terminal 24R2 of FIG. 24. The waveform of the output signal of gate 24–9 is also seen in FIG. 7a wherein it is designated by the number 24R2. When FIG. 15a is examined, it will be seen that AND gate 24–8 has a 0 v. output, only when all four of the inputs thereto from the first gating means are also at 0 v. When any other combination of inputs exists, the output of AND gate 24–8 will be the more negative input voltage. That is to say, that when the voltage level of any one of the inputs is a negative voltage, the output of the AND gate 24–8 will be that negative voltage. When any one of the inputs to the AND gate 24–8 is at −6 v. or when all of the inputs to the AND gate 24–8 are at −6 v., then the output of this AND gate will be −6 v. The AND gate 24–9 of the second gating means similarly has an output of 0 v. only when all three inputs are at 0 v. The waveforms illustrating the output of the gates 24–8 and 24–9, are designated 24R1 and 24R2 in FIG. 7a.

The output of the sweep signal steering means which appears at the output terminal 24R1, is coupled to the vertical deflection means of the cathode-ray display device in a manner which will hereinafter be set forth more fully. Similarly, the other output of the sweep signal steering means, which appears at terminal 24R2, is coupled to the horizontal deflection means of the cathode-ray display device. Thus, it is apparent that the circuit of FIG. 24 provides a sweep signal steering means which serves to steer the sweep signal SW generated by the signal generator of FIG. 21 to one of two outputs, one of which is associated with the horizontal, and one with the vertical deflection means of the cathode-ray display device. During stroke periods 1, 6 and 7 the sweep signal is directed to the horizontal deflection means and during stroke periods 2, 3, 4 and 5 to the vertical deflection means. These particular sweep signals are used in deflecting the cathode-ray of the cathode-ray display device according to a predetermined character raster which, in the illustrated embodiment of the present invention, resembles the numeral "8."

A summing and weighting means is provided for receiving timing signals generated by the timing signal and sweep signal generating means, stroke pulses produced by the stroke timing signal conversion means, and sweep signals passed by the sweep signal steering means and producing a pair of deflection signals which are transmitted to the vertical and horizontal deflection means of an associated cathode-ray display device for tracing a plurality of character rasters in a predetermined symbol display. In an embodiment of the present invention illustrated in the drawings, this means takes the form of a summing network which combines signals received from the timing and sweep signal generating means, the stroke timing signal conversion means, and the sweep signal steering means in a manner to produce two deflection signals which, when amplified and applied to the horizontal and vertical deflection means of a cathode-ray display device, deflect the cathode-ray or electron beam of the device to scan a predetermined display raster. In the present embodiment a seven-stroke character raster, as shown in FIG. 30b, is provided by the horizontal and vertical deflection signals deflecting a cathode-ray beam in a manner which will be set forth in more detail hereinafter. A plurality of character rasters are thus provided in a predetermined configuration, or display raster. In the present embodiment of the invention, two alternate display raster configurations are provided. One display raster configuration provides two rows of character rasters which are formed in four columns, each row having four character rasters. The four character positions defined by the upper row of character rasters are in substantial vertical alignment with the four character positions defined by the lower row of character rasters. The other display raster configuration provides a single row of eight substantially aligned character positions, each of which is defined by a character raster.

More particularly, the summing and weighting network comprises two separate adding means: a first adding means which includes gating means and emits a vertical deflection signal, and a second adding means which includes gating means and emits a horizontal deflection signal. The inputs to the first adding network which are connected to the stroke timing signal conversion means are terminals 23L4, 23L5, 23L6, and 23L7. An input is also received from the sweep signal steering means at terminal 23L10. The gating means of the first adding network is biased by a +6 v. source which is connected to the adding network through a 10K ohm resistance. A timing signal may also be received via terminal 23L1 from the timing signal and sweep signal generating means according to the particular display raster configuration desired. A switching means is provided to selectively connect said timing signal to either the first or second adding network. In the present embodiment, a two position switch is provided to selectively connect said timing signal, which is the Q output of the 8–4 flip-flop of the timing signal and sweep signal generating means, to either of the two adding networks according to the particular display raster configuration desired.

Assuming that the switching means is placed in the position shown in FIG. 23, it will now be shown how the illustrated summing network operates to produce the deflection signal components resulting in a 2 x 4 display raster. The inputs to the vertical summing network are terminals 23L1, 23L4, 23L5, 23L6, 23L7, 23L10, and the +6 v. biasing voltage. The input terminal 23L1 is connected to the output terminal 21R16 of the timing and sweep signal generating means illustrated in FIG. 21. The waveform of the signal appearing on this input terminal is illustrated in FIG. 6 (denoted by the number 21R16) and in FIG. 7*b* (see "OUTPUT OF 8–4–Q"). It is seen that the voltage level of this signal changes every four character periods. The input terminal 23L4 is connected to terminal 22R1 of the stroke timing signal conversion means. The waveform of the signal appearing at the input terminal 23L4 is shown in FIG. 7 and identified by the number 22R1. A stroke pulse, thus, appears at the input 23L4 during the first stroke period. The input 23L4 is connected to the output 23R1 by a gating and weighting means comprising a suitable diode and a resistor. The input terminals 23L5, 23L6 and 23L7 are connected respectively to the output terminals 22R4, 22R5, and 22R7 of the stroke timing signal conversion means. The waveforms of the signals which appear at these input terminals are illustrated in FIG. 7 and are identified by the numbers 22R4, 22R5, and 22R7. These input terminals receive stroke pulses during the fourth, fifth, and seventh stroke periods. The inputs 23L5, 23L6, and 23L7 are connected to output 23R1 through a suitable gating and weighting means comprising a plurality of diodes and in a resistor having one of its terminals connected directly to the plates of the diodes. The input terminal 23L10 of this portion of the summing network is connected to the output terminal 24R1 (see FIG. 24) of the sweep signal steering means. The waveform of the signal received at this terminal is illustrated in FIG. 7*a* and is identified by the number 24R1. It will be seen that a sweep signal occurs during the second, third, fourth, and fifth stroke periods.

As the circuit appears, the signals received at the heretofore identified input terminals of the vertical summing network comprises, (a) stroke pulses which occur at stroke periods 1, 4, 5, and 7, (b) a timing signal which changes voltage level every four character periods, and (c) a sweep signal which occurs during stroke periods 2, 3, 4 and 5. These signals are weighted and summed to produce an output signal which appears at the output terminal 23R1. The waveform of the output signal which appears on this terminal is identified in FIG. 7*a* by the number 23R1.

Referring to the horizontal summing network of FIG. 23, it will be seen that in the present illustration the switching means does not connect the input terminal 23L1 to this portion of the network. The input terminals of this portion of the network are 23L2, 23L3, 23L8, 23L9 and 23L11. A suitable biasing source of +6 v. is also connected to the lower end of the horizontal summing network through a 5K ohm resistor. The input terminal 23L2 is connected to the output terminal 21R13 of the timing signal and sweep signal generating means of FIG. 21. The waveform of this signal, which is the output signal appearing at the Q terminal of flip-flop 8–2, is shown in FIG. 6 (denoted by the number 21R13) and in FIG. 7*b* (see "OUTPUT OF 8–2–Q"). It will be noted that the voltage level at the Q terminal of flip-flop 8–2 changes every two character periods. The input terminal 23L2 is connected through a suitable weighting resistor of 12 kilohms to the output terminal 23R2. The input terminal 23L3 is connected to the output terminal 21R10 of the timing signal and sweep signal generating means illustrated in FIG. 21. This signal, which is the output signal appearing at the Q terminal of flip-flop 8–1 of FIG. 21, is illustrated in FIG. 6 (identified by the number 21R10) and FIG. 7*b* (see "OUTPUT OF 8–1–Q"). An examination of this waveform reveals that the potential level of the signal changes every character period. This signal appears at the input terminal 23L3 which is connected through a suitable weighting resistor to the output terminal 23R2. The input terminals 23L8 and 23L9 are connected to the output terminals 22R2 and 22R4 of the stroke timing signal conversion means. The waveforms of these signals are illustrated in FIG. 7 wherein the particular signals are identified by the remote terminal numbers 22R2 and 22R4. Stroke pulses occurring during the second and fourth strokes appear at these terminals. These terminals are connected through a suitable weighting and gating means, comprising a pair of diodes having their plates connected to one end of a weighting resistor of 68 kilohms, and thence to output terminal 23R2.

The input terminal 23L11 is connected to the output terminal 24R2 of the sweep signal steering means for receiving a sweep signal from FIG. 24, during the first, sixth, and seventh stroke periods. The waveform of the signal appearing at 23L11 is shown in FIG. 7*a* and identified by the remote terminal number 24R2. The weighting and summing of the signals received on the input terminals of this portion of the summing network results in a signal that appears at the output terminal 23R2 and which is identified in FIG. 7*a* by the home number 23R2.

It is evident that when placed in the 2 x 4 position the switching means of FIG. 23 directs the 8–4–Q timing signal from the timing signal and sweep signal generating means to the portion of the adding network associated with the vertical deflection means of the cathode-ray display device. Thus, after the first four character periods during which the character raster appears in successive positions moving from right to left across the screen of the display device, the fifth through eighth position of the character raster will appear immediately below the first four positions of the raster in the four columns. Thus, the fifth position appears below the first position, the sixth position appears below the second position, etc.

When the switch means is connected to the portion of the adding network of FIG. 23 which is associated with the horizontal deflection means, the signal from the Q terminal of the gate 8–4 of FIG. 21 is added to the horizontal deflection signal so that after the first four character rasters have been formed moving from right to left, the fifth through eighth character rasters are then formed along the same horizontal line across the screen of the cathode-ray display device.

It has clearly been shown in the discussion of the circuit of FIG. 23 how timing signals, stroke pulses, and sweep signals have been weighted and summed to produce a pair of deflection signals, which when applied to the horizontal and vertical deflection means of an associated cathode-ray display device deflect the cathode-ray beam along a predetermined character raster in a plurality of character positions.

An amplifying means is provided for amplifying the output signals of the summing and weighting means of FIG. 23 prior to application of said signals to the horizontal and vertical deflection means of an associated cathode-ray display device. In the present embodiment of the invention, this amplifying means comprises an amplifier which amplifies a vertical deflection signal and an amplifier which amplifies a horizontal deflection signal, the amplified signals then being transmitted to a display device. More particularly, an amplifier, for which the block symbol is a triangle enclosing a "V," as seen in FIG. 17*b*, is provided with a single input and a single output. The circuit diagram of an amplifier which may be used in the practice of this invention is seen in FIG. 17*a*. The amplifier V has an input terminal 28L1 (see FIG. 28) which is coupled to the output terminal 23R1 of FIG. 23 for receiving a vertical deflection signal from said summing and weighting means. This vertical deflection signal is suitably amplified by the amplifier V and appears at the output terminal 28R1 for application to the vertical deflection means of a display device.

A suitable amplifier for amplifying a horizontal deflection signal received from the summing and weighting means of FIG. 23 is illustrated by the block symbol shown in FIG. 18*b*, wherein a triangular block is shown with an H disposed therein. A wiring diagram for the amplifier H is illustrated in FIG. 18*a*, although it will be readily apparent to those skilled in the art that other equivalent amplifiers could be also used. The amplifier H has an input 28L2 (see FIG. 28) which is coupled to the output 23R2 of the weighting and summing means for receiving a horizontal deflection signal. This signal is suitably amplified and appears at the output 28R2 of the horizontal amplifier H for application to the horizontal deflection means of an associated display device.

When these amplified vertical and horizontal deflection signals are applied to the deflection means of a display device as hereinbefore set forth, a character raster appears on the screen of said device which is disposed vertically with respect to a horizontal line along which the character rasters are formed. It may be desirable at times to slant, or cant, these character rasters from this vertical line for improved readability. It has been found that for many observers the slanting of character rasters in a manner seen in FIGS. 4 and 5 improves readability of the characters.

A means has been provided for slanting the character rasters in the manner seen in FIGS. 4 and 5. This means may comprise a suitable resistor through which a portion of the output of the vertical amplifier V is coupled to the input of the horizontal amplifier H. Thus, a fraction of the vertical deflection signal is added in a predetermined manner to the horizontal deflection signal. It will be evident that when the tracing means of the display device is being deflected vertically, a portion of the vertical deflection signal is applied to the horizontal deflection means of the display device through the resistive connection so that the tracing means, instead of being deflected in a straight or vertical direction, is slanted slightly in a horizontal direction, as shown in FIG. 30*b*.

In summary, it is seen that a basic function of the combination comprising the timing and sweep signal generator (FIG. 21), the stroke timing signal conversion means (FIG. 22), the sweep signal steering means (FIG. 24), the weighting and summing means (FIG. 23), and the amplifying means (FIG. 28) is to generate eight character rasters which make up either a 2 x 4 or a 1 x 8 alphanumeric symbol display. This combination generates a horizontal deflection signal and a vertical deflection signal which, when applied to the horizontal and vertical deflection means of an associated display device, deflect the sweeping spot along the display screen of the device in a particular character raster, and then move the sweeping spot to another predetermined position for generating another character raster, thereafter continuing to move the sweeping spot to other predetermined "home" positions and generating a character raster based thereupon, until a particular symbol display has been generated.

Referring now to the character raster shown in FIG. 30*b* and to the output signals of the vertical and horizontal deflection amplifiers identified by the terminal numbers 28R1 and 28R2 in FIG. 7, it will be shown how these deflection signals deflect the cathode-ray of a cathode-ray display device for the tracing of a predetermined character raster. At the beginning of the first stroke period the cathode-ray beam is unblanked, if stroke trace 1 is to be displayed, while (instantaneously) it impinges upon the screen to the left of the numeral 1 in FIG. 30*b*. This initial point of impingement is the origin of the first stroke of the character raster, and is determined by the initial voltage levels of the deflection signals. During the first stroke period the vertical deflection signal remains constant while the horizontal deflection signal rises in a linear manner to a predetermined level, and then returns in a linear manner to its original voltage level, so that the cathode-ray is swept out to the terminus of the 1 stroke and is then deflected back to the origin, or, in other words, during the first stroke period the vertical deflection signal remains constant while the horizontal deflection signal sweeps the cathode-ray from a 1 stroke trace origin to a terminus and back to the 1 stroke trace origin. During the second stroke trace period, the horizontal deflection signal remains constant. However, it is seen in waveform 28R1 in FIG. 7 that the vertical deflection signal substantially instantaneously rises at the start of the second stroke period to a point from which the triangular sweep signal is reproduced during the second stroke period. Accordingly, in the character raster shown in FIG. 30*b* it is seen that the origin for the second stroke is spaced vertically a predetermined distance from the first origin prior to the cathode-ray being swept out to a terminus and then returned to the second origin. During the third stroke trace the horizontal deflection signal (waveform 28R2 in FIG. 7) drops a predetermined amount, thereby causing the origin of the third stroke to be moved a predetermined distance to the right. During the third stroke the cathode-ray is deflected vertically and back a predetermined distance. At the beginning of the fourth stroke the vertical deflection signal (waveform 28R1 in FIG. 7) drops a predetermined amount while the horizontal signal (waveform 28R2 in FIG. 7) is rising a predetermined amount. It is seen in FIG. 30*b* that for the fourth stroke the trace origin is the initial or first trace origin from which the cathode-ray is then swept vertically out and back to complete the fourth stroke. At the beginning of the fifth stroke, the level of the horizontal deflection signal again drops so as to move the origin of the fifth stroke to a point which is placed a predetermined horizontal distance from the origin of the first and fourth strokes, which distance is preferably the same as the distance between the second and third stroke trace origins. The vertical deflection signal then rises and drops during the fifth stroke so as to sweep the cathode-ray through the fifth stroke as seen in FIG. 30*b*. At the completion of the fifth stroke the vertical deflection signal rises abruptly to a predetermined level and the horizontal deflection signal drops abruptly to a predetermined level, thereby causing the origin of the sixth stroke to be spaced above the origin of the second stroke a distance which is substantially equal to the distance which the origin of the second stroke is spaced above the origin of the first and fourth strokes. During the sixth stroke the horizontal deflection signal sweeps the cathode-ray out to and back from a terminus point which is approximately colinear with the origins of the third and fifth strokes. At the beginning of the seventh stroke the vertical deflection signal drops a predetermined amount to locate the seventh origin at a point which substantially coincides with the origin of the second stroke. During the seventh stroke, the vertical deflection signal drops to a predetermined level and remains constant at that level during the seventh stroke period. The horizontal deflection signal rises to a predetermined level and returns, thereby causing the cathode-ray to be swept to a terminus point and back; the terminus point is preferably colinear with the third and fifth strokes. The terminus of the seventh stroke also approximately coincides with the origin of the third stroke. Thus, it has been clearly shown how the vertical and horizontal deflection signals, which are applied by the amplifying means of FIG. 28 to the vertical and horizontal deflection means of the cathode-ray display device, cooperate to deflect a cathode-ray through a seven stroke character raster which resembles the numeral "8."

A second function of the present invention is to suppress predetermined strokes of each character raster, whereby predetermined information may be displayed by an associated trace sweeping display device. Examples of the symbols which may be displayed in addition to numerals are illustrated in FIG. 2. The portion of the present invention which accomplishes this suppression function includes the circuits represented in FIGS. 21, 25, 26, 27 and 29.

A means is provided for converting timing signals generated by the timing and sweep signal generating means of FIG. 21 into column pulses. In the illustrated embodiments this means comprises a plurality of gating means which receive timing signals from the timing and sweep signal generating means in a predetermined manner and which generate a plurality of pulses appearing in a predetermined order on a plurality of column leads, each of which is identified with a particular character raster. More particularly, this gating means comprises a plurality of diode gating circuits 25–1 through 25–6. These gating circuits are designated by the block symbol G–13 and are illustrated in the wiring diagram of FIG. 13*a*. It will be observed that each gating means G–13 in FIG. 25 is connected in a manner opposite to that observed in FIG. 22, however, the reason for this reversal in connection will soon become apparent. The diode gate 25–1 is provided with an input 25L1 which is connected to the output terminal 21R8 of the timing and sweep signal generator shown in FIG. 21. Similarly, the diode gate 25–2 has an input terminal 25L2 which is connected to the output terminal 21R9 of FIG. 21. The diode gates 25–3 and 25–4 have input terminals 25L3 and 25L4 which are connected, respectively, to the output terminals 21R11 and 21R12 of FIG. 21. The diode gates 25–5 and 25–6 have input terminals 25L5 and 25L6 which are connected to the output terminals 21R14 and 21R15 of FIG. 21, respectively. The input terminal of each of the gating means 25–1 through 25–6 is connected to the anodes of the diodes 1N192, as seen in FIG. 13*a*. The cathodes of the diode gating means 25–1 through 25–6 are connected as shown in FIG. 25 through one kilohm resistors to a voltage source, which is shown in the present illustration to be a −12 v. bus. The output terminals 25R1 through 25R8 represent in ascending order columns 1 through 8 which, in the 1 x 8 alphanumeric symbol display (see FIG. 26*b*) represent the character rasters reading from right to left across the screen of a cathode-ray display device. Thus, the output terminal 25R1 is particularly identified with column 1, the output terminal 25R2 is particularly identified with column 2, and the remaining six terminals are similarly identified with the remaining six columns. Each of the output terminals is connected to the cathodes of diodes in certain ones of the gates 25–1 through 25–6 for a purpose which will be hereinafter set forth more fully. It will be seen in FIG. 25 that the output terminal 25R1 is connected to the cathodes of diodes included in the gates 25–2, 25–4 and 25–6. The output terminal 25R2 is connected to the cathodes of diodes included in gates 25–1, 25–4 and 25–6. The output terminal 25R3 is connected to the cathodes of diodes included in gates 25–2, 25–3 and 25–6. The output terminal 25R4 is connected to the cathodes of diodes included in gates 25–1, 25–3 and 25–6. The output terminals 25R5 is connected to the cathodes of diodes included in gates 25–2, 25–4 and 25–5. The output terminal 25R6 is connected to the cathodes of diodes included in gates 25–1, 25–4 and 25–5. The output terminal 25R7 is connected to the cathodes of diodes included in gates 25–2, 25–3 and 25–5. The output terminal 25R8 is connected to the cathodes of diodes included in the gates 25–1, 25–3 and 25–5. Referring again to FIG. 1, it will be shown how the timing signal and sweep signal generating means of FIG. 21 cooperates with the column timing signal conversion means of FIG. 25 to produce a plurality of sequentially appearing pulse signals, or column pulses. The output terminals 21R8, 21R9, 21R11, 21R12, 21R14 and 21R15 of FIG. 21, are coupled to the 8–1, 8–2 and 8–4 flip-flops which comprise the 8-count binary counter of the timing signal and sweep signal generator. As seen in FIG. 7*b*, the output of flip-flop 8–1 changes voltage level every seven stroke periods, the output of flip-flop 8–2 changes voltage level every fourteen stroke periods and the output of flip-flop 8–4 changes voltage level every twenty-eight stroke periods. It will be noted in FIG. 21 that the output terminals 21R8, 21R11, and 21R14 are connected to the $\overline{Q}$ terminals of flip-flops 8–1, 8–2, and 8–4, respectively. The output terminals 21R9, 21R12 and 21R15 are connected to the Q terminals of flip-flops 8–1, 8–2, and 8–4, respectively. The output terminals 21R8, 21R9, 21R11, 21R12, 21R14 and 21R15 are connected to the Q and $\overline{Q}$ terminals of the flip-flops 8–1, 8–2 and 8–4 through inverters for which the block symbol is I–10. The timing signals generated by flip-flops 8–1, 8–2 and 8–4 are converted by the circuits of FIG. 21 and FIG. 25 into a series of repetitive, sequentially appearing pulse signals, or column pulses. This operation is provided in the following manner. The diode gating means G–13 of the gate 25–2 has the cathode of the upper diode 1N192 connected through a 1 kilohm resistor to a −12 v. source. Unless the anode of this diode is made positive with respect to the cathode, the diode will not conduct and −12 v. will appear at the cathode of the diode. Whether the diode 1N192 conducts is determined by the inverter I–10 which has an output terminal 21R9 connected to the anode of diode 1N192 and which has an input terminal connected to the Q terminal of the 8–1 flip-flop. The voltage levels at the Q terminal of the flip-flop 8–1 are 0 and −6 volts. In examining the wiring diagram illustrated in FIG. 10*a* of the inverter I–10 it will be seen that when the output at the Q terminal of the 8–1 flip-flop is zero, a positive voltage will be applied to the base of the transistor 2N1305 and the transistor will be cut off. When the complement of the zero signal or the −6 v. signal appears at the Q terminal of the 8–1 flip-flop, this negative voltage will permit the transistor to conduct. When the transistor conducts, this places a ground level at the anode of the aforesaid diode of the gating means illustrated in FIG. 13*a*, thereby making the anode positive with respect to the cathode and causing the diode to conduct. When this diode conducts, approximately ground potential will appear at its cathode. Thus, it will be seen that approximately ground potential will appear at output terminal 25R1, which is directly connected to the cathodes of certain diodes included in the gates 25–2, 25–4, and 25–6, whenever an approximately 0 v. signal is present on any one of the input terminals 25L2, 25L4 and 25L6. When one or more of the 8-counter Q terminals carries a −6 volt signal, the potential at the output terminal 25R1 will be 0 volts. It is evident that this is true, since, whenever the transistor of an inverter I–10 conducts, the diodes of the gate G–13 connected to that inverter will conduct, thereby causing an approximately zero potential to exist at the corresponding output terminal.

The outputs at the Q and $\overline{Q}$ terminals of the flip-flops 8–1, 8–2 and 8–4 are connected to the inversion means I–10 which, in turn, are connected to gating means G–13;

the cathodes of the gating means are connected to the output terminals 25R1 through 25R8 in the manner shown in FIG. 25. Thus, during character period 1 when the potential at the Q terminals of flip-flops 8–1, 8–2 and 8–4 is 0 v. the voltage level at the output terminal 25R1 (the lead associated with column 1) is −12 volts. Each of the other output terminals, i.e., 25R2 through 25R8, the column 2 through column 8 terminals, is directly connected to the cathode of at least one diode which is a part of a G–13 gate having its input terminal coupled via an inverter I–10 to a $\overline{Q}$ terminal of one of the flip-flops 8–1, 8–2 or 8–4. Since the $\overline{Q}$ output of these flip-flops is negative during character period 1, the voltage level during character period 1 at each of the output terminals 25R2 through 25R8 is 0 v. During the next character period the voltage at output terminal 25R2 is approximately −12 volts, while the voltage at each of the other output terminals is approximately 0 v., since the outputs from the flip-flops 8–1, 8–2, and 8–4 of FIG. 21 are coupled to the gating means 25–1 through 25–6 in the manner shown in FIG. 25 to yield this result. The voltage levels of each of the eight column leads, or output terminals, during the eight character periods is illustrated by the following chart:

| Output terminal | Character Period | | | | | | | |
|---|---|---|---|---|---|---|---|---|
| | 1 | 2 | 3 | 4 | 5 | 6 | 7 | 8 |
| Col. 1 | −12 v. | 0 v. | 0 v. | 0 v. | 0 v. | 0 v. | 0 v. | 0 v. |
| Col. 2 | 0 | −12 | 0 | 0 | 0 | 0 | 0 | 0 |
| Col. 3 | 0 | 0 | −12 | 0 | 0 | 0 | 0 | 0 |
| Col. 4 | 0 | 0 | 0 | −12 | 0 | 0 | 0 | 0 |
| Col. 5 | 0 | 0 | 0 | 0 | −12 | 0 | 0 | 0 |
| Col. 6 | 0 | 0 | 0 | 0 | 0 | −12 | 0 | 0 |
| Col. 7 | | 0 | 0 | 0 | 0 | 0 | −12 | 0 |
| Col. 8 | 0 | 0 | 0 | 0 | 0 | 0 | 0 | −12 |

In examining the above chart, it will be seen that a pulse of approximately −12 v. appears at the column 1 output terminal, 25R1, during the first character period, while the other output terminals are at approximately 0 v. During character period 2 the pulse of approximately −12 v. appears at the column 2 output terminal, 25R2, while each of the other output terminals is at approximately 0 v. Similarly, it appears that a pulsed signal of −12 v. appears on the output terminals 25R3, 25R4, 25R5, 25R6, 25R7, 25R8 during the character periods 3, 4, 5, 6, 7 and 8, respectively, and that at all other times these terminals are at approximately 0 v. Thus, it has been clearly shown how timing signals generated by the timing signal and sweep signal generating means of FIG. 21 are selectively grouped to provide a plurality of column pulses which appear in a predetermined time sequence on a corresponding plurality of output terminals.

A means is also provided for determining the character which is traced in each character position in the display raster described on the screen of an associated display device. This means has a plurality of inputs which are connected to the outputs of the column timing signal conversion means and also has a plurality of outputs which correspond to the characters which may be depicted in any character position of the symbol display on the screen of the associated display device. In the present embodiment this means comprises a switching network which permits an operator of the present invention to indicate the digit to be displayed in a given column or character position by directing a significant signal in the form of a pulse received from said column timing signal conversion means to a selected output terminal.

This means may comprise apparatus which is separate from the character display signal generator itself, such as the readout switch which forms a portion of the adding-perforating machine described in U.S. Patent No. 2,861,-739. Although the switching network shown and described herein relates to the particular readout switch which forms a portion of a particular adding-perforating machine, this switching network may also comprise a plurality of diode gates, a plugboard, or a card readout which serves the same function as the readout switch of the present embodiment. It will also be apparent to those skilled in the art that other devices could be adapted to perform this particular function in the instant invention.

More particularly, the switching network shown in FIG. 26 comprises the readout switch means on U.S. Patent No. 2,861,739 which has its input terminals connected through blocking diodes to a plurality of input terminals 26L1 through 26L8, which are connected to output terminals 25R1 through 25R8 of the column timing signal conversion means of FIG. 25, as indicated in FIG. 26. The switching network of FIG. 26 is provided with a plurality of output terminals, each of which corresponds to a digit that may be displayed by this particular embodiment of the instant invention. The output terminal 26R10 represents the numeral "1," the output terminal 26R9 represents the numeral "2," the output terminal 26R8 represents the numeral "3," the output terminal 26R7 represents the numeral "4," the output terminal 26R6 represents the numeral "5," the output terminal 26R5 represents the numeral "6," the output terminal 26R4 represents the numeral "7," the output terminal 26R2 represents the numeral "9," and the output terminal 26R1 represents the numeral "0." There is no output terminal which represents the numeral "8," for reasons which will be hereinafter set forth more fully. An operator of the instant invention may select the digit which he wishes to be generated in a particular character position of the display raster. Particular digits to be displayed in selected character positions are illustrated by way of example in FIG. 26 by the connection of the output terminals representing the digits selected to the correspondingly selected column leads. Each connection between a column lead and a digit pulse lead is represented by a heavy black dot. Choosing a 1 x 8 display configuration for the display raster, it will now be seen how the readout switch is actuated so that the number "11184632" may be displayed by the display device. It is seen that the readout switch has the output terminal 26R10, i.e., the terminal representing the 1 digit, connected to the input terminals 26L6, 26L7, and 26L8. These terminals are associated with columns 6, 7 and 8 which, as seen in FIG. 26*b*, are the leftmost three columns of the display, and which will be occupied with three 1's. The input terminal 26L5, the column 5 pulse line, is connected to the "8" digit line which, for reasons hereinafter set forth, is not connected to an output terminal. The input terminal 26L4, or column 4 pulse line, is connected to the "4" digit line output terminal 26R7. The input terminal 26L3 or column 3 input terminal, is connected to the "6" digit line output terminal 26R5. The input terminal 26L2 or column 2 pulse line is connected to the "3" digit line, output terminal 26R8. The input terminal 26L1 or column 1 pulse line is connected to the "2" digit pulse line, output terminal 26R9. Thus, it is seen that the number "11184632" which is entered into the readout switch, causes the digit pulse lines to be connected to the appropriate column lines.

It will be evident that there is no need for an output terminal which represents the digit "8" since it is not necessary to suppress any strokes of the seven stroke character raster in order to represent the digit "8." As can be seen in FIG. 30*b*, when all seven strokes of the character raster appear, the digit "8" is displayed.

The input terminals 26L1 through 26L8 having been connected to the appropriate digit outputs, as previously set forth for the numeral "11184632," the chart below illustrates the voltage levels at the nine digit output terminals of FIG. 26 during the eight character periods. It is understood, of course, that a character period is the time required to generate one character raster.

the inverter I–9 is to give an output of nominal 0 v. for an input of −12 v. and an output of −6 v. for an input of 0 v.

The ouput of the inverter I–9 associated with the OR gate 27–1 has an output terminal 27R2 which controls stroke 1, as seen in FIG. 30*b*, of the character raster. It will be recognized that the three inputs to the OR gate 27–1 are supplied with nominal −12 v., when, during the formation of the digits "1," "4" and "7," it is necessary to blank or suppress the first (lower) stroke of the character raster. As another example, it will be seen in the OR gate 27–2 that the inputs 27L4, 27L5, 27L6 and

| Output Terminal | Character Period | | | | | | | |
|---|---|---|---|---|---|---|---|---|
| | 1 | 2 | 3 | 4 | 5 | 6 | 7 | 8 |
| 26R1 (digit 0) | 0 v. | 0 v. | 0 v. | 0 v. | 0 v. | 0 v. | 0 v. | 0 v. |
| 26R2 (digit 9) | 0 | 0 | 0 | 0 | 0 | 0 | 0 | 0 |
| 26R4 (digit 7) | 0 | 0 | 0 | 0 | 0 | 0 | 0 | 0 |
| 26R5 (digit 6) | 0 | 0 | −12 | 0 | 0 | 0 | 0 | 0 |
| 26R6 (digit 5) | 0 | 0 | 0 | 0 | 0 | 0 | 0 | 0 |
| 26R7 (digit 4) | 0 | 0 | 0 | −12 | 0 | 0 | 0 | 0 |
| 26R8 (digit 3) | 0 | −12 | 0 | 0 | 0 | 0 | 0 | 0 |
| 26R9 (digit 2) | −12 | 0 | 0 | 0 | 0 | 0 | 0 | 0 |
| 26R10 (digit 1) | 0 | 0 | 0 | 0 | 0 | −12 | −12 | −12 |

From the above chart it may be seen that during character period 1 the digit "2" output terminal 26R9, is at a −12 v. potential, while all other leads are at 0 v. During character period 2 terminal 26R8 is at −12 v., and all other leads are at 0 v. It is, therefore, apparent that a −12 v. signal on an output lead indicates that the digit which this lead represents will appear in the display during the character period which determines the particular column in which the digit appears. Thus, it has been clearly illustrated how the column pulses generated by the column timing signal conversion means of FIG. 25 have been converted into digit pulses.

Yet another means is provided to convert the digit pulses generated by the readout switch means of FIG. 26 into stroke suppression pulses. This means may comprise seven gates, each having a plurality of inputs, and each connected through suitable inversion means to seven outputs identified with particular strokes of the seven-stroke character raster. More particularly, a plurality of gates 27–1 through 27–7 are each provided with from one to six inputs which are connected as shown at the left edge of FIG. 27 to the output terminals of the readout switch of FIG. 26. The block symbol for each of the gates 27–1 through 27–7 is G–13. The wiring diagram for each gate G–13 is seen in FIG. 13*a*. Each of the gates 27–1 through 27–7 is provided with a single output which passes through an inversion means I–9 before appearing on one of seven output terminals 27R2 through 27R8.

Several of the gating means will be examined in more detail to determine how they co-operate with the readout switch of FIG. 26 and the inversion means to produce a certain output signal.

The gate 27–1 of FIG. 27 is provided with three inputs, 26R10, 26R7, and 26R4. Referring to FIG. 26 it will be seen that these terminals receive digit pulses of approximately −12 v. for the digits "1," "4," and "7," respectively. Examining the wiring diagrams of a gate G–13 and an inverter I–9, it will be seen that whenever a nominal −12 v. potential is present at one or more of the inputs of a gate G–13, the output of the gate G–13 will be at nominal −12 v. Taking nominal −12 v. as logical 1 at their inputs and outputs, gates 27–1 through 27–7 may be considered as OR gates. Thus, when one or more of the inputs of an OR gate G–13 is at nominal −12 v., the ouput of that gate will also be at nominal −12 v.

If the input to inverter I–9 is a negative voltage then the inverter I–9 will yield an output of 0 v. If the input to the inverter I–9 is 0 v., then the output of the inverter I–9 will be −6 v. Thus, it is seen that the function of

27L7 receive digit pulses from the following digit lines of FIG. 26, "1," "2," "3" and "7." The output 27R3 of the inverter connected to the OR gate 27–2 controls the second stroke of the character raster. Thus, it is seen that in the formation of the digits "1," "2," "3" and "7," it is necessary to suppress or blank the second stroke of the character raster. It is apparent that the inputs to each of the remaining OR gates 27–3 through 27–7 are chosen according to whether it is necessary to blank or suppress those particular strokes of the character raster during formation of a selected digit. The output terminals 27R3 through 27R8, thus, control strokes 3 through 7 of the character rasters produced by the subject invention. Thus, it is seen how digit pulses received from the column pulse conversion means of FIG. 26 are converted into stroke suppression pulses according to the strokes which must be suppressed in each raster for generation of predetermined numerals.

Another means is provided for converting the stroke suppression pulses received from the digit pulse conversion means of FIG. 27 into a blanking or suppressing signal which is transmitted to the grid of a cathode-ray display device which may be associated with the instant invention. This means may comprise a plurality of gating means which are connected through a suitable amplifying means to a means for blanking or suppressing the beam of a cathode-ray display device for a predetermined period of time. In the present illustration this blanking means comprises a grid of the cathode-ray display device which, upon application of the proper suppression signal, suppresses a stroke of the character raster by precluding for a predetermined period of time, which may be a stroke period, the impingement of the cathode-ray on the screen of the display device.

The gating means comprises a plurality of gates 29–1 through 29–7. The block symbol for each of these gates is G–12 and a feasible circuit for this gate is shown in FIG. 12*a*. Each of the gates 29–1 through 29–7 is provided with two inputs. One of the inputs of each gate 29–1 through 29–7 is connected to one of the outputs of the stroke timing signal conversion means of FIG. 22 for receiving a stroke pulse at a predetermined time. Thus, the input terminal 29L1 of gate 29–1 is connected to the output terminal 22R1 of the stroke timing signal conversion means of FIG. 22.

In the chart (FIG. 7) indicating the potential levels of the stroke pulses generated by the stroke timing signal conversion means of FIG. 22, it is seen that during the first stroke of the character raster the potential level of the input terminal 29L1 is −6 v. and on the remaining seven stroke periods the potential level is 0 v.

The input terminal 29L2 of the gate 29–1 of FIG. 29 is connected to the output 27R2 of FIG. 27. The level of the signals which appear on this line vary from 0 v. to −0 v., according to whether it is desired that the first stroke of the character raster be blanked or suppressed from the screen of the cathode-ray display device, a 0 v. signal being the blanking level.

In examining the circuit of FIG. 12*a* it will be seen that it is only when the level of the signal on the input terminal 29L1 is −6 v. and the level of the signal on the input 29L2 is 0 v. that the potential level at the output of the gate 29–1 will be at −6 v. potential level. The levels of these particular signals are considered the significant levels so that the gates 29–1 through 29–7 will be considered AND gates. It will be evident in examining the remainder of the gates 29–2 through 29–7 that the repetitive stroke pulses from the stroke timing signal conversion means will arrive in a timed sequence at the AND gates 29–2 through 29–7. If, at the time that a stroke pulse from the stroke timing signal conversion means is received by a particular AND gate in FIG. 29, a zero potential level exists on the other input of this particular gate (which is connected to the digit pulse conversion means in FIG. 27), then a signal will be present on the output of that particular gate.

The stroke pulses from FIG. 22 occur in timed sequence during the seven strokes of the character raster, each stroke appearing at the input of a different AND gate of FIG. 29. During the generation of a desired digit, the stroke suppression signals on the output lines of FIG. 27 occur during all seven stroke periods of the character raster. Thus a suppression pulse is generated by a G–12 AND gate of FIG. 29 when a stroke pulse from FIG. 22 is in time phase with a stroke suppression signal from FIG. 27.

When a −6 v. potential level exists at the output of one of the AND gates 29–1 through 29–7, the signal will be amplified by the amplifier that has a block symbol of a B inside a triangle and which has a suitable wiring diagram illustrated therefor in FIG. 20*a*.

Referring now to FIG. 26 and the example where the number "11184632" is entered into the readout switch, it is seen that during character periods 6, 7 and 8 the output terminal 26R10 or the digit "1" output has a −12 v. potential. Referring now to FIG. 30*b*, it will be seen that the digit "1" comprises strokes 3 and 5 thereby requiring that strokes 1, 2, 4, 6 and 7 of the character raster be suppressed during generation of the digit "1." This means that a −12 v. signal must be fed into the G–13 AND gates of FIG. 27 which control strokes 1, 2, 4, 6 and 7 of the raster. This means that a −12 v. input to the AND gates 27–1, 27–2, 27–4, 27–6 and 27–7 will cause suppression of the strokes 1, 2, 4, 6 and 7 of a character raster. It will be seen in FIG. 27 that the input terminals 27L1, 27L4, 27L11, 27L18 and 27L21 have remote numbers of 26R10 or the digit "1" output of FIG. 26. Thus, the AND gates 27–1, 27–2, 27–4, 27–6 and 27–7 receive an input signal of −12 v. from the output terminal 26R10 of FIG. 26 during character periods 6, 7 and 8 and as a result, the strokes 1, 2, 4, 6 and 7 of the character raster are suppressed during character periods 6, 7 and 8.

As an additional example, it will be seen in FIG. 26 that a column lead has been connected to a digit lead so that the digit "6" will be displayed on the screen of the cathode-ray display device during character period 3. This connection causes the output terminal 26R5 or digit "6" lead to have a −12 v. potential during character period 3. Referring now to FIG. 27, it will be seen that only one input terminal has a remote terminal number of 26R5. This is the input terminal 27L9. Therefore, the home terminal 26R5 of FIG. 26, the digit "6" lead, is connected to only one AND gate in FIG. 27, i.e., the AND gate 27–3. Since the AND gate 27–3 controls stroke 3 of the character raster when it receives an input of −12 v., the gate 27–3 will suppress stroke 3 of the character raster. Looking now to FIG. 30*b*, it will be seen that suppression of stroke 3 will result in the appearance of the numeral "6" in the third column. Thus, the digit "6" will appear in character position 3 as seen in FIG. 26*b* as a result of a −12 v. potential appearing at the output terminal 26R5 of FIG. 26 during character period 3. The above examples clearly illustrate how stroke suppression pulses received from the digit pulse conversion means of FIG. 27 have been converted into a blanking signal which is transmitted to the cathode-ray suppression means of a cathode-ray display device.

It has been found desirable for optimum readability of the digit "1" that this particular digit be positioned substantially in the center of a character raster. When the digit "1" is formed by strokes 3 and 5 of a character raster it has been found that this digit "1" may be plaaced too close to a character raster formed in an adjacent character position for maximum readability. Accordingly, it is considered desirable to shift or displace longitudinally the digit "1" formed by the strokes 3 and 5. A means to shift a character raster generating the numeral "1" on the screen of the cathode-ray display device is provided. This means includes a voltage divider network whereby the occurrence of the digit pulse related to the numeral "1" feeds a signal to the horizontal deflection amplifier of FIG. 28 so that strokes 3 and 5 of a character raster are deflected horizontally on the screen of cathode-ray display device a predetermined distance, which may be, for purposes of illustration, to the center of the character raster. A means to sense the occurrence of the digit "1" and to provide a supplementary input to the horizontal deflection amplifier H of FIG. 28 is provided by the network illustrated in FIG. 28. A first inverter 28–1 has an input terminal 28L5 which is connected to the output terminal 27R1 of the gate 27–1 of FIG. 27. The input terminal 27L1 of gate 27–1 is connected to the output terminal 26R10 of the column pulse conversion means of FIG. 26. In examining FIG. 26 it will be seen that the output terminal 26R10 is the output of the digit "1" line so that when a −12 v. potential level occurs at the input terminal 27L1, this input also appears at the input of the inverter 28–1 of FIG. 28. The block symbol for this inverter is I–9 and a suitable wiring diagram is seen in FIG. 9*a*. The appearance of a −12 v. potential on the input of the inverter 28–1 causes a 0 v. output and a 0 v. input, to the inverter 28–1 results in a −6 v. output. The output of the inverter 28–1 is applied to the input of a second inverter 28–2 which also has the block symbol I–9. An input of 0 v. to the inverter 28–2 results in a −6 v. output and, conversely, a −6 v. input results in a 0 v. output. The output of the inverter 28–2 is fed into the "one displacement" (OD) network which has an output lead H tied to the input terminal 28L2 of the horizontal deflection amplifier. The diagram for a suitable network which may be used for the "one displacement" network is illustrated in FIG. 19*a*. It will be seen upon examination of FIG. 19*a* that when "one displacement" network senses a 0 v. input, the potential level at the output H will be at 0 v. However, if the input to the "one displacement" network is at a −6 v. potential level, then a fraction of the −6 v. input voltage will be fed into the signal received at the input terminal 28L2 of the horizontal deflection amplifier. The addition of this signal to the input signal of the horizontal deflection amplifier H in FIG. 28 causes the strokes 3 and 5 of the character raster to be displaced horizontally toward the position usually occupied by strokes 2 and 4 of the raster, and be located along the dashed strokes 8 and 9 of FIG. 30*b*. This is a desirable position for strokes 3 and 5 when used to display a numeral "1," since this would space the strokes approximately equidistant from the nearer edges of the character rasters occurring in character positions on either side of the character position in which the digit "1" appears. Thus, it has been clearly shown how the present invention provides a means to sense the occurrence of the digit "1" in a predetermined character position and to shift the cathode-ray beam during the strokes representing the digit "1" longitudinally within the character position to a position where the readability of the digit is materially improved.

As has been pointed out above, a triangular wave may be utilized as the sweep signal which is used in the horizontal and vertical deflection signals that deflect a cathode-ray in tracing a character raster upon the screen of an associated display device. This sweep signal was produced by the free running clock illustrated in FIG. 21. A deflection signal of this type, when applied to the deflection means of an associated display device, during each stroke of the character raster, sweeps the tracing spot from a home position, or origin, to a terminus, and then returns the tracing spot to the origin. Therefore, during each stroke of the character raster a triangular sweep signal generates two image forming sweeps of the tracing spot, which image sweeps preferably coincide.

While two image forming sweeps of the electron beam for each stroke of the character raster provide a suitable raster it is possible in another embodiment of the present invention to provide a character raster having greater resolution and definition. In the second embodiment a sweep signal in the form of a sawtooth wave is utilized. A sawtooth wave sweep signal, as shown in FIG. 32*d*, drives the tracing spot during each stroke of the character raster from a home position, or origin, to a terminus in a very short period of time and then back to the origin over a much longer period of time. When the intensity of the cathode-ray tube is suitably adjusted, the sweep of the electron beam during the first short time period does not provide a visible image upon the screen of the cathode-ray tube. During the second, or longer, time interval, the electron beam then sweeps out a distinct image. Accordingly, it will be apparent that providing only one image forming sweep during each stroke of the character raster provides greater definition and resolution of the particular stroke than when two image forming sweeps are provided for each stroke. It will also be apparent that providing only one image sweep per stroke of a character raster also allows the use of less critical and costly components.

It would also be within the scope of this invention to provide a sweep signal which sweeps the electron beam from a home position, or origin, to its terminus over a relatively long period of time, and then in a much shorter period of time quickly returns it to its origin. This type of sweep signal would also be a sawtooth wave which would provide only one image forming sweep of the electron beam during one stroke of a character raster.

To preclude confusion in the description of the second embodiment of the present invention, it may be stated that, with the exception of FIGS. 7, 7*a*, 16 and 21, all the figures described in the explanation of the first embodiment are also pertinent to the second embodiment. Accordingly, all terminal numbers which refer to FIGS. 7, 7*a*, 16 and 21 are to be disregarded. The drawings of FIGS. 31, 32*a* through 32*d* and 33 are considered to be relevant only to the second embodiment. The convention is adopted that all terminal numbers relating to FIGS. 31 through 33 are printed on a slant to emphasize that these drawings relate only to the second embodiment. Terminal numbers referring to FIGS. 1 through 30 are not slanted. It is also to be understood that the system of conventions are previously established with regard to home and remote terminal numbers also applies to FIGS. 31 through 33 of the second embodiment.

A block diagram of the instant invention is illustrated in FIG. 1. Each block represents a basic function which, inter alia, is performed by the various circuit means for the generation and display of character rasters in a predetermined alphanumeric symbol display. The relationship between these functional blocks is noted by interconnecting links. The function of each block and the relationship between the blocks, as shown in FIG. 1, apply to the second embodiment of the invention as well as to the first embodiment. However, in the block labeled "GENERATES TIMING AND SWEEP SIGNALS (FIG. 21 OR FIG. 31)," FIG. 31 applies exclusively to the second embodiment while FIG. 21 applies exclusively to the first embodiment.

In the second embodiment of the instant invention a means is provided to generate timing pulses and a sweep signal. In the second embodiment this means may include a waveform generator, a pulse generator, and a sawtooth wave sweep generator. A suitable waveform generator cooperates with a suitable pulse generator to form a square wave generator which emits a pulse train, as seen in FIG. 32*c*. A waveform generator which has been successfully used in the practice of the present invention is a Tektronix Type 162 waveform generator and a suitable pulse generator is a Tektronix Type 161 pulse generator. These components are manufactured by the Tektronix Company of Portland, Oreg. It will also be apparent to one skilled in the art that other equivalent means could be used to produce a pulse train other than the particularly identified components.

The output of the pulse generator is fed into a sawtooth wave generator which is denoted in FIG. 31 by a rectangle with a single diagonal. As seen in FIG. 32*c*, the pulse train comprises a continuous train of −12 v. pulses having a 20 microsecond duration and a period of 400 microseconds. Upon receiving this pulse train, the sawtooth wave sweep generator produces an output train of sawtooth pulses which appears at the output terminal "SW," which is the home terminal 31R1 of FIG. 31. The wave shape of this sawtooth wave is illustrated in FIG. 32*d* and in FIG. 33 where it is labeled 31R1.

It will be seen in FIG. 31 that the pulse train emitted by the pulse generator is also fed into the T, or complementing input of flip-flop 7–1. Upon receiving the train of pulses at the complementing input of flip-flop 7–1, flip-flops 7–1, 7–2, 7–4, 8–1, 8–2 and 8–4 function in the manner previously described. That is, flip-flops 7–1, 7–2, 7–4 and the skip "4" circuit function as a 7-count counter and flip-flops 8–1, 8–2 and 8–4 function as an ordinary 8-count binary counter. The waveforms of the output signals of the 7-count counter, i.e., the output at 7–1–Q, 7–1–$\overline{Q}$, 7–2–Q, 7–2–$\overline{Q}$, 7–4–Q, and 7–4–$\overline{Q}$, are shown in FIG. 7*b*. The waveforms of the output signals of the 8-count counter, i.e., the output of 7–1–Q, 8–1–$\overline{Q}$, 8–2–Q, 8–2–$\overline{Q}$, 8–4–Q, and 8–4–$\overline{Q}$ are also shown in FIG. 7*b*. The outputs of the Q and $\overline{Q}$ terminals of flip-flops 7–1, 7–2 and 7–4 are inverted by inverters I–9 and appear at home terminals 31R2 through 31R7. The functioning of flip-flops 7–1, 7–2, 7–4, 8–1, 8–2, and 8–4 and the inverter I–9 has been previously described. The operation of these elements remains the same in the second embodiment and the output at the home terminals 31R2 through 31R16 is identical to the output at the home terminals 21R2 through 21R16 in the first embodiment.

A means is provided in FIG. 22 to convert stroke timing signals received from FIG. 21 into stroke pulses, or a commutated set of pulse signals. This stroke timing signal conversion means or commutation means has been shown to comprise a plurality of gating means, the inputs of which comprise stroke timing signals. It will be seen in FIG. 22 that the inputs to the gates 22–1 through 22–7 of FIG. 22, which comprise the aforesaid gating means, have the remote terminal numbers 31R2 through 31R7. The home terminals 31R2 through 31R7 of FIG. 31 are connected through inverters I–9 to the flip-flops 7–1, 7–2 and 7–4. As before, the timing signals of these flip-flops are grouped so that the timing signals are converted into a commutated set of sequential pulsed signals, or stroke pulses. The waveforms of the output signals at the home terminals 22R1 through 22R7 of the second embodiment are identical to the waveforms of the output signals of FIG. 22 when utilized in the first embodiment, as per waveforms 22R1 through 22R7 in FIG. 7.

A means has been provided to steer the sweep signal during predetermined periods of time to selected output terminals. This means is illustrated in FIG. 24 and as in the first embodiment, comprises a plurality of input gating means coupled to a plurality of output gating means. The inputs to the means of FIG. 24 comprise stroke pulses, or commutated pulse signals received from FIG. 22, and a sawtooth wave sweep signal received from FIG. 31. As described, this circuit of FIG. 24 serves to steer or direct the sweep signal during stroke periods 1, 6, and 7 to the horizontal deflection amplifier and to steer the sweep signal during stroke periods 2, 3, 4 and 5 to the vertical deflection amplifier. The output of the input gating means of FIG. 24 in the second embodiment, when receiving a sawtooth sweep signal input, is illustrated in FIG. 33, as per waveforms labeled "OUTPUT OF 24–1" through "OUTPUT OF 24–7." The output waveform of the output gating means at FIG. 24 in the second embodiment is shown in FIG. 33; the waveform of the signal that is steered to the horizontal deflection amplifier is labeled "OUTPUT OF 24R2" and the waveform of the signal that is steered to the vertical deflection amplifier is labeled "OUTPUT OF 24R1."

A means has been provided, as shown in FIG. 23, to produce horizontal and vertical deflection signals by the proper combination of signals received from the timing and sweep signal generating means, the stroke timing signal conversion means, and the sweep signal steering means. As previously described, the signals which are combined for driving the vertical deflection amplifier are: stroke pulses received during stroke periods 1, 4, 5 and 7; sweep signals received during stroke periods 2, 3, 4 and 5; and, if the switching means of FIG. 23 is in the 2 x 4 position, the output of the Q terminal of the flip-flop 8–4 of FIG. 21. The output signal which drives the vertical deflection amplifier appears at the home terminal 23R1 of FIG. 23 and for the second embodiment has a waveform shown in FIG. 33 (labeled 23R1).

The input signals which are combined for driving the horizontal deflection amplifier are: stroke pulses received during stroke periods 2 and 4; the sweep signal received during stroke periods 1, 6 and 7; the output of the Q terminal of flip-flops 8–1 and 8–2 of FIG. 21; and, if the switching means in FIG. 23 is in the 1 x 8 position, the output of the Q terminal flip-flop 8–4. The output signal which drives the horizontal deflection amplifier appears at the home terminal 23R2 of FIG. 23 and in the second embodiment has the waveform labeled 23R2 in FIG. 33.

The horizontal and vertical deflection signals produced by the circuit of FIG. 23 are suitably amplified by the sweep amplifiers of FIG. 28, as previously described. The output signal of the vertical deflection amplifier of FIG. 28 appears at the home terminal of 28R1 and has the waveform labeled 28R1 in FIG. 33. The output of the horizontal deflection amplifier in FIG. 28 appears at home terminal 28R2 and in the second embodiment has a waveshape shown at FIG. 33 and labeled 28R2.

The horizontal and vertical deflection signals are accordingly fed to the horizontal and vertical deflection means of a cathode-ray tube for deflecting the cathode-ray of an associated cathode-ray device in a predetermined raster. The deflection signals of the second embodiment will cause the cathode-ray in each stroke to move substantially instantaneously from an origin to its terminus; the sweep does not form an image. Upon reaching the terminus the cathode-ray is them returned to the origin in a period of time considerably greater than during its initial sweep so that an image is formed on the cathode-ray screen. It would also be within the scope of the present invention to provide for the cathode-ray to be swept slowly from its origin to its terminus and then returned quickly to the origin so that only one image forming sweep would be formed. The method of using one image forming sweep per stroke is utilized, as before, to generate seven strokes of a predetermined character raster. The other seven character rasters are also formed, as previously described.

The function of the circuits of FIGS, 21, 25, 26, 27 and 29 in the first embodiment of the present invention was to suppress certain strokes of the character raster in order to display desired information on a screen of an associated cathode-ray display device. In the second embodiment of the invention, the circuits of FIGS. 25, 26, 27 and 29 function in the manner previously described. The timing signals are in the second embodiment received from FIG. 31 but, as has been clearly set forth, the timing signals generated by the circuit of FIG. 31 are identical to the timing signals of FIG. 21. This portion of the instant invention will function as previously set forth in the description of the first embodiment.

OPERATION

The first function of the present invention may be considered to be the generation of horizontal and vertical deflection signals which, when applied to the horizontal and vertical deflection means of an associated display device, will deflect the cathode-ray through a predetermined character raster. A plurality of these character rasters are formed on the screen of the display device in a predetermined display raster.

A second function of the instant invention is to display information using the aforesaid character rasters. This second function is accomplished by the selective blanking of predetermined portions of certain character rasters so that alphanumeric characters or numerals which are indicative of said information are displayed by the rasters of a predetermined numeric symbol display.

The first function is accomplished by the circuits of FIGS. 21, 22, 24, 23 and 28.

The second function is accomplished by the circuits of FIGS. 21, 25, 26, 27 and 29.

A means is provided by the circuit of FIG. 21 to generate a plurality of timing signals and a sweep signal. The flip-flop labeled 0, shown at the top of FIG. 21, coacts with the sweep generator, also shown at the top of FIG. 21, to constitute a free-running clock circuit which produces a rectangular pulse train at its Q output terminal and a triangular sweep signal at its SW terminal. The rectangular pulse train produced at the Q terminal is applied to the complementing input of the first flip-flop in a counter comprising the flip-flops labeled 7–1, 7–2, 7–4, 8–1, 8–2 and 8–4, respectively. The three flip-flops labeled 7–1, 7–2 and 7–4 comprise an ordinary binary counter. When skip "4" circuit is coupled from flip-flop 7–4 to flip-flop 7–1, flip-flops 7–1, 7–2, and 7–4 constitue a 7-count counter; the binary equivalent of the decimal four state is omitted during each cycle of count.

The flip-flops 8–1, 8–2 and 8–4 comprise an ordinary 8-count binary counter. Selected outputs of the 8-count counter are inverted. Thus, the counter of FIG. 21 serves to produce timing signals in the form of a plurality of rectangular pulse train signals which change voltage level at predetermined time intervals, as per FIG. 7*b*.

A means is provided for converting timing signals produced by the timing and sweep signal generating means of FIG. 21 into a commutated set of pulse signals, or stroke pulses. In FIG. 22 it is seen that this means may comprise a gating means in the form of a bank of seven AND gates 22–1 through 22–7. Each of the AND gates 22–1 through 22–7 is provided with a plurality of inputs which are connected in a predetermined manner to outputs of the timing signal and sweep signal generating means. Thus, each gate of FIG. 22 receives stroke timing signals from the timing signal and sweep signal generating means of FIG. 21. These timing signals are selectively gated to provide a commutated set of stroke pulses, the waveforms of which are seen in FIG. 22. These commutated pulse signals are inverted by a suitable inverseion means to provide a plurality of repetitively sequentially appearing, or commutated, pulse signals at the outputs of FIG. 22, which are termed "stroke pulses."

A means is provided for steering the sweep signal SW generated by the sweep signal generator portion of the free-running clock circuit of the timing signal and sweep signal generating means illustrated in FIG. 21 to amplifying means associated with the horizontal and vertical deflection means of a cathode-ray display device. This means includes a plurality of AND gates 24–1 through 24–7, each of which receives two inputs; one input is the sweep signal SW from FIG. 21 and the other input is a stroke pulse from FIG. 22. Each of the AND gates 24–1 through 24–7 selectively passes the sweep signal when the stroke pulse from FIG. 22 appears at the input of the AND gate. The waveforms of these signals are seen in FIG. 7*a*. The output signals of the AND gates 24–1 through 24–7 are directed to a pair of OR gates 24–8 and 24–9. These OR gates selectively group the sweep signals passed by the AND gates 24–1 through 24–7 so as to form two output signals. Each of these signals will provide a sweep signal to be applied to either the horizontal or vertical deflection means of an associated cathode-ray display device during each stroke of a character raster.

A means is provided for receiving timing signals generated by the timing signal and sweep signal generating means of FIG. 21, stroke pulses produced by the commutation means of FIG. 22, and sweep signals passed by the sweep signal steering means of FIG. 24 and producing a pair of deflection signals which are transmitted to the vertical and horizontal deflection means of an associated cathode-ray display device for tracing a plurality of character rasters in a predetermined numeric symbol display, or display raster. The summing means of FIG. 23 has a vertical deflection branch which receives stroke pulses during stroke periods 1, 4, 5 and 7 of each character period; and a sweep signal during stroke periods 2, 3, 4 and 5. These signals are combined to provide a vertical deflection signal, the waveform of which appears in FIG. 7*a*.

A horizontal deflection branch of the network of FIG. 23 receives stroke pulses from the stroke timing signal conversion means of FIG. 22 during the second and fourth stroke periods of each character period, a sweep signal from the sweep signal steering means of FIG. 24 during the first, sixth, and seventh stroke periods, and, timing signals which originate from the Q terminals of the flip-flops 8–1 and 8–2 of the timing signal and sweep signal generating means of FIG. 21. These signals are combined to produce a horizontal deflection signal, the waveform of which is seen in FIG. 7*a*.

A switching means is connected to the summing network of FIG. 23 to selectively direct the timing signal originating from the Q terminal of the flip-flop 8–4 of FIG. 21 to either the vertical or horizontal deflection branches of the summing network. The signal which appears at the Q terminal of the flip-flop 8–4 changes voltage level every four character periods. If this signal is directed to the vertical branch of the summing network, then the first four character rasters of the numeric symbol display will be formed immediately above the second four rasters in a 2 x 4 symbol display However, if this timing signal is directed to the horizontal deflection branch of the summing network, the second four character rasters will be formed adjacent to the first four character rasters along a horizontal line so that a 1 x 8 numeric symbol display is produced.

The horizontal and vertical deflection signals produced by the summing network of FIG. 23, as seen in FIG. 7*a*, when applied to the deflection means and associated cathode-ray display device, will deflect the cathode-ray to produce a character raster in the form of the numeral "8" which appears in a predetermined numeric symbol display. This specific character raster is formed by positioning a cathode-ray on the screen of an associated cathode display device in a predetermined position which is termed an origin. The cathode-ray is then deflected or swept out to a terminus and then returned to the origin so that an image is created on the screen. The origin is then shifted instantaneously to another position on the screen of the cathode-ray tube by a change in the voltage level of the deflection signal. The instantaneous change in the position of the origin is too rapid to produce an image on the screen of the cathode-ray display device when the intensity of the cathode-ray beam is properly adjusted. A sweep signal is then applied to the deflection means of the cathode-ray display device so the cathode-ray is swept out to a second terminus and returned to the origin. This process is repeated a predetermined number of times so that seven strokes are formed on the screen of the cathode-ray display device in a predetermined character raster.

In the instant invention this character raster is formed of seven strokes and takes the shape of the numeral "8" as seen in FIG. 30*b*. After one complete character raster has been formed by appropriate deflection of the cathode-ray, a timing signal from the timing signal and sweep signal generating means of FIG. 21 changes the level of the deflection signals so that the cathode-ray is positioned for the formation of a second character raster, adjacent to the first raster. The process is repeated until a numeric symbol display in the form of a 2 x 4 or 1 x 8 configuration is generated. After the eight character rasters have been generated, the 2 x 4 or 1 x 8 configuration is regenerated continually.

An amplifying means is provided to amplify the deflection signals of the summing network of FIG. 23 prior to application of these signals to the horizontal or vertical deflection means of an associated cathode-ray diplay device. This amplifying means includes an amplifier V which amplifies the vertical deflection signal, and an amplifier H which amplifiers the horizontal deflection signal. These amplified deflection signals are then transmitted to the deflection means of the cathode-ray display device.

The readability of the alphanumeric characters formed in an alphanumeric symbol display is improved by feeding a portion of the vertical deflection signal to the horizontal deflection amplifier so that the alphanumeric characters formed are slightly canted or slanted.

Thus, it has been clearly shown how the circuits of FIGS. 21, 22, 24, 23, and 28 co-operate to provide horizontal and vertical deflection signals which, when applied to the deflection means of a cathode-ray display device, generate a plurality of character rasters in a predetermined numeric display.

A second function of the present invention is to suppress predetermined strokes of each character raster of an alphanumeric symbol display in order that predetermined information may be displayed by an associated cathode-ray display device. It would be well within the scope of the invention to display alphanumeric information in addition to numerals, the characters illustrated in FIG. 2, even though the illustrated embodiments of the invention provide for only Arabic numerals to be displayed. The portion of the present invention which accomplishes the function of suppressing predetermined strokes of each character raster includes circuits represented by the arbitrarily designated FIGS. 21, 25, 26, 27 and 29.

A means is provided for converting timing signals, generated by the timing and sweep signal generating means of FIG. 21, into column pulses. This means, as illustrated in FIG. 25, comprises a plurality of diode gating circuits 25–1 through 25–6 which are connected in a predetermined manner to a plurality of output terminals 25R1 through 25R8, each of which is identified with a particular column or character raster. The inputs to the column timing signal conversion means are coupled to the 8-1, 8-2 and 8-4 flip-flops which comprise the 8-count binary counter of the timing signal and sweep signal generator of FIG. 21. The timing signals generated by these flip-flops are converted into −12 v. pulses which appear in a repetitive predetermined sequence on the output column leads. A −12 v. column pulse occurs on one of the leads in a predetermined sequence during each character period.

A means is provided for determining the alphanumeric character which is desired to be traced in a predetermined character raster position of a symbol display on the screen of an associated cathode-ray display device. In the illustrated embodiments of the instant invention, this means comprises a readout switch which forms a portion of a particular adding-perforating machine described in U.S. Patent No. 2,861,739. In this particular readout switch the inputs receive the column pulses from the column timing signal conversion means of FIG. 25. The readout switch is also provided with a plurality of output terminals that represent digits which may be displayed by this particular embodiment of the invention.

It will be seen in FIG. 26 that the number "11184632" has been entered into the readout switch. This means that the column leads for columns 8, 7 and 6 are connected to the output terminal representing the digit "1," that the column 5 lead is connected to the digit "8" line, that the column 4 lead is connected to the digit "4" output terminal, that the column 3 input lead is connected to the digit "6" output terminal, that the column 2 lead is connected to the digit "3" output terminal, and that the column 1 lead is connected to the digit "2" output terminal. There is no terminal identified with the digit "8" since the character raster itself represents the digit "8." Thus, as a column pulse appears at the input terminal 26L1 in this particular example, it will be directed to the output terminal 26R9, which is the digit "2" terminal. Similarly, as the other column pulses appear on the input terminals 26L2 through 26L8, they will be directed to the appropriate output terminals so that the selected numerals may be formed in the desired character raster positions.

A means is provided to convert the digit pulses produced by the column pulse conversion means of FIG. 26 into stroke suppression pulses. This means comprises a plurality of gates 27–1 through 27–7. Each gate is identified with a particular stroke of the 7-stroke character raster and has from one to six digit leads from FIG. 26 as inputs. Whenever a pulse appears on one of the digit leads 26R1, 26R2, or 26R4 through 26R10, this pulse also appears as an input to the gates 27–1 through 27–7 which are identified with the particular stroke which is to be blanked in a particular character raster. As an example, it will be observed that the gate 27–1, which is identified with the first stroke of the character raster, has as inputs the digit lines 26R10, 26R7, and 26R4; digit lines 26R10, 26R7 and 26R4 relate to the digits "1," "4" and "7," respectively. During the generation of the digits "1," "4" and "7" it is necessary to blank the first stroke of a character raster, hence, it is apparent that whenever one of the digits "1," "4" and "7" is to be formed in a character raster position, a digit pulse will be transmitted to the gate 27–1.

As a further example, it will be remembered that the number "11184632" was entered into the readout switch of FIG. 26. Reading from right to left, it is seen that the numeral "3" appears in the second number or character position. When a column pulse appears at the input terminal 26L2 of the readout switch, a digit pulse will appear on the output terminal 26R8, which is the line identified with the digit "3." Referring now to FIG. 30*b* it will be seen that to form the numeral "3," the second and fourth strokes of the character raster must be blanked. Accordingly, a digit pulse appears at the digit lead 26R8 and is transmitted to the gates 27–2 and 27–4. When pulses appear at these gates, the second and fourth strokes of the character raster will be suppressed during the generation of the character raster in the second character position. The suppression of the second and fourth strokes during the second character period will allow the numeral "3" to appear in the second character raster position.

The voltages which appear at the outputs of the gates 27–1 through 27–7 are inverted by the inverters I–9 so that stroke suppression pulses in the form of −6 v. signals appear on the output terminals 27R2 through 27R8 of the digit pulse conversion means. It will be seen in FIG. 27 that the terminal 27R1 is connected to the input terminal 27L1 of gate 27–1 and is noted as leading to a one displacement network. The terminal 27R1 leads to the one displacement network illustrated in FIG. 28. This network is provided for displacing the numeral "1" within the character raster position in which it may appear. It will be seen in FIG. 30*b* that the numeral "1" comprises the third and fifth strokes of the character raster. It, therefore, will be closely adjacent to a numeral appearing in the character raster position immediately to its right and more distant from a numeral formed in a character raster position immediately to its left. It is thus desirable to improve the readability of the numeral "1" and to further enhance the perception of the information displayed by the cathode-ray display device by forming the digit "1" substantially in the center of a character raster position, which is preferably along the dashed lines 8 and 9 of FIG. 30*b*. Thus, when a digit pulse appears at the input terminal 27L1, this pulse is passed through the one displacement network illustrated in FIG. 28 and applied to the input of the horizontal deflection amplifier. When the digit "1" is to appear in a character raster position, a signal will be fed to the horizontal deflection amplifier H such that the strokes 3 and 5 which comprise the numeral "1" are deflected from the positions they normally occupy within the character raster position and the numeral "1" appears substantially in the center of the character raster position.

A means is provided for converting stroke suppression pulses received from the digit pulse conversion means of FIG. 27 into a blanking, or trace-suppressing signal which is transmitted to the grid of an associated cathode-ray display device. This means comprises a plurality of gates 29–1 through 29–7. Each of the gates 29–1 through 29–7 is provided with two inputs. One of the inputs of each gate is connected to one of the outputs of the stroke timing signal conversion means of FIG. 22. Each gate receives one stroke pulse during every seven stroke pulses generated by the stroke timing signal conversion means. The other input of each of the gates 29–1 through 29–7 is connected to an output of the digit pulse conversion means of FIG. 27 for receiving a stroke suppression pulse. Thus, it will be seen that a stroke suppression pulse is supplied to each gate once during the character period in which a character raster is generated. If it is desired that certain strokes of a character raster be blanked in order that a certain alphanumeric symbol may be displayed in a predetermined character position, that information is entered into the readout switch of FIG. 26. The digit pulse output of FIG. 26, which is identified with a particular digit, is directed to each of the gates 27–1 through 27–7 of FIG. 27, according to the strokes which must be blanked from a character raster for the desired digit to be displayed. The outputs of the selected gates 27–1 through 27–7 are then inverted by inverters I–9 of FIG. 27 and are connected to one of the gates 29–1 through 29–7 of FIG. 29. During each character period in which an alphanumeric symbol other than the numeral "8" is to be displayed, a gating voltage level will be received at the inputs to the pertinent gates 29–1 through 29–7 which are identified with the particular strokes that are to be blanked. When, during that character period, a stroke pulse is also received from the stroke timing signal conversion means of FIG. 22 a blanking signal will be passed to the blanking amplifier B which blanks or suppresses the cathode-ray during a particular stroke of the character raster.

Considering further now the example in which the numeral "3" is displayed in the second character position of the exemplary number "11184632," it was determined that a digit pulse was applied to the gates 27–2 and 27–4. The signals passed by the gates 27–2 and 27–4 are inverted by the inverters I–9 and appear at the output terminals 27R3 and 27R5 which are connected to the AND gates 29–2 and 29–4 of FIG. 29. Thus, a blanking signal appears at one of the terminals of these two gates during the second character period. When a stroke pulse, occurring during the second stroke of the character raster, appears at the input 29L3 of the AND gate 29–2, a blanking signal is transmitted to the blanking amplifier B and the second stroke is suppressed from the character raster. Also, when the fourth stroke pulse appears at the input 29L7 of the AND gate 29–4, a blanking signal appears at the output thereof and is passed through the blanking amplifier B for suppressing the fourth stroke of the character raster. Since the second and fourth strokes of the character raster occurring during the second character period have been suppressed, it will be seen that the remaining strokes of the raster form the numeral "3," as is desired. It has, thus, been shown in describing the operation of the machine how a plurality of predetermined character rasters have been generated to form a symbol display and how the character signal generator apparatus may be operated to provide for a predetermined alphanumeric character to be displayed in a character raster position by the selective blanking of strokes of the character raster.

The operation of the second embodiment of the present invention is similar to the operation of the first embodiment with the exception that a modified timing signal and sweep signal generator, as seen in FIG. 31, is utilized in place of the timing signal and sweep signal generating means of FIG. 21 which was utilized in the first embodiment. The timing signal and sweep signal generating means of FIG. 31 includes a waveform generator and a pulse generator which co-operate to form a square wave generator, the output of which is a pulse train, as seen in FIG. 32*c*. This pulse train is applied to the counter which comprises a 7-count counter and an 8-count counter. The 7-count counter includes the flip-flops 7–1, 7–2 and 7–4 and the skip "4" circuit. The counter further includes a conventional binary 8-count counter which comprises the flip-flops 8–1, 8–2 and 8–4. The timing signals which are the outputs of the 7-count and 8-count counters appear at the output terminals 31R2 through 31R16 and are the same signals which appeared at the output terminals 21R2 through 21R16 of the timing signal and sweep signal generating means of FIG. 21. Since the timing signals of the second embodiment are the same as in the first embodiment, it will be at once apparent that the operation of the second embodiment in most respects is the same as that of the first embodiment.

The pulse train output of the square wave generator of FIG. 31 is also applied to a sweep signal generator, illustrated in FIG. 31 as a rectangle having a diagonal. The output SW of the sweep signal generator appears at the output terminal 31R1, the waveform of the signal being seen in FIG. 33 as a sawtooth signal labeled 31R1.

Since the timing signals produced by the timing signal and sweep signal generating means of the second embodiment are the same as those generated by the timing signal and sweep signal generating means of the first embodiment, it will be evident that the stroke timing signal conversion means of FIG. 22 which produces stroke pulses will operate in the second embodiment identically to that of the first embodiment.

The means provided to steer the sweep signal during predetermined periods of time or stroke periods to selected output terminals is illustrated in FIG. 24. This means operates as before to steer or direct the sweep signal during stroke periods 1, 6 and 7 to the horizontal deflection amplifier and to steer the sweep signal during stroke periods 2, 3, 4 and 5 to the vertical deflection amplifier. Since, in the second embodiment of the invention, the sweep signal received by the means of FIG. 24 is a sawtooth wave instead of a triangular sweep wave, the steering means of FIG. 24 now directs a different sweep signal to the horizontal and vertical amplifiers. The output signals 24R1 and 24R2 have waveforms as seen in FIG. 33. An inspection of these waveforms reveals that in the second embodiment of the invention the sawtooth sweep signal is directed during stroke periods 1, 6 and 7 to the horizontal deflection amplifier and during stroke periods 2, 3, 4 and 5 to the vertical deflection amplifier. Thus, it is clearly illustrated that operation of the sweep signal steering means of FIG. 24 remains the same in the second embodiment.

The circuit means of FIG. 23 produces horizontal and vertical deflection signals by the proper combination of signals received from the timing and sweep signal generating means, strokes timing conversion means and the sweep signal steering means. Since the timing signals received from the timing and sweep signal generating means and the stroke pulses received from the stroke timing signal conversion means are the same in the second embodiment as in the first embodiment, the output signals of the circuit of FIG. 23 in the second embodiment will differ from the output signals in the first embodiment as a result of the different signals received from the sweep signal steering means. Since the sweep signal steering means of FIG. 24 in the second embodiment steers the sawtooth wave sweep signal to the horizontal and vertical deflection amplifiers during predetermined stroke periods, it will be evident that the output signals of the combination means of FIG. 23 will be changed only in the affect that a different sweep signal will have. The waveforms of the output signals 28R1 and 28R2 which are fed to the vertical and horizontal amplifiers respectively are seen in FIG. 33. An inspection of these waveforms reveals that the triangular sweep signal of the first embodiment has been replaced by the sawtooth wave sweep signal of the second embodiment and that the deflection signals in all other respects remain the same.

The horizontal and vertical deflection signals which appear at the outputs 23R1 and 23R2 are amplified by the vertical amplifier V and a horizontal amplifier H and are applied to the deflection means of an associated cathode-ray display device. The deflection signals of the second embodiment will cause the cathode-ray beam, in each stroke, to move instantaneously from an origin of the cathode-ray to its terminus. The instantaneous deflection from an origin to a terminus will not form an image on the screen of the display device. Upon reaching the terminus, the cathode-ray is then returned to the origin in a period of time considerably greater than during its initial sweep so that an image is formed on the screen. This method of using one image forming sweep per stroke is utilized as before to generate seven strokes of a predetermined character raster. The other seven character rasters are formed in a similar manner.

In the present invention the circuits of FIGS. 25, 26, 27 and 29 are identical in the first and second embodiments. It has been shown that the timing signals generated by the circuit of FIG. 31 are identical to the timing signals of FIG. 21. Thus, the portion of the second embodiment involving the circuits of FIGS. 25, 26, 27 and 29 of the instant invention will function as previously set forth in the description of the operation of the first embodiment.

It will be appreciated that by the above described constructions, a novel character display signal generator is provided which is capable of producing a plurality of synchronized electrical signals, which, when applied to the proper input terminals of an associated cathode-ray display device, or the like, will cause information in the form of alphanumeric symbols to be displayed thereupon in a preselected numeric symbol display. It will also be apparent that the present invention provide character display signal generating apparatus and methods relating thereto which are free from the necessity of employing the specialized and critical components and subcircuits which were required in the past. It will be appreciated from an inspection of the circuitry which may be employed in the illustrated embodiments of the instant invention that the novel character display signal generator described is singularly free from critical circuitry and special components. The attendant advantages of low cost and maximum ease of maintenance which would be inherent in an apparatus and methods characterized by minimum criticalness and an absence of special components are also provided by the instant invention. In the foregoing description of the illustrated embodiments the constructions and operations of these embodiments clearly illustrate the manner in which a plurality of predetermined character rasters are formed in a plurality of selectable symbol displays and how selected strokes of each character raster may be selectively blanked or suppressed to permit desired information in the form of alphanumeric symbols or numerals to be displayed upon the screen of an associated cathode-ray device. Thus, the present invention discloses a character display signal generator which may be utilized with any cathode-ray display device, such as a cathode-ray tube, an oscilloscope, or the like, thereby greatly increasing the range of its application and precluding the necessity of employing a special display device.

It will thus be seen that the objects set forth above, among those made apparent by the preceding description, are efficiently attained, and, since certain changes may be made in the above constructions and methods without departing from the scope of the invention, it is intended that all matter contained in the above description or shown in the accompanying drawings shall be interpreted as illustrative and not in a limiting sense.

It is particularly noted that although the invention as disclosed would have particular application to the field of electronic data processing, the invention would be equally applicable to any field wherein it was desired to utilize an inexpensive electronic system not requiring special circuitry or components to display information. Although the most common applications will be in the field of electronic data processing wherein the present invention could be utilized in the display units of digital computers and electronic calculators, another contemplated use will be in the field of finance where the present invention can be used to great advantage as a stock quotation display board.

It is also to be understood that the following claims are intended to cover all of the generic and specific features of the invention herein described, and all statements of the scope of the invention which is a matter of language, might be said to fall therebetween.

What is claimed is:

1. In a signal generator adapted to cooperate with a cathode-ray tube for displaying a multi-character, multi-row display on the face of the tube by generating a character raster in a plurality of diverse positions and selectively controlling the appearance of each stroke of each raster for displaying a selected character in each position, (a) means generating deflection signals which are applied to the deflection means of a cathode-ray display device to cause the cathode-ray beam to trace a character raster, said means including:
  (1) a timing chain generating two binary digital sets of timing signals and a sweep signal,
  (2) gating means converting a first set of said timing signals into a set of commutated pulses,
  (3) means responsive to the remaining timing signals, commutated pulses, and sweep signals to provide deflection signals, (b) timing means connected to the timing chain for altering said deflection signals whereby a character raster is generated in a plurality of diverse positions on the screen of said cathode-ray display device, the raster positions being arranged on the face of the tube in a plurality of determinable registers;

(c) adjustable means connected to the timing means for determining the number of registers in which the character rasters appear, and (d) blanking signal synthesizing means connected to the timing chain for receiving the second set of timing signals therefrom and operating in synchronism with said timing means for selectively blanking predetermined strokes of a character raster generated in a predetermined character position whereby a selected digit may be produced by the appearing strokes of the raster.

2. In a signal generator adapted to cooperate with a cathode-ray tube for displaying a multi-row, multi-character display on the face of the tube, (a) means for generating a pair of deflection signal trains which are applied to the deflection means of a cathode-ray display device, to cause the cathode-ray beam to trace a multi-stroke character raster in a plurality of positions on the screen of said cathode-ray display device, said means including:
  (1) means repetitively generating at least two sets of timing signals and a sweep signal,
  (2) means converting a first set of said timing signals into a set of commutated pulses, each pulse representing a particular stroke of the raster,
  (3) means responsive to the commutated pulses, other of said timing signals and the sweep signals to provide a pair of deflection signal trains,
  (4) amplifying means applying the deflection signal trains to said deflection means, (b) means synchronized with said generating means for controlling the appearance of predetermined strokes of a character raster whereby a selected digit may be produced by the appearing strokes of the raster, said means including.
  (1) means responsive to a second set of timing signals for generating a set of serially appearing column signals, each signal representing a diverse position upon the screen of said cathode-ray display device in which a digit may be displayed,
  (2) means converting said column signals into a set of serially appearing digit signals, each digit signal representing the digit selected for display in a predetermined position on said screen,
  (3) means converting each of said digit signals into a set of simultaneously appearing stroke suppression pulses, each one of which represents a particular stroke of the character raster which will be suppressed for displaying a selected digit; and
  (4) means responsive to said set of commutated stroke pulses, each one of which represents a particular stroke of the character raster, for gating in synchronism with the generation of each character raster the stroke suppression pulses to means controlling the intensity of the cathode-ray beam of the display device, whereby predetermined strokes of the character raster may be suppressed and the remaining strokes cause a selected digit representation to be displayed for each digit signal.

3. In a signal generator adapted to cooperate with a cathode-ray tube for displaying a multi-character, multi-row display on the face of the tube by generating a multi-stroke character raster in a plurality of diverse positions and selectively controlling the appearance of each stroke of each raster for displaying a selected digit in each position:

(a) means generating a pair of signal trains which are applied to deflection means of a cathode-ray display device, said means including:

(1) a free running counter repetitively generating at least two sets of synchronized timing signal trains and a sweep signal train;

(2) a first gating means converting the first timing signal train generated by the counter into sets of stroke pulses sequentially appearing on a set of output lines, each stroke pulse representing one of the strokes of the character raster;

(3) a second gating means responsive to a set of stroke pulses to direct the sweep signal train into either of two sweep signal train channels according to whether the stroke which is instantaneously being generated is horizontal or vertical;

(4) an analog current summing network responsive to the second set of timing signals, stroke pulses, and the sweep signal trains to produce a pair of deflection signal trains which are applied to the horizontal and vertical deflection means of a cathode-ray display device for modulating the cathode-ray beam deflection field to cause the beam to trace a multi-stroke character raster in a plurality of diverse positions on the screen of said display device;

(b) means synthesizing a blanking signal train which is applied to the stroke appearance control means of the display device, said means including:

(1) a third gating means converting the second set of timing signals into a set of column pulses which appear sequentially on a set of output lines, each column pulse representing one of the diverse positions on said screen in which a character raster is traced;

(2) digit selection means responsive to a selection of the digit to be displayed in each character position to convert the column pulses into a set of digit pulses which appear sequentially on a set of output lines, each output line representing a digit which will be produced in a predetermined character position;

(3) a fourth gating means converting each digit pulse into a plurality of stroke suppression pulses which appear simultaneously on a set of output lines, each stroke suppression pulse representing a stroke of a character raster which will be blanked in the generation of a digit representation; and (4) a fifth gating means which passes, under the control of the sequentially appearing stroke pulses, the stroke suppression pulses for each desired digit in synchronism with the generation of a predetermined character raster to synthesize a blanking signal train for each selected digit representation whereby the appearing strokes of a character raster generated in a predetermined character position on said screen produce a selected digit.

4. In a signal generator of the type adapted to cooperate with a cathode-ray tube for displaying a multi-character, multi-row display on the face of the tube by generating a multi-stroke character raster in a plurality of diverse positions and selectively controlling the appearance of each stroke of each raster for displaying a selected character in each position:

(a) means generating a pair of signal trains which are applied to deflection means of a cathode-ray display device, said means including:

(1) a first free running counter repetitively generating on a set of lines a first binary set of synchronized rectangular pulse trains whose periods comprise a geometric series and a sawtooth sweep signal train;

(2) a first gating means converting some of the rectangular pulse trains generated by the counter into sets of stroke pulses sequentially appearing on a set of lines, each stroke pulse being associated with one of the strokes of which the character raster is comprised;

(3) a second gating means dividing the sweep signal train into two sweep signal trains according to whether the stroke which is instantaneously being generated is horizontal or vertical;

(4) an analog current responsive to network summing timing signals, stroke pulses, and sweep signal trains to produce a pair of deflection signal trains which are applied to the horizontal and deflection means of a cathode-ray display device for modulating the cathode-ray beam deflection field to cause the beam to trace a rectilinear-trace character raster in a plurality of diverse positions on the screen of said display device;

(5) variable switch means cooperating with said summing network to determine the number of registers in which the character rasters will be traced on the face of the tube;

(b) means synthesizing a blanking signal train which is applied to the stroke appearance control means of the display device, said means including:

(1) a second free running counter operating in synchronism with said first counter and generating on a set of lines a second binary set of rectangular pulse trains whose periods comprise a geometric series;

(2) a third gating means converting the second binary set of rectangular pulse trains into a set of column pulses which appear sequentially on a set of lines, each column pulse representing one of the diverse positions on said screen in which a character raster is traced;

(3) digit selection means converting the column pulses into a set of digit pulses which appear sequentially on a set of lines, each digit pulse representing the digit representation which will be produced in a predetermined character position;

(4) a fourth gating means converting each digit pulse into a plurality of stroke suppression pulses which appear simultaneously on a set of lines, each stroke suppression pulse representing a stroke of a character raster which will be blanked in the generation of a digit representation; and (5) a fifth gating means which passes, under the control of the sequentially appearing stroke pulses, the stroke suppression pulses for each desired digit in synchronism with the generation of a predetermined character raster to synthesize a blanking signal train for each selected digit representation whereby the appearing strokes of a character raster generated in a predetermined character position on said screen produce a selected digit representation.

5. A character display generator adapted to cooperate with a cathode-ray tube for displaying a multi-character, multi-row display on the face of the tube by generating a multi-stroke character raster in a plurality of diverse positions and selectively controlling the appearance of each stroke of each raster for displaying a selected character in each position; the generator being characterized by:

a timing chain (FIG. 21) generating at least two sets of timing signals (FIGS. 7*b* and 6) and a sweep signal (FIG. 7);

a decoder (FIG. 22) for converting a first set of timing signals (FIG. 7*b*) into a set of sequentially appearing stroke pulses (FIG. 7), each pulse representing a stroke of the raster;

a matrix (FIG. 23) for converting a set of stroke pulses into a set of electron beam positioning signals for locating the electron beam of the cathode-ray tube at certain points within each character raster;

a gating matrix (FIG. 24) controlled by a set of stroke pulses to steer the sweep signal into either of two channels (FIG. 7*a*) for modulating the electron beam in either a vertical or a horizontal direction;

a pair of summing amplifier networks (FIGS. 23 and 28) for summing the electron beam positioning signals, a second set of timing signals (FIG. 6), and the two modulating signals (FIG. 7*a*), and applying the resultant signals (FIG. 7) to the horizontal and vertical deflection plates of the cathode-ray tube whereby a multi-stroke character raster is traced on the face of the tube in a plurality of diverse positions in a plurality of registers;

a matrix (FIG. 25) for converting a second set of timing signals (FIG. 7*b*) generated by the timing chain into a set of column pulses, each pulse representing a character position on the face of the cathode-ray tube;

a matrix (FIG. 26) for selecting the character to be displayed in each selected character position and for converting each column pulse into a pulse which appears on a lead representing that character;

a decoder (FIG. 27) for converting a character pulse into a set of simultaneously appearing pulses, each pulse representing the appearance of a particular stroke of a character raster;

a gating network (FIG. 29) controlled by the sequentially appearing stroke pulses for passing a stroke appearance pulse simultaneously with the generation of a stroke of a character raster; and an amplifier (FIG. 29) for applying to the grid of the cathode-ray tube the gated stroke appearance pulses (FIG. 7) in synchronism with the generation of a character raster whereby the appearing strokes of the raster delineate a selected character.

References Cited

UNITED STATES PATENTS

| | | | |
|---|---|---|---|
| 3,090,041 | 5/1963 | Dell | 340—324 |
| 3,104,387 | 9/1963 | Loshin | 340—324.1 |
| 3,165,729 | 1/1965 | Richman | 340—324.1 |
| 3,289,196 | 11/1966 | Hull | 340—324 |

NEIL C. READ, *Primary Examiner.*

A. J. KASPER, *Assistant Examiner.*

UNITED STATES PATENT OFFICE
CERTIFICATE OF CORRECTION

Patent No. 3,341,838 September 12, 1967

Robert A. Ragen

It is hereby certified that error appears in the above numbered patent requiring correction and that the said Letters Patent should read as corrected below.

Column 1, line 38, for "ar" read -- or --; column 2, line 59, for "ad" read -- and --; column 3, line 10, for "displayed" read -- displaced --; line 39, after "units" insert -- is --; column 6, line 36, for "digram" read -- diagram --; column 7, line 29, for "ocsilloscope" read -- oscilloscope --; line 58, for "FIGS. 8a and 8b" read -- FIG. 8a and FIG. 8b --; line 65, for "nonconducing" read -- nonconducting --; line 70, for "approximtely" read -- approximately --; line 73, for "volt O" read -- OV --; column 8, line 3, for "thes" read -- these --; line 11, for "fiip-flop" read -- flip-flop --; column 10, line 75, for "Q̄" read -- Q --; column 12, line 9, for "TYPE" read -- Type --; line 14, for "negativegoing" read -- negative-going --; line 17, after "generator" insert -- of --; lines 59 and 62, for "emiter", each occurrence, read -- emitter --; line 60, for "pe" read -- be --; line 74, strike out "is"; column 13, line 36, for "minus-sign" read -- minus (-) sign --; line 37, for "period." read -- period (.). --; column 16, line 44, strike out "con-"; column 17, in the table, between "Decimal Equivalents 3 and 5" insert a horizontal dashed line; line 72, for "tanguar" read -- tangular --; line 74, for "b ythe" read -- by the --; column 18, line 7, for "colelctor" read -- collector --; line 17, for "mentary" read -- menting --; line 21, for "corersponding" read -- corresponding --; column 19, line 28, for "oy" read -- by --; column 21, line 45, for "outupt" read -- output --; line 67, for "areconnected" read -- are connected --; column 23, line 61, for "comprises" read -- comprise --; column 28, line 1, for "terminals" read -- terminal --; column 30, line 9, for "on" read -- of --; column 31, line 71 and column 32, line 4, for "ouput", each occurrence, read -- output --; column 33, line 6, for "-O v." read -- -6V --; column 34, line 18, for "plaaced" read -- placed --; column 35, line 68, for "are" read -- as --; column 37, line 8, after "and" insert a comma; column 38, line 59, for "tue" read -- tute --; column 39, line 6, for "inverseion" read -- inversion --; line 68, for "display" read -- display. --; column 44, line 20, for "strokes" read -- stroke --; column 46, line 40, for "including." read -- including: --.

Signed and sealed this 12th day of November 1968.

(SEAL)
Attest:

EDWARD M.FLETCHER,JR.
Attesting Officer

EDWARD J. BRENNER
Commissioner of Patents